(12) United States Patent
Suzuki et al.

(10) Patent No.: US 10,186,733 B2
(45) Date of Patent: Jan. 22, 2019

(54) ELECTROLYTIC SOLUTION FOR NONAQUEOUS ELECTROLYTIC SOLUTION SECONDARY BATTERIES AND NONAQUEOUS ELECTROLYTIC SOLUTION SECONDARY BATTERY

(71) Applicant: Central Glass Company, Limited, Ube, Yamaguchi (JP)

(72) Inventors: Katsutoshi Suzuki, Kawagoe (JP); Toru Tanaka, Kawagoe (JP); Mikihiro Takahashi, Ube (JP); Kazunari Takeda, Tokyo (JP)

(73) Assignee: Central Glass Co., Ltd., Ube (JP)

( * ) Notice: Subject to any disclaimer, the term of this patent is extended or adjusted under 35 U.S.C. 154(b) by 0 days.

(21) Appl. No.: 15/545,171

(22) PCT Filed: Dec. 28, 2015

(86) PCT No.: PCT/JP2015/086564
§ 371 (c)(1),
(2) Date: Nov. 28, 2017

(87) PCT Pub. No.: WO2016/117280
PCT Pub. Date: Jul. 28, 2016

(65) Prior Publication Data
US 2018/0241082 A1      Aug. 23, 2018

(30) Foreign Application Priority Data
Jan. 23, 2015   (JP) .................................. 2015-011735

(51) Int. Cl.
*H01M 6/16*        (2006.01)
*H01M 10/0567*     (2010.01)
(Continued)

(52) U.S. Cl.
CPC ......... *H01M 10/0567* (2013.01); *H01M 2/16* (2013.01); *H01M 4/48* (2013.01);
(Continued)

(58) Field of Classification Search
CPC ........... H01M 10/0567; H01M 10/052; H01M 10/0525; H01M 10/0568; H01M 10/0569;
(Continued)

(56) References Cited

U.S. PATENT DOCUMENTS 5,626,981 A    5/1997  Simon et al.
6,506,516 B1   1/2003  Wietelmann et al.
(Continued)

FOREIGN PATENT DOCUMENTS

EP   3145019 A1    3/2017
JP   H05-074486 A  3/1993
(Continued)

OTHER PUBLICATIONS

"Spectroscopic studies of inorganic fluoro-complexes. Part III. Fluorine-19 nuclear magnetic resonance studies of silicon(IV), germanium(IV), and titanium(IV) fluoro-complexes", Journal of the Chemical Society A, 1970, 15, pp. 2569-2574.
(Continued)

*Primary Examiner* — Raymond Alejandro
(74) *Attorney, Agent, or Firm* — Crowell & Moring LLP

(57) ABSTRACT

An object of the present invention is to provide a nonaqueous electrolytic solution and a nonaqueous electrolytic solution battery capable of showing high output characteristics at a low temperature even after the battery is used to some extent, and capable of showing good high-rate properties, and further capable of showing sufficient performance again at low temperature even after stored at a high temperature. The present invention is characterized in the use of a nonaqueous electrolytic solution containing a nonaqueous
(Continued)

organic solvent and an electrolyte dissolved in the nonaqueous organic solvent, the nonaqueous electrolytic solution comprising a difluoro ionic complex (1-Cis) in a cis configuration represented by the general formula (1-Cis), and at least one compound selected from the group consisting of a carbonate having an unsaturated bond, a carbonate having a fluorine atom, an acid anhydride, and a compound having an isocyanato group.

19 Claims, 1 Drawing Sheet

(51) Int. Cl.
| | |
|---|---|
| H01M 2/16 | (2006.01) |
| H01M 4/48 | (2010.01) |
| H01M 4/587 | (2010.01) |
| H01M 10/052 | (2010.01) |
| H01M 10/0568 | (2010.01) |
| H01M 10/0569 | (2010.01) |
| H01M 10/0525 | (2010.01) |

(52) U.S. Cl.
CPC ......... *H01M 4/587* (2013.01); *H01M 10/052* (2013.01); *H01M 10/0525* (2013.01); *H01M 10/0568* (2013.01); *H01M 10/0569* (2013.01); *H01M 2300/0028* (2013.01); *H01M 2300/0037* (2013.01); *Y02E 60/122* (2013.01); *Y02T 10/7011* (2013.01)

(58) Field of Classification Search
CPC .......... H01M 4/48; H01M 4/587; H01M 2/16; H01M 2300/0028; H01M 2300/0037; Y02E 60/122; Y02T 10/7011
See application file for complete search history.

(56) References Cited

U.S. PATENT DOCUMENTS

| | | | |
|---|---|---|---|
| 6,693,212 B1 | 2/2004 | Wietelmann et al. | |
| 6,783,896 B2 | 8/2004 | Tsujioka et al. | |
| 6,919,145 B1 | 7/2005 | Kotato et al. | |
| 7,135,252 B2 | 11/2006 | Thackeray et al. | |
| 7,416,813 B2 | 8/2008 | Fujihara et al. | |
| 7,645,544 B2 | 1/2010 | Ihara et al. | |
| 7,771,876 B2 | 8/2010 | Mizutani et al. | |
| 8,039,151 B2 | 10/2011 | Inagaki et al. | |
| 8,546,018 B2 | 10/2013 | Kajiyama et al. | |
| 8,822,084 B2 | 9/2014 | Tsujioka et al. | |
| 2002/0081496 A1 | 6/2002 | Tsujioka et al. | |
| 2003/0100761 A1 | 5/2003 | Tsujioka et al. | |
| 2005/0191553 A1 | 9/2005 | Fujihara et al. | |
| 2005/0208378 A1 | 9/2005 | Mizutani et al. | |
| 2007/0009798 A1 | 1/2007 | Inagaki et al. | |
| 2008/0090154 A1 | 4/2008 | Ihara et al. | |
| 2010/0316910 A1 | 12/2010 | Kajiyama et al. | |
| 2011/0236768 A1 | 9/2011 | Tani | |
| 2011/0256458 A1 | 10/2011 | Tani | |
| 2012/0288751 A1* | 11/2012 | Kako ................... | H01M 2/166 429/188 |
| 2013/0022880 A1* | 1/2013 | Tsujioka ................ | H01G 11/64 429/345 |
| 2013/0071731 A1 | 3/2013 | Tokuda et al. | |
| 2013/0288139 A1 | 10/2013 | Choi et al. | |
| 2013/0302700 A1 | 11/2013 | Washizuka | |
| 2013/0323570 A1 | 12/2013 | Iwanaga | |
| 2014/0193706 A1* | 7/2014 | Morinaka ......... | H01M 10/0567 429/200 |
| 2015/0147643 A1* | 5/2015 | Morinaka ........... | C07F 9/65742 429/199 |
| 2015/0194671 A1 | 7/2015 | Nakahara et al. | |
| 2015/0207142 A1 | 7/2015 | Takijiri et al. | |
| 2016/0013517 A1 | 1/2016 | Nakazawa et al. | |

FOREIGN PATENT DOCUMENTS

| | | |
|---|---|---|
| JP | H07-176323 A | 7/1995 |
| JP | H08-45545 A | 2/1996 |
| JP | 2001-006729 A | 1/2001 |
| JP | 2001-057235 A | 2/2001 |
| JP | 2002-110235 A | 4/2002 |
| JP | 2002-151077 A | 5/2002 |
| JP | 2002-519352 A | 7/2002 |
| JP | 2002-329528 A | 11/2002 |
| JP | 2003-7334 A | 1/2003 |
| JP | 2003-505464 A | 2/2003 |
| JP | 2003-115324 A | 4/2003 |
| JP | 2003-137890 A | 5/2003 |
| JP | 3417411 B2 | 6/2003 |
| JP | 3573521 B2 | 10/2004 |
| JP | 2005-005115 A | 1/2005 |
| JP | 3722685 B2 | 11/2005 |
| JP | 2006-196250 A | 7/2006 |
| JP | 2007-018883 A | 1/2007 |
| JP | 2007-035357 A | 2/2007 |
| JP | 3907446 B2 | 4/2007 |
| JP | 2007-242411 A | 9/2007 |
| JP | 2007-335143 A | 12/2007 |
| JP | 2008-004503 A | 1/2008 |
| JP | 2008-016424 A | 1/2008 |
| JP | 2008-270201 A | 11/2008 |
| JP | 4190162 B2 | 12/2008 |
| JP | 2009-137834 A | 6/2009 |
| JP | 2009-245828 A | 10/2009 |
| JP | 4423888 B2 | 3/2010 |
| JP | 4695802 B2 | 6/2011 |
| JP | 2011-222193 A | 11/2011 |
| JP | 2013-030284 A | 2/2013 |
| JP | 5278442 B2 | 9/2013 |
| JP | 2013-232417 A | 11/2013 |
| JP | 5573313 B2 | 8/2014 |
| JP | 2009-176752 A | 9/2015 |
| KR | 10-2013-0006500 A | 1/2013 |
| WO | WO 2004/042851 A1 | 2/2004 |
| WO | WO 2004/100293 A1 | 11/2004 |
| WO | WO 2007/083155 A1 | 7/2007 |
| WO | WO 2010/067549 A1 | 6/2010 |
| WO | WO 2011/125397 A1 | 10/2011 |
| WO | WO 2011/142410 A1 | 11/2011 |
| WO | WO 2012/102259 A1 | 8/2012 |
| WO | WO 2012/117911 A1 | 9/2012 |
| WO | WO 2013/118661 A1 | 8/2013 |
| WO | WO 2013/132824 A1 | 9/2013 |
| WO | WO 2013/180174 A1 | 12/2013 |
| WO | WO 2014/034043 A1 | 3/2014 |
| WO | WO 2014/157591 A1 | 10/2014 |
| WO | WO 2015/174455 A1 | 11/2015 |

OTHER PUBLICATIONS

Supplementary European Search Report issued in European Application No. 15878968.5 dated May 29, 2018 (four (4) pages).
European Office Action issued in counterpart European Application No. 15 878 968.5 dated Jun. 27, 2018 (seven (7) pages).
Korean-language Office Action issued in counterpart Korean Application No. 10-2017-7023184 dated Aug. 21, 2018 (11 pages).

* cited by examiner

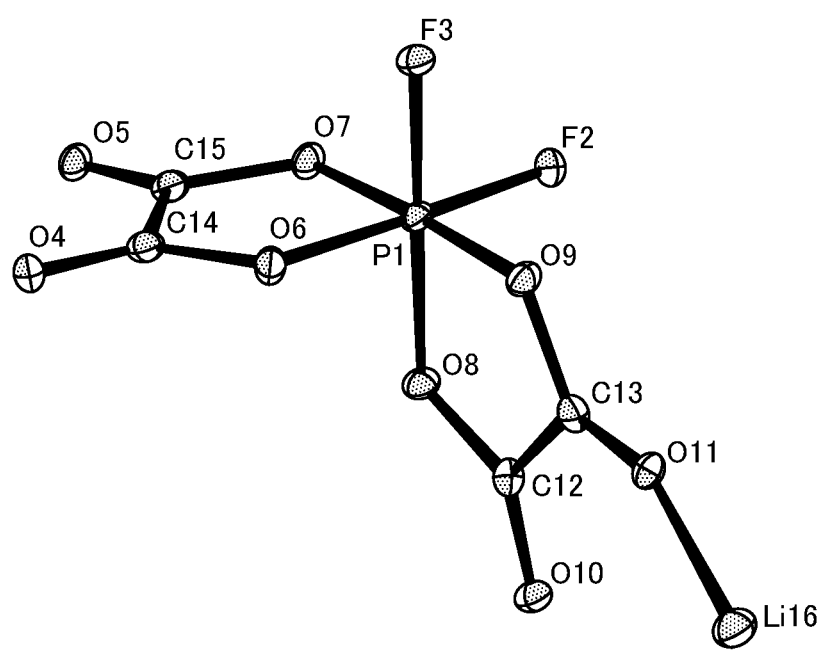

ELECTROLYTIC SOLUTION FOR NONAQUEOUS ELECTROLYTIC SOLUTION SECONDARY BATTERIES AND NONAQUEOUS ELECTROLYTIC SOLUTION SECONDARY BATTERY

TECHNICAL FIELD

The present invention relates to a nonaqueous electrolytic solution having excellent output characteristics at low temperature, and a battery such as a lithium secondary battery using the nonaqueous electrolytic solution. Further, the present invention relates to an additive useful for the nonaqueous electrolytic solution.

BACKGROUND ART

In recent years, there have been rapidly increasing demands for not only electricity storage systems for small-sized and high energy density applications, for example, information-related apparatus, communication apparatus, i.e., personal computers, video cameras, digital cameras, portable telephones, and smartphones; but also batteries with large capacity, high output and high energy density which can be used for electric vehicles, hybrid vehicles, and auxiliary power systems of fuel-cell vehicles. Moreover, there have been increasing demands for batteries which can be used for a long time even in electricity storage systems for large-sized and high power applications, for example, electric power storages. As one of the candidates for such electricity storage systems, nonaqueous electrolytic solution batteries have been under active development, such as lithium ion batteries, lithium batteries, and lithium ion capacitors.

Lithium secondary batteries mainly include a positive electrode, a nonaqueous electrolytic solution, and a negative electrode. As negative electrodes for lithium secondary batteries, known are, for example, metal lithium, metal compounds (for example, elemental metals, oxides, alloys with lithium, and the like) capable of occluding and releasing lithium, carbon materials, and the like. In particular, lithium secondary batteries where carbon materials capable of occluding and releasing lithium such as corks, artificial graphite, natural graphite, and the like are used have been put into wide practical use. For example, it is reported that in a lithium secondary battery where a highly crystallized carbon material such as natural graphite and artificial graphite is used as a negative electrode material, a nonaqueous solvent in a nonaqueous electrolytic solution may be reductively decomposed on the surface of a negative electrode upon charging, resulting in generation of decomposition products or gases. This may interfere with the desired electrochemical reactions of the battery, which in turn, may decrease cycle characteristics.

Further, in a lithium secondary battery where metal lithium or an alloy thereof, an elemental metal such as silicon and tin, or an oxide is used as a negative electrode material, pulverization of the negative electrode material is promoted during cycles although it has a high initial capacity. Therefore, a nonaqueous solvent is more susceptible to reductive decomposition as compared with a negative electrode made of a carbon material. As a result, the charge/discharge efficiency at the first cycle is known to be decreased due to an increased initial irreversible capacity of the battery. It is also known that this may significantly decrease battery performances such as battery capacity and cycle characteristics. A negative electrode may react with lithium cations or a solvent of an electrolytic solution when lithium cations are intercalated into the negative electrode upon charging at the first cycle. This may form a film containing lithium oxide, lithium carbonate, and lithium alkylcarbonate as the main components on the surface of the negative electrode. This film on the surface of the electrode which is called a Solid Electrolyte Interface (SEI) may, in nature, have significant impacts on battery performance. For example, it may reduce reductive decomposition of a solvent to prevent deterioration of battery performance. As described above, one of the disadvantages is that lithium may not be smoothly occluded into and released from a negative electrode due to adverse effects such as accumulation of decomposition products and generation of gases from a nonaqueous solvent, and pulverization of a negative electrode material, resulting in significant deterioration of battery characteristics such as cycle characteristics.

Meanwhile, as a positive electrode, known are, for example, $LiCoO_2$, $LiMn_2O_4$, $LiNiO_2$, $LiFePO_4$, and the like. It is reported that in lithium secondary batteries where these materials are used, a nonaqueous solvent in a nonaqueous electrolytic solution may partly undergo local oxidative decomposition at the interface between a positive electrode material and the nonaqueous electrolytic solution when the temperature is increased during charging. This results in generation of decomposition products and gases. As a result, the desired electrochemical reaction of the battery may be interfered with, which in turn, may decrease battery performances such as cycle characteristics. As in the negative electrode, a film may also be formed on the surface of the positive electrode due to oxidatively decomposed products. This film is also known to play an important role. For example, oxidative decomposition of a solvent may be prevented, and the battery gas yield may be reduced.

As described above, conventional lithium secondary batteries have a problem in that decomposition products and gases generated when a nonaqueous electrolytic solution decomposes on a positive electrode and a negative electrode may interfere with the movement of lithium ions, and may cause the expansion of a battery. These may be responsible for decreased battery performance.

In order to overcome the above problems and further improve battery performance such as long term durability and output characteristics, it is important to form an SEI having a high ion conductivity, a low electron conductivity, and a long-term stability. To this end, attempts have been widely made for intentionally forming a good SEI by adding a small amount (usually 0.01 mass % or more and 10 mass % or less) of a compound called an additive to an electrolytic solution.

For example, in a secondary battery where a graphite-based negative electrode with a high degree of crystallinity is used, a nonaqueous electrolytic solution containing, for example, vinylene carbonate, vinylethylene carbonate, maleic anhydride, phthalic anhydride, and/or the like has been used to minimize decomposition of the nonaqueous electrolytic solution to obtain a high capacity. Further, attempts have been made for improving storage properties and cycle characteristics at high temperature (Patent Documents 1, 2, 3, and 4). However, these are still less than satisfactory. For example, use of a nonaqueous electrolytic solution including ethylene carbonate as the main solvent and containing 0.01 to 10.0 mass % of vinylene carbonate relative to ethylene carbonate can not sufficiently prevent an increased internal resistance of a battery when stored at high temperature. Moreover, Patent Document 5 discloses a nonaqueous electrolyte battery in which an electrolytic solution containing a diisocyanate compound is used. This represents an attempt for improving the long-term storage reliability of a battery and others.

Meanwhile, the following methods have been considered: a method of improving the thermal stability of an electrolytic solution by using lithium bis(oxalato)borate as an Li salt in place of a common Li salt such as $LiPF_6$ and $LiBF_4$; and a method of improving life-time performance by preventing generation of hydrofluoric acid which is responsible for elution of transition metal contained in a positive-electrode active material (Patent Document 6). Further, a nonaqueous electrolytic solution is disclosed which contains a lithium salt having an oxalato complex such as lithium bis(oxalato)borate as an anion and at least one film-forming agent selected from the group consisting of vinylene carbonate, vinylethylene carbonate, ethylene sulfite, and fluoroethylene carbonate (Patent Document 7).

A nonaqueous electrolytic solution is disclosed containing a phosphorus-boron complex and the like as an additive for forming an effective SEI, such as a lithium difluoro(oxalato) borate (Patent Document 8). Further, disclosed is a means for providing a lithium-ion secondary battery capable of having an outstanding regeneration output, which is configured to have a hard-carbon negative electrode and a predetermined capacity ratio of positive electrode/negative electrode, and contains a similar phosphorus-boron complex as a nonaqueous electrolytic solution (Patent Document 9). Further, proposals for improving input and output characteristics at low temperature are disclosed in which vinylene carbonate or fluoroethylene carbonate and lithium difluoro (bisoxalato)phosphate are included each in predetermined amounts (Patent Documents 10 and 11). Moreover, a proposal for improving battery characteristics such as battery capacity, cycle characteristics, and storage properties is disclosed in which an electrolytic solution is used containing lithium difluoro(oxalato-O,O')borate or lithium tetrafluoro (oxalato-O,O')phosphate and a carbonate ester of an unsaturated compound such as vinylene carbonate and vinylethylene carbonate as an additive (Patent Document 12).

Patent Document 13 describes a proposal for improving durability and loading characteristics such as cycles and storage, including at least one selected from the group consisting of compounds in which a triple bond is bonded to a ring structure via a single bond without via another functional group or a hetero atom (4-ethynylethylene carbonate, 4-ethynyl-1,3,2-dioxathiolane-2,2-dioxide, and the like); and further compounds such as $LiPO_2F_2$ and $LiSO_3F$; lithium salts of oxalato complexes such as lithium bis (oxalato)borate, lithium difluorooxalatoborate, lithium tetrafluorooxalatophosphate, lithium difluorobis(oxalato)phosphate, and lithium tris(oxalato)phosphate; and carbonates having at least one carbon-carbon unsaturated bond or fluorine atom.

Patent Document 14 describes a proposal for improving discharge capacity, initial charge/discharge efficiency, and loading characteristics, including a lithium-transition metal composite oxide having the stratified rock-salt structure in a positive electrode, a nonaqueous solvent containing a fluorinated solvent (fluorinated carbonate and the like) in a range between 20 and 100 vol % relative to the nonaqueous solvent, and further at least one compound selected from the group consisting of compounds each having a carbon-nitrogen unsaturated bond, compounds each having a substituent having a carbon-carbon unsaturated bond, and compounds each having a structure of sulfonic acid ester.

Further, Patent Document 15 describes a proposal for improving charge-discharge cycle characteristics, in which a negative electrode includes an element capable of undergoing an alloying reaction with lithium or a compound of an element capable of undergoing an alloying reaction with lithium, and a nonaqueous solvent includes fluorinated ethylene carbonate, and an additive is included such as lithium difluorobis(oxalato)phosphate, lithium difluorooxalatoborate, and lithium tetrafluorooxalatophosphate.

Patent Document 16 discloses an electrolytic solution which can improve a low-temperature property (the ratio of discharge capacities of −20° C./25° C.) at 0° C. or below as well as cycle characteristics and high-temperature storage properties, the electrolytic solution including both a difluoro (bisoxalato)phosphate salt and a tetrafluoro(oxalato)phosphate salt.

It is noted that Patent Document 19 discloses a method of manufacturing a phosphorus-boron complex such as lithium difluorooxalatoborate used as an electrolyte for electrochemical devices. Further, Patent Document 17 discloses a method of manufacturing lithium tris(oxalato)phosphate. Patent Document 18 discloses that cycle characteristics and storage properties can be improved when a diisocyanate compound (hexamethylene diisocyanate), which is one of the compounds having carbon-nitrogen unsaturated bonds, is added to a nonaqueous electrolytic solution.

Nonpatent Document 1 discloses a method of manufacturing a fluoro complex having silicon or the like in the complex center.

Patent Document 1: Japanese Unexamined Patent Application, Publication No. H08-045545
Patent Document 2: Japanese Unexamined Patent Application, Publication No. 2001-006729
Patent Document 3: Japanese Unexamined Patent Application, Publication No. H05-074486
Patent Document 4: Japanese Unexamined Patent Application, Publication No. 2001-057235
Patent Document 5: Japanese Unexamined Patent Application, Publication No. 2007-242411
Patent Document 6: Japanese Unexamined Patent Application (Translation of PCT Application), Publication No. 2002-519352
Patent Document 7: Japanese Unexamined Patent Application, Publication No. 2006-196250
Patent Document 8: Japanese Unexamined Patent Application, Publication No. 2002-110235
Patent Document 9: Japanese Unexamined Patent Application, Publication No. 2007-335143
Patent Document 10: PCT International Publication No. WO2010/067549
Patent Document 11: PCT International Publication No. WO2012/102259
Patent Document 12: Japanese Unexamined Patent Application, Publication No. 2005-05115 (Japanese Patent No. 4423888)
Patent Document 13: PCT International Publication No. WO2011/142410
Patent Document 14: Japanese Unexamined Patent Application, Publication No. 2013-030284
Patent Document 15: PCT International Publication No. WO2013/132824
Patent Document 16: Japanese Unexamined Patent Application, Publication No. 2011-22193
Patent Document 17: Japanese Unexamined Patent Application (Translation of PCT Application), Publication No. 2003-505464 (Japanese Patent No. 4695802)
Patent Document 18: PCT International Publication No. WO2012/117911

Patent Document 19: Japanese Unexamined Patent Application, Publication No. 2003-137890

Non-Patent Document 1: J. Chem. Soc. (A), 1970, 15, 2569-2574

DISCLOSURE OF THE INVENTION

Problems to be Solved by the Invention

Nonetheless, further improvements in output characteristics at a low temperature of 0° C. or less, storage properties at a high temperature of 60° C. or more, and others have been desired for the aforementioned nonaqueous electrolytic solutions as recent demands for high-performance batteries increase. That is, although not a small number of practical nonaqueous electrolytic solution batteries, which are typically lithium ion batteries, are already available, an electrolytic solution having sufficient properties has not yet been obtained for applications where batteries may potentially be used under more harsh environments, including in-vehicle batteries and stationary batteries used outdoors in the midwinter or midsummer. For example, Patent Document 18 describes a problem in that addition of a diisocyanate compound in a nonaqueous electrolytic solution can improve cycle characteristics and storage properties, but may deteriorate low-temperature properties, and in particular may decrease the charge and discharge capacities under low-temperature environments.

Specifically, high output characteristics at a low temperature of 0° C. or less are strongly desired to allow a nonaqueous electrolytic solution battery to operate at a high output without aid of thermal insulation and heating even in cold climate areas. In order to achieve this, various electrolytic solutions have been proposed to date. However, the majority of them remain unsatisfactory in that the output characteristics are significantly decreased after batteries are used to some extent (charge-discharge cycles have been performed for certain times; or storage history at a high temperature of 60° C. or more is long) although the initial output characteristics are improved. Therefore, an electrolytic solution is strongly desired which shows high output characteristics at low temperature even after a certain number of charge-discharge cycles or after stored at high temperature. Moreover, good high-rate properties are required even after a certain number of charge-discharge cycles have been performed in order to enable high-speed charging and high-power discharging.

Means for Solving the Problems

In view of the above circumstances, the present inventors conducted extensive studies about six-coordinate ionic complexes which can be present in their cis- or trans-isomers. After comparing effects of separate addition of the cis- and trans-isomer, the present inventors found that a cis isomer shows a higher effect for improving output characteristics at low temperature after cycle durability tests. Further, an object of the present invention is to provide a nonaqueous electrolytic solution and a nonaqueous electrolytic solution battery capable of showing high output characteristics at a low temperature of 0° C. or less even after the battery is used to some extent, and capable of showing large charge and discharge capacities at a high rate under ordinary temperature, and further capable of showing sufficient performance again at low temperature even after stored at a high temperature of 60° C. or more, in which the aforementioned six-coordinate ionic complex in the cis configuration and a specific compound are both included.

That is, the present invention provides a nonaqueous electrolytic solution containing a nonaqueous organic solvent and an electrolyte dissolved in the nonaqueous organic solvent, the nonaqueous electrolytic solution including:

(I) a difluoro ionic complex (1-Cis) in the cis configuration represented by the general formula (1-Cis), and (II) at least one compound selected from the group consisting of a carbonate having an unsaturated bond, a carbonate having a fluorine atom, an acid anhydride, and a compound having an isocyanato group.

wherein in (1-Cis),

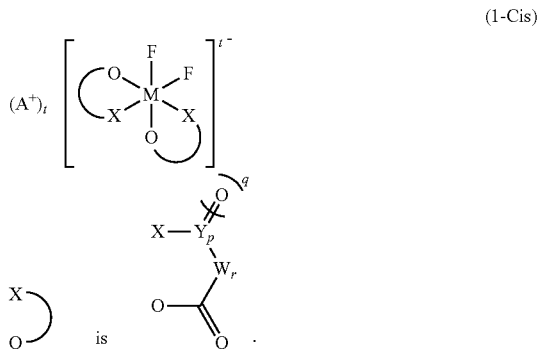

(1-Cis)

In the general formula (1-Cis), $A^+$ is any one selected from the group consisting of a metal ion, a proton, and an onium ion, and M is any one selected from the group consisting of Si, P, As, and Sb. F is a fluorine atom, and O is an oxygen atom.

t is 2 when M is Si, and t is 1 when M is P, As, or Sb. X is an oxygen atom or —$N(R^1)$—. N is a nitrogen atom, and $R^1$ is a hydrocarbon group having 1 to 10 carbon atoms and optionally having a hetero atom and/or a halogen atom (the hydrocarbon group optionally having a branched-chain or ring structure when the number of carbon atoms is 3 or more). When X is —$N(R^1)$—, and p is 0, X and W are directly bonded and may form a structure as shown in the general formulas (1-cis-1) to (1-cis-3) below. In the case of the general formula (1-cis-2) below where the direct bond is a double bond, $R^2$ is not present.

(1-cis-1)

(1-cis-2)

(1-cis-3)

Y is a carbon atom or a sulfur atom. q is 1 when Y is a carbon atom. q is 1 or 2 when Y is a sulfur atom. W represents a hydrocarbon group having 1 to 10 carbon atoms and optionally having a hetero atom and/or a halogen atom (the hydrocarbon group optionally having a branched-chain or ring structure when the number of carbon atoms is 3 or more), or —N(R$^2$)—. Here, R$^2$ represents a hydrogen atom, an alkaline metal, or a hydrocarbon group having 1 to 10 carbon atoms and optionally having a hetero atom and/or a halogen atom. When the number of carbon atoms is 3 or more, R$^2$ may have a branched-chain or ring structure.

p is 0 or 1, and q is an integer of 0 to 2, and r is an integer of 0 to 2. Further, p+r≥1.

Further, the present invention provides a nonaqueous electrolytic solution battery including the aforementioned nonaqueous electrolytic solution, a positive electrode, a negative electrode, and a separator.

Effects of the Invention

The present invention can provide a nonaqueous electrolytic solution and a nonaqueous electrolytic solution battery capable of showing high output characteristics at a low temperature of 0° C. or less even after the battery is used to some extent, and capable of showing good high-rate properties, and further capable of showing sufficient performance again at low temperature even after stored at a high temperature of 60° C. or more.

BRIEF DESCRIPTION OF THE DRAWINGS

FIG. 1 shows an analysis result from the single crystal X-ray structural analysis of (1a-Cis) according to Synthesis Example 1.

PREFERRED MODE FOR CARRYING OUT THE INVENTION

1. Nonaqueous Electrolytic Solution

The nonaqueous electrolytic solution according to the present invention is characterized by including a nonaqueous organic solvent and an electrolyte dissolved in the nonaqueous organic solvent, and further including the difluoro ionic complex (1-Cis) in the cis configuration represented by the general formula (1-Cis) and at least one compound selected from the group consisting of compounds of (II) shown below.

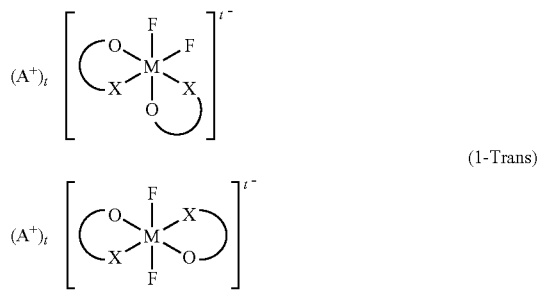

wherein in (1-Cis) and (1-Trans),

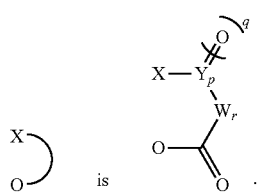

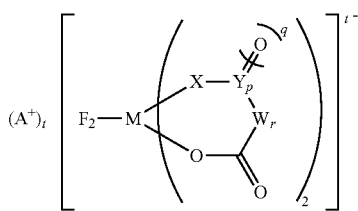

In the general formulas (1-Cis) and (1-Trans), A$^+$ is any one selected from the group consisting of a metal ion, a proton, and an onium ion, and M is any one selected from the group consisting of Si, P, As, and Sb. F is a fluorine atom, and O is an oxygen atom. t is 2 when M is Si, and t is 1 when M is P, As, or Sb. X is an oxygen atom or —N(R$^1$)—. N is a nitrogen atom, and R$^1$ is a hydrocarbon group having 1 to 10 carbon atoms and optionally having a hetero atom and/or a halogen atom (the hydrocarbon group optionally having a branched-chain or ring structure when the number of carbon atoms is 3 or more). When X is —N(R$^1$)—, and p is 0, X and W are directly bonded and may form a structure as shown in the general formulas (2) to (4) below. In the case of the general formula (3) below where the direct bond is a double bond, R$^1$ is not present.

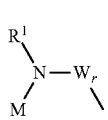

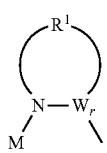

Y is a carbon atom or a sulfur atom. q is 1 when Y is a carbon atom. q is 1 or 2 when Y is a sulfur atom. W represents a hydrocarbon group having 1 to 10 carbon atoms and optionally having a hetero atom and/or a halogen atom (the hydrocarbon group optionally having a branched-chain or ring structure when the number of carbon atoms is 3 or more), or —N(R$^2$)—. Here, R$^2$ represents a hydrogen atom, an alkaline metal, or a hydrocarbon group having 1 to 10 carbon atoms and optionally having a hetero atom and/or a halogen atom. When the number of carbon atoms is 3 or more, R$^2$ may have a branched-chain or ring structure. p is 0 or 1, and q is an integer of 0 to 2, and r is an integer of 0 to 2. Further, p+r≥1.

The difluoro ionic complex (1) is a six-coordinate complex in which bidentate ligands are bidentately coordinated to the central element M, and fluorine (hereinafter, referred to as F) is further bidentately coordinated. A complex in which a ligand is coordinated to the central element M (Si, P, As, Sb) through oxygen or nitrogen is stable, and very slowly undergoes isomerization due to exchange of the ligand in the absence of a catalyst. This can allow for separation of two conformational isomers: a cis isomer (1-Cis) in which two fluorine atoms are bonded in the same side when viewed from the central element and a trans isomer (1-Trans) in which they are bonded in the opposite sides.

A cis/trans mixture will be obtained when concentrating a reaction liquid of the difluoro ionic complex (1) obtained after excessively promoting the reaction under a modified version of the conditions described in Patent Document 19, or a reaction liquid of the difluoro ionic complex (1) obtained by fluorinating a three-molecule coordination product synthesized in accordance with Patent Document 17. When the mixture are repeatedly crystallized in a mixed solvent of a carbonate ester and a chlorinated solvent (both in the filtrate and the mother liquor), (1-Cis) and (1-Trans) each with a purity of 99.9 mol % or more can be obtained separately. Further, (1-Cis) and (1-Trans) may be each obtained by selective synthesis.

(1-Cis) and (1-Trans) each preferably have a purity of 95 mol % or more, more preferably 98 mol % or more, and even more preferably 99 mol % or more.

A difluoro ionic complex to be added to the electrolytic solution for nonaqueous electrolytic solution batteries according to the present invention is not a mixture of the equal amount of cis/trans, but the percentage of (1-Cis) in the difluoro ionic complex to be included in the electrolytic solution for nonaqueous electrolytic solution batteries is preferably 95 mol % or more. That is, the mass ratio (1-Trans)/(1-Cis) of (1-Trans) to (1-Cis) is preferably 0.05 or less even when (1-Trans) is included in the electrolytic solution for nonaqueous electrolytic solution batteries.

No matter whether the difluoro ionic complex is a cis isomer or a trans isomer, elements in the difluoro ionic complex (1) are preferably in any of the following combinations selected from (1a) to (1d) below.
(1a) M=P; X=O; Y=C; p, q, and t=1; and r=0
(1b) M=P; X=O; W=C(CF$_3$)$_2$; p and q=0; and r and t=1
(1c) M=Si; X=O; Y=C; p and q=1; t=2; and r=0
(1d) M=P; X=N(R$^1$); Y=C; R$^1$=CH$_3$; p, q, and t=1; and r=0

Further, there is no particular limitation for A$^+$ as a cation of the difluoro ionic complex (1), where A$^+$ is any one selected from the group consisting of a metal ion, a proton, and an onium ion, as long as it does not impair the performance of the nonaqueous electrolytic solution and the nonaqueous electrolytic solution battery according to the present invention, but a lithium ion, a sodium ion, a potassium ion, or a quaternary alkylammonium ion is preferred in view of helping ionic conductance in a nonaqueous electrolytic solution battery. There is no particular limitation for the quaternary alkylammonium ion, but examples include trimethylpropylammonium and 1-butyl-1-methylpyrrolidinium.

For example, the difluoro ionic complexes (1a-Cis) and (1a-Trans) in which A=Li; M=P; X=O; Y=C; p, q, and t=1; and r=0 are not readily isomerized under neutral conditions. The ratio of (1a-Cis) and (1a-Trans) does not change at 40° C. after 4 hours in solutions of ethylmethyl carbonate where (1a-Cis) and (1a-Trans) are mixed in 1:9 or 5:5.

The nonaqueous electrolytic solution according to the present invention preferably contains an electrolyte, a nonaqueous solvent or a polymer mixture, and one or more ionic complexes selected from the cis-coordinated ionic complexes represented by the general formula (1-Cis) in an amount of 0.001 mass % or more and 20.0 mass % or less. Inclusion of (1-Cis) can significantly improve output characteristics (in particular, output characteristics at low temperature after charge and discharge are repeated). The content of (1-Cis) in the nonaqueous electrolytic solution is preferably 0.01 mass % or more and 10.0 mass % or less. More preferably, the content is 0.1 mass % or more and 3.0 mass % or less. A content of less than 0.001 mass % may result in an insufficient effect for improving output characteristics of a nonaqueous electrolytic solution battery at low temperature. On the other hand, a content of more than 10.0 mass % may excessively increase the viscosity of an electrolytic solution to interfere with movement of cations in a nonaqueous electrolytic solution battery, resulting in decreased battery performance.

Further, the group (II) compounds described above preferably consist of (II-1) to (II-4) shown below.
(II-1) a carbonate having an unsaturated bond represented by the general formula (II-1a) and/or (II-1b).
(II-2) a carbonate having a fluorine atom represented by the general formula (II-2a).
(II-3) an acid anhydride represented by the general formula (II-3a).
(II-4) a compound having an isocyanato group represented by the general formula (II-4a). These may be used alone, or may be used in combination of two or more if appropriate.

(II-1a)

wherein O is an oxygen atom, R$^3$ and R$^4$ are each independently a hydrogen atom, an alkyl group, a hydrocarbon group having an unsaturated bond, an alkoxy group, a halogen, an alkyl group having a halogen, or an aryl group, provided that R$^3$ and R$^4$ may include an ether linkage.

(II-1b)

wherein O is an oxygen atom, and R$^5$ is an alkyl group, a hydrocarbon group having an unsaturated bond, or an alkoxy group. R$^6$ is a hydrogen atom, an alkyl group, a hydrocarbon group having an unsaturated bond, or an alkoxy group, provided that R$^5$ and R$^6$ may include an ether linkage. It is noted that propylene carbonate is not included in (II-1b).

(II-2a)

wherein O is an oxygen atom, R$^7$ to R$^{10}$ are each independently a hydrogen atom, an alkyl group, a hydrocarbon group having an unsaturated bond, an alkoxy group, a halogen, an alkyl group having a halogen, or an aryl group, provided that at least one of $R^7$ to $R^{10}$ has a fluorine atom, and $R^7$ to $R^{10}$ may include an ether linkage.

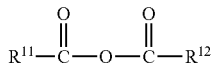 (II-3a)

wherein O is an oxygen atom, and C is a carbon atom, and $R^{11}$ and $R^{12}$ are each independently a hydrogen atom, a halogen atom, an alkyl group having 1 to 12 carbon atoms, a haloalkyl group having 1 to 12 carbon atoms, or an alkenyl group having 2 to 12 carbon atoms, and either one of $R^{11}$ and $R^{12}$ is a halogen atom, an alkyl group having 1 to 12 carbon atoms, or a haloalkyl group having 1 to 12 carbon atoms. $R^{11}$, $R^{12}$, and a carbon atom to which they are bonded may be joined together to form a cycloaliphatic acid anhydride.

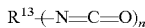 (II-4a)

wherein N represents a nitrogen atom, and C represents a carbon atom, and O represents an oxygen atom, and $R^{13}$ is a chain hydrocarbon having 1 to 10 carbon atoms, and n represents an integer of 1 to 2.

Examples of the carbonate having an unsaturated bond represented by the general formula (II-1a) include vinylene carbonate derivatives. For example, at least one selected from the group consisting of vinylene carbonate, fluorovinylene carbonate, methylvinylene carbonate, fluoromethylvinylene carbonate, ethylvinylene carbonate, propylvinylene carbonate, butylvinylene carbonate, dipropylvinylene carbonate, 4,5-dimethylvinylene carbonate, 4,5-diethylvinylene carbonate, trifluoromethylvinylene carbonate, and the like is more preferred. Among these, vinylene carbonate is more preferred.

As the carbonate having an unsaturated bond represented by the general formula (II-1b), preferred is, for example, at least one selected from the group consisting of vinylethylene carbonate, ethynylethylene carbonate, divinylethylene carbonate, vinyloxyethylene carbonate, and the like. Among these, vinylethylene carbonate and ethynylethylene carbonate are more preferred.

As the carbonate having a fluorine atom represented by the general formula (II-2a), preferred is, for example, at least one selected from the group consisting of fluoroethylene carbonate, 4,4-difluoroethylene carbonate, 4,5-difluoroethylene carbonate, 4,5-difluoro-4,5-dimethylethylene carbonate, and the like. Among these, fluoroethylene carbonate and 4,5-difluoroethylene carbonate are preferred. In the case of 4,5-difluoroethylene carbonate, the trans isomer is more preferred than the cis isomer. This is because 4,5-difluoroethylene carbonate (trans isomer) can provide higher ion conductivity, and can form a better interface-protective film.

Examples of the acid anhydride represented by the general formula (II-3a) include, for example, cycloaliphatic anhydrides such as succinic anhydride, glutaric anhydride, maleic anhydride, citraconic anhydride, glutaconic anhydride, itaconic anhydride, 2-methylsuccinic anhydride, 2-allylsuccinic anhydride, 2-(2-methylallyl)succinic anhydride, and the like. Examples of the fluorine-substituted aliphatic acid anhydride include fluorinated carboxylic anhydrides such as trifluoroacetic anhydride, pentafluoropropionic anhydride, and heptafluoro-n-butyric anhydride; and fluorine-substituted cycloaliphatic anhydrides such as difluoromaleic anhydride, tetrafluorosuccinic anhydride, tetrafluorocitraconic anhydride, tetrafluoroglutaconic anhydride, tetrafluoroitaconic anhydride, and hexafluoroglutaric anhydride. Among these, succinic anhydride, maleic anhydride, 2-allylsuccinic anhydride, tetrafluorosuccinic anhydride, and the like are more preferred.

Examples of the compound having an isocyanato group represented by the general formula (II-4a) include, for example, 1-isocyanatoethane, 1-isocyanatopropane, 2-isocyanatopropane, 1-isocyanato-3-methoxypropane, 1-isocyanatohexane, 1-isocyanatobutane, 2-isocyanatobutane, 1,2-diisocyanatoethane, 1,3-diisocyanatopropane, 1,4-diisocyanatobutane, 1,5-diisocyanatopentane, 1,6-diisocyanatohexane, 1,7-diisocyanatoheptane, 1,8-diisocyanatooctane, and the like. Among these, 1-isocyanatoethane, 1,4-diisocyanatobutane, and 1,6-diisocyanatohexane are more preferred.

Further, output characteristics at low temperature after storage at high temperature can be improved by adding a certain amount of (1-Trans) relative to (1-Cis). At this time, the difluoro ionic complex (1-Trans)/the difluoro ionic complex (1-Cis) (mass ratio) is in a range of 0.0001 to 0.05, preferably 0.001 to 0.03, and more preferably 0.002 or more and 0.01 or less.

In the present invention, methods of quantifying the mass ratio (1-Trans)/(1-Cis) of (1-Trans) to (1-Cis) in an electrolytic solution include NMR analysis, liquid chromatography-mass spectrometry (LC-MS), and the like. In NMR analysis, (1-Trans) and (1-Cis) each have a peak in different positions in NMR, and thus the mass ratio can be quantified by measuring the areas of their identified peaks. In LC-MS, the peaks of (1-Trans) and (1-Cis) can be separated using a column, and thus the mass ratio can be quantified by measuring their peak areas.

Further, addition of the tetrafluoro ionic complex (1-Tetra) having tetradentate F atoms to a nonaqueous electrolytic solution containing (1-Cis) or (1-Cis)+(1-Trans) can lead to suppression of an increase in the pressure inside a container when the nonaqueous electrolytic solution is subjected to long-term storage. At this time, the tetrafluoro ionic complex (1-Tetra)/the difluoro ionic complex (1-Cis) (mass ratio) is in a range of 0.02 to 0.25, preferably 0.05 to 0.22, and more preferably 0.07 to 0.20.

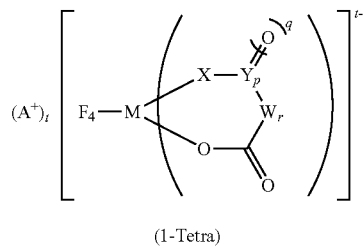

(1-Tetra)

Elements in the anion moiety of the tetrafluoro ionic complex (1-Tetra) are preferably in any of the combinations of elements selected from (Tetra-a), (Tetra-b), (Tetra-c), and (Tetra-d) below.

(Tetra-a) M=P; X=O; Y=C; p, q, and t=1; and r=0
(Tetra-b) M=P; X=O; W=C(CF$_3$)$_2$; p and q=0; and r and t=1
(Tetra-c) M=Si; X=O; Y=C; p and q=1; t=2; and r=0
(Tetra-d) M=P; X=N(R$^1$); Y=C; R$^1$=CH$_3$; p, q, and t=1; and r=0

Further, there is no particular limitation for A$^+$ as a cation of the tetrafluoro ionic complex (1-Tetra), where A$^+$ is any one selected from the group consisting of a metal ion, a proton, and an onium ion, as long as it does not impair the performance of the nonaqueous electrolytic solution and the nonaqueous electrolytic solution battery according to the present invention, but a lithium ion, a sodium ion, a potassium ion, or a quaternary alkylammonium ion is preferred in view of helping ionic conductance in a nonaqueous electrolytic solution battery. There is no particular limitation for the quaternary alkylammonium ion, but examples include trimethylpropylammonium and 1-butyl-1-methylpyrrolidinium.

It is noted that a low-temperature property (the ratio of discharge capacities of −20° C./25° C.) at 0° C. or below as well as cycle characteristics and high-temperature storage properties is improved when an electrolytic solution including both an ionic complex (1-Tetra) where the anion moiety is (Tetra-a) and A=Li (hereinafter referred to as (5a-Tetra)) and an ionic complex (1-Cis) where the anion moiety is (Cis-a) and A=Li (hereinafter referred to as (1a-Cis)) is used. Further, the tetrafluoro ionic complex (1-Tetra) does not have conformational isomers.

Although a six-coordinate ionic complex having two types of ligands (one of them is F) which can be present as its cis- or trans-isomer as shown in the difluoro ionic complex (1) has been used as described in Patent Document 8, the effects of the cis isomer alone and the trans isomer alone have not closely studied separately. In the present application, a cis isomer alone or a trans isomer alone was separately added to compare their individual effects. Results revealed that the cis isomer showed a better effect for improving output characteristics at low temperature after cycle durability tests.

When voltage is applied to a nonaqueous electrolytic solution containing a difluorophosphate complex having P as the central element selected from the difluoro ionic complexes (1), the difluorophosphate complex is reductively decomposed to generate a reduction-reaction decomposition product (intermediate) with a very short life time in the system. It may react with a functional group present on the surface of a negative electrode to form a SEI on the negative electrode. The SEI mainly includes a derivative of difluorophosphoric acid and a derivative of carbonic acid.

Reduction-reaction decomposition products from reduction reactions are likely different between the cis isomer and the trans isomer due to steric and electronic factors, resulting in different selectivities and rates for a reaction with a functional group on the surface of an electrode. First, steric factors will be discussed with regard to the initiation of a reduction reaction between a negative electrode and difluorophosphate complexes (cis, trans). A difluorophosphate complex receives an electron from a negative electrode at a portion of a ligand other than F (for example, a carbon atom on the carbonyl group in the case of 1a) where the reduction reaction is initiated. Accordingly, the electron needs to approach the negative electrode from a side where F is not bonded to initiate the reduction reaction. The trans isomer has F atoms bonded at the upper and lower sides of the molecule. Consequently, the reduction reaction is initiated only when an electron approaches an electrode from either right or left, i.e., from a range of total 180° in the horizontal direction except for 180° in the vertical direction. In contrast, the cis isomer has F atoms only in the same side, and thus an electron can approach from a range of 200° to 250° in the opposite side. This increases the probability of initiation of the reduction reaction as compared with the trans isomer.

Next, electronic factors will be discussed. The LUMO level is slightly lower for the cis isomer than for the trans isomer. Therefore, the cis isomer more readily receives an electron from an electrode, leading to a more rapidly proceeding reduction reaction.

Further, the difluorophosphate complex before decomposition is a six-coordinate phosphorus compound while the difluoro phosphoric acid derivative as the main component of SEI after decomposition is a five-coordinate phosphorus compound. It undergoes transform from six-coordination to five-coordination when the difluorophosphate complex decomposes to generate a highly active intermediate, and the intermediate reacts with a functional group on the surface of a negative electrode. For the trans isomer, the bond angle of F—P—F before decomposition (six-coordination) is 180° while the bond angle of F—P—F after decomposition (five-coordination) is about 100°. Therefore, a large structural change is required. On the other hand, the cis isomer shows only a small change of from 90° (before decomposition, six-coordination) to about 100° (after decomposition, five-coordination). As clearly understood from the above, the energy required for the transition state of the reductive decomposition reaction is smaller in the cis isomer without a large structural change, and thus the reductive decomposition of the cis isomer is more favored than that of the trans isomer. This is not limited to a complex having phosphorus as the central element, but also can be applied to arsenic, antimony, and silicon.

Considering that the reductive decomposition reaction proceeds in different rates between the cis isomer and the trans isomer, the difference in the performance of SEI formed therefrom will be discussed.

The reductive decomposition reaction rapidly proceeds in the cis isomer to rapidly form an SEI which mainly contains a derivative of difluorophosphoric acid and a derivative of carbonic acid. To date, it has been revealed that an SEI consisting of a derivative of difluorophosphoric acid has an excellent effect for improving the cycle characteristics, high-temperature storage properties, and output characteristics of a battery while an SEI consisting of a derivative of carbonic acid has an excellent effect for improving the cycle characteristics and high-temperature storage properties. The reductive decomposition reaction of the trans isomer is slower as compared with that of the cis isomer, and thus prompt formation of an SEI consisting only of a derivative of difluorophosphoric acid and a derivative of carbonic acid is difficult to obtain. Due to this, the reduction reaction of a solvent also proceeds concomitantly with it, resulting in formation of an SEI mainly containing a mixture of a derivative of difluorophosphoric acid and a derivative of carbonic acid from the difluorophosphate complex, and carbonic acid and an alkyl carbonate salt from a solvent. (the difluorophosphate complex is much more susceptible to decomposition than a solvent, but the number of solvent molecules is enormously large, and thus decomposition of a solvent also proceeds although it is very little.)

An SEI consisting of an alkyl carbonate salt included therein can improve cycle characteristics and high-temperature storage properties, but may decrease cation conductivity as compared with an SEI consisting of a derivative of carbonic acid due to a reduced ratio of oxygen. Therefore, output characteristics may be improved only marginally, or may even be decreased.

As described above, the different rates of the reductive decomposition reaction between the cis isomer and the trans isomer may alter the selectivity of the reductive decomposition reaction (the presence or absence of solvent decomposition), resulting in different main components in SEIs formed therefrom. This is likely responsible for the difference in the effects of SEIs for improving the battery performance in the end.

As described above, output characteristics at low temperature after high-temperature storage can be improved by adding (1-Trans) in a certain amount relative to (1-Cis). The reasons of this will be discussed similarly in terms of the different properties of SEIs between the cis isomer and the trans isomer. In a lithium battery, lithium is gradually released from a negative electrode in a fully charged condition to react with a solvent during high-temperature storage as oxidative decomposition of the solvent proceeds on the surface of a positive electrode maintained at a high potential. Due to this, highly resistive decomposition products accumulate on the positive and negative electrodes. Further, reversibly available lithium is decreased, resulting in decreased battery performance (the charge-and-discharge rate and capacity are decreased). A negative-electrode SEI consisting of an alkyl carbonate salt has a low ionic conductivity, and thus is disadvantageous for output characteristics. However, it can reduce the release of lithium from the negative electrode during high-temperature storage to prevent a decreased capacity after high-temperature storage. As a result, a high capacity is maintained after high-temperature storage. When high-rate discharge capacities (output characteristics) at low temperature are compared after high-temperature storage, the amount of electricity obtained at high-rate discharge as compared with low-rate discharge is lower as compared with an electrolytic solution of (1-Cis) only. However, the absolute values of the amount of electricity obtained at high-rate discharge is higher for an electrolytic solution having a certain amount of (1-Trans) relative to (1-Cis) than an electrolytic solution having (1-Cis) only because the starting capacity is higher.

In the tetrafluoro ionic complex (1-Tetra) having tetradentate F atoms, a ligand other than F has lower electron density as compared with the difluoro ionic complex (1) having bidentate F atoms because of the strong electron-withdrawing effect of F. This makes the ligand more susceptible to a nucleophilic attack. Therefore, if a trace amount of water is present in an electrolytic solution, (1-Tetra) is selectively hydrolyzed instead of (1). For example, when the central element M is P, the moiety of tetrafluorophosphoric acid of (1-Tetra) is converted into a salt of hexafluorophosphoric acid by hydrolysis (a ligand other than F is disproportioned after leaving). The ligand moiety other than F leaves from the central element P, and is decomposed to release carbon dioxide and carbon monoxide. The amount of carbon dioxide and carbon monoxide released at this time is ½ mol equivalent relative to (1). This can significantly reduce the yield of carbon dioxide and carbon monoxide which otherwise may increase the internal pressure.

In general, a nonaqueous electrolytic solution is called a nonaqueous electrolyte when a nonaqueous solvent is used, and called a polymeric solid electrolyte when a polymer is used. Polymeric solid electrolytes include those containing a nonaqueous solvent as a plasticizing agent. It is noted that an electrochemical device is referred to as a nonaqueous electrolytic solution battery, the device including the present nonaqueous electrolytic solution; a negative-electrode material enabling reversible insertion and desorption of an alkali metal ion such as a lithium ion and a sodium ion or an alkaline earth metal ion; and a positive-electrode material enabling reversible insertion and desorption of an alkali metal ion such as a lithium ion and a sodium ion or an alkaline earth metal ion.

There is no particular limitation for the electrolyte, and salts of any cations and any anions can be used. As specific examples, cations include alkali metal ions such as a lithium ion and a sodium ion; alkaline earth metal ions; quaternary alkylammonium ions; and the like. Anions include anions of hexafluorophosphoric acid, tetrafluoroboric acid, perchloric acid, hexafluoroarsenic acid, hexafluoroantimonic acid, trifluoromethanesulfonic acid, bis(trifluoromethanesulfonyl)imide, bis(pentafluoroethanesulfonyl)imide, (trifluoromethanesulfonyl) (pentafluoroethanesulfonyl)imide, bis(fluorosulfonyl)imide, (trifluoromethanesulfonyl) (fluorosulfonyl)imide, (pentafluoroethanesulfonyl) (fluorosulfonyl)imide, tris (trifluoromethanesulfonyl)methide, bis (difluorophosphonyl)imide, and the like. These electrolytes may be used alone, or may be used in a mixture in any combination or ratio of two or more depending on applications. Among these, cations of lithium, sodium, magnesium, and quaternary alkylammonium are preferred as cations, and anions of hexafluorophosphoric acid, tetrafluoroboric acid, bis(trifluoromethane sulfonyl)imide, bis(fluorosulfonyl)imide, and bis(difluoro phosphonyl)imide are preferred as anions in view of energy density, output characteristics, lifetime, and the like of a battery.

There is no particular limitation for the nonaqueous solvent as long as it is an aprotic solvent in which the ionic complex according to the present invention can be dissolved. For example, carbonates, esters, ethers, lactones, nitriles, imides, sulfones, and the like can be used. Further, they may be used alone or as a mixed solvent of two or more. Specific examples can include ethylmethyl carbonate, dimethyl carbonate, diethyl carbonate, methylpropyl carbonate, ethylpropyl carbonate, methylbutyl carbonate, ethylene carbonate, propylene carbonate, butylene carbonate, methyl acetate, ethyl acetate, methyl propionate, ethyl propionate, diethyl ether, acetonitrile, propionitrile, tetrahydrofuran, 2-methyltetrahydrofuran, furan, tetrahydropyran, 1,3-dioxane, 1,4-dioxane, dibutyl ether, diisopropyl ether, 1,2-dimethoxyethane, N,N-dimethylformamide, dimethyl sulfoxide, sulfolane, γ-butyrolactone, γ-valerolactone, and the like.

Further, the nonaqueous solvent preferably contains at least one selected from the group consisting of cyclic carbonates and chain carbonates. Examples of cyclic carbonates can include ethylene carbonate and propylene carbonate, and examples of chain carbonates can include ethylmethyl carbonate, dimethyl carbonate, diethyl carbonate, and methylpropyl carbonate.

There is no particular limitation for the polymer which can be used to obtain a polymeric solid electrolyte including the ionic complex according to the present invention as long as it is an aprotic polymer in which the aforementioned ionic complexes and the aforementioned electrolyte can be solved. Examples can include polymers having polyethylene oxide in their main chains or side chains, homopolymers or copolymers of polyvinylidene fluoride, methacrylate ester polymers, polyacrylonitrile, and the like. When a plasticizing agent is added to these polymers, the above aprotic nonaqueous solvents may be used.

In the present invention, there is no particular limitation for the concentration of a electrolyte in these ion conductors, but the lower limit is preferably 0.5 mol/L or more, more preferably 0.7 mol/L or more, and even more preferably 0.9 mol/L or more, and the upper limit is 5.0 mol/L or less, preferably 4.0 mol/L or less, and more preferably 2.0 mol/L or less. A concentration of less than 0.5 mol/L may decrease cycle characteristics and output characteristics of a nonaqueous electrolytic solution battery due to decreased ion conductivity. On the other hand, a concentration of more than 5.0 mol/L may increase the viscosity of a nonaqueous electrolytic solution, decreasing cycle characteristics and output characteristics of a nonaqueous electrolytic solution battery again due to decreased ion conductivity.

When a lithium salt is dissolved in manufacture of a nonaqueous electrolytic solution, the solution temperature of the nonaqueous electrolytic solution is controlled at 40° C. or below. This can prevent generation of free acid such as hydrogen fluoride (HF) which may be produced when a lithium salt in a nonaqueous electrolytic solution reacts with water in the system to undergo decomposition. As a result, decomposition of a nonaqueous solvent can also be prevented. Therefore, deterioration of the nonaqueous electrolytic solution can be prevented effectively. Further, in the step of dissolving a lithium salt, the lithium salt is added in small portions until the concentration of the entire lithium salt becomes 0.5 to 4.0 mol/L to prepare a solution. This can prevent generation of free acids such as HF in a similar manner. For example, the following are preferably performed to maintain the solution temperature at 40° C. or below. A portion in a range of 10 to 35 mass % of the entire lithium salt is first added and dissolved in a nonaqueous solvent, and another portion in a range of 10 to 35 mass % of the entire lithium salt is then added and dissolved. This operation is repeated for 2 to 9 times, and then finally the remaining lithium salt is gradually added and dissolved. In particular, when the nonaqueous electrolytic solution according to the present invention is prepared, an increased solution temperature of the nonaqueous electrolytic solution during preparation may promote the aforementioned side reactions. Therefore, deterioration of the nonaqueous electrolytic solution can be prevented by preventing an increase in temperature so that the solution temperature of the nonaqueous electrolytic solution is controlled at 40° C. or below. This can assure the quality of the nonaqueous electrolytic solution.

Further, a common additive may be added in any ratio to the nonaqueous electrolytic solution according to the present invention unless the spirit of the present invention is impaired. Specific examples can include compounds having effects for preventing overcharging, for forming a film on a negative-electrode, and for protecting a positive electrode such as cyclohexylbenzene, biphenyl, tert-butylbenzene, tert-amylbenzene, biphenyl, o-terphenyl, 4-fluorobiphenyl, fluorobenzene, 2,4-difluorobenzene, difluoroanisole, 1,3-propanesultone, 1,3-propenesultone, methylenemethane disulfonate, dimethylenemethane disulfonate, and trimethylenemethane disulfonate. Further, the nonaqueous electrolytic solution can be used after solidified with a gelatinizing agent or a crosslinked polymer as used in a nonaqueous electrolytic solution battery called a polymer battery.

2. Nonaqueous Electrolytic Solution Battery

The nonaqueous electrolytic solution battery according to the present invention includes (a) the present nonaqueous electrolytic solution, (b) a positive electrode, (c) a negative electrode, and (d) a separator.

[(a) Present Nonaqueous Electrolytic Solution]

The nonaqueous electrolytic solution battery according to the present invention includes the nonaqueous electrolytic solution as described in 1. Nonaqueous electrolytic solution.

[(b) Positive Electrode]

(b) the positive electrode preferably includes at least one oxide and/or polyanion compound as a positive-electrode active material.

[Positive-Electrode Active Material]

For a lithium-ion secondary battery in which cations in an nonaqueous electrolytic solution are mostly lithium ions, there is no particular limitation for (b) the positive-electrode active material for a positive electrode as long as it is capable of charge and discharge, but examples of it include at least one selected from the group consisting of (A) a lithium-transition metal composite oxide having a layer structure and containing at least one metal of nickel, manganese, and cobalt; (B) a lithium-manganese composite oxide having the spinel structure; (C) a lithium-containing olivine-type phosphate salt; and (D) a lithium-rich layered transition metal oxide having the stratified rock-salt structure.

((A) Lithium-Transition Metal Composite Oxide)

Examples of (A) the lithium-transition metal composite oxide having a layer structure and containing at least one metal of nickel, manganese, and cobalt as a positive-electrode active material include, for example, lithium-cobalt composite oxides, lithium-nickel composite oxides, lithium-nickel-cobalt composite oxides, lithium-nickel-cobalt-aluminum composite oxides, lithium-cobalt-manganese composite oxides, lithium-nickel-manganese composite oxides, lithium-nickel-manganese-cobalt composite oxides, and the like. Those in which some of the main transition metal atoms of these lithium-transition metal composite oxides are replaced with other elements such as Al, Ti, V, Cr, Fe, Cu, Zn, Mg, Ga, Zr, Si, B, Ba, Y, and Sn can also be used.

Specific examples of lithium-cobalt composite oxides and lithium-nickel composite oxides can include $LiCoO_2$, $LiNiO_2$, and lithium cobalt oxides having a hetero element such as Mg, Zr, Al, and Ti ($LiCo_{0.98}Mg_{0.01}Zr_{0.01}O_2$, $LiCo_{0.98}Mg_{0.01}Al_{0.01}O_2$, $LiCo_{0.975}Mg_{0.01}Zr_{0.005}Al_{0.01}O_2$, and the like). Lithium cobalt oxides having a rare earth compound adhered on the surface as described in WO2014/034043 may also be used. Further, those in which a portion of the particle surface of $LiCoO_2$ particulate powder is coated with aluminum oxide as described in Japanese Unexamined Patent Application, Publication No. 2002-151077 and others may be used.

Lithium-nickel-cobalt composite oxides and lithium-nickel-cobalt-aluminum composite oxides may be represented by the general formula (1-1).

$$Li_aNi_{1-b-c}Co_bM^1_cO_2 \qquad (1\text{-}1)$$

In the formula (1-1), $M^1$ is at least one element selected from Al, Fe, Mg, Zr, Ti, and B, and a is $0.9 \leq a \leq 1.2$, and b and c satisfy the requirements of $0.1 \leq b \leq 0.3$ and $0 \leq c \leq 0.1$, respectively.

These can be prepared in accordance with, for example, the method of manufacture as described in Japanese Unexamined Patent Application, Publication No. 2009-137834 and others. Specific examples include $LiNi_{0.8}Co_{0.2}O_2$, $LiNi_{0.85}Co_{0.10}Al_{0.05}O_2$, $LiNi_{0.87}Co_{0.10}Al_{0.03}O_2$, $LiNi_{0.6}Co_{0.3}Al_{0.1}O_2$, and the like.

Specific examples of lithium-cobalt-manganese composite oxides and lithium-nickel-manganese composite oxides include $LiNi_{0.5}Mn_{0.5}O_2$, $LiCo_{0.5}Mn_{0.5}O_2$, and the like.

Lithium-nickel-manganese-cobalt composite oxides include lithium-containing composite oxides represented by the general formula (1-2).

$$Li_dNi_eMn_fCo_gM^2_hO_2 \qquad (1\text{-}2)$$

In the formula (1-2), $M^2$ is at least one element selected from Al, Fe, Mg, Zr, Ti, B, and Sn, and d is $0.9 \leq d \leq 1.2$, and e, f, g, and h satisfy the requirements of $e+f+g+h=1$, $0 \leq e \leq 0.7$, $0 \leq f \leq 0.5$, $0 \leq g \leq 0.5$, and $h \geq 0$.

Preferred are lithium-nickel-manganese-cobalt composite oxides containing manganese in the range specified in the general formula (1-2) in order to improve structural stability and high-temperature safety of a lithium secondary battery. In particular, more preferred is those further containing cobalt in the range specified in the general formula (1-2) in order to improve high-rate properties of a lithium-ion secondary battery.

Specific examples include Li[Ni$_{1/3}$Mn$_{1/3}$CO$_{1/3}$]O$_2$, Li[Ni$_{0.45}$Mn$_{0.35}$Co$_{0.2}$]O$_2$, Li[Ni$_{0.5}$Mn$_{0.3}$Co$_{0.2}$]O$_2$, Li[Ni$_{0.6}$Mn$_{0.2}$Co$_{0.2}$]O$_2$, Li[Ni$_{0.49}$Mn$_{0.3}$Co$_{0.2}$Zr$_{0.01}$]O$_2$, Li[Ni$_{0.49}$Mn$_{0.3}$Co$_{0.2}$Mg$_{0.01}$]O$_2$, and the like, which have a charge-discharge range, for example, at 4.3 V or above.

((B) Lithium-Manganese Composite Oxide Having the Spinel Structure)

Examples of (B) the lithium-manganese composite oxide having the spinel structure as a positive-electrode active material include, for example, a spinel-type lithium-manganese composite oxide represented by the general formula (1-3).

$$\mathrm{Li}_j(\mathrm{Mn}_{2-k}\mathrm{M}^3_k)\mathrm{O}_4 \quad (1\text{-}3)$$

In the formula (1-2), M$^3$ is at least one metal element selected from Ni, Co, Fe, Mg, Cr, Cu, Al, and Ti, and j is $1.05 \leq j \leq 1.15$, and k is $0 \leq k \leq 0.20$.

Specific examples include LiMn$_2$O$_4$, LiMn$_{1.95}$Al$_{0.05}$O$_4$, LiMn$_{1.9}$Al$_{0.1}$O$_4$, LiMn$_{1.9}$Ni$_{0.1}$O$_4$, and LiMn$_{1.5}$Ni$_{0.5}$O$_4$, and the like.

((C) Lithium-Containing Olivine-Type Phosphate Salt)

Examples of (C) the lithium-containing olivine-type phosphate salt as a positive-electrode active material include, for example, those represented by the general formula (1-4).

$$\mathrm{LiFe}_{1-n}\mathrm{M}^4_n\mathrm{PO}_4 \quad (1\text{-}4)$$

In the formula (1-4), M$^4$ is at least one selected from Co, Ni, Mn, Cu, Zn, Nb, Mg, Al, Ti, W, Zr, and Cd, and n is $0 \leq n \leq 1$.

Specific example include LiFePO$_4$, LiCoPO$_4$, LiNiPO$_4$, LiMnPO$_4$, and the like. Among these, LiFePO$_4$ and/or LiMnPO$_4$ are preferred.

((D) Lithium-Rich Layered Transition-Metal Oxide)

Examples of (D) the lithium-rich layered transition-metal oxide having the stratified rock-salt structure as a positive-electrode active material include, for example, those represented by the general formula (1-5).

$$x\mathrm{LiM}^5\mathrm{O}_2\cdot(1-x)\mathrm{Li}_2\mathrm{M}^6\mathrm{O}_3 \quad (1\text{-}5)$$

In the formula (1-5), x is a number satisfying $0<x<1$, and M$^5$ is at least one metal element having a mean oxidation number of 3$^+$, and M$^6$ is at least one metal element having a mean oxidation number of 4$^+$. In the formula (1-5), M$^5$ is at least one metal element selected from Mn, Ni, Co, Fe, V, and Cr preferably having a valence of 3. That valence may be a mean oxidation number of 3 where a metal with a valence of 2 and a metal with a valence of 4 are used in the equivalent amount.

Further, in the formula (1-5), M$^6$ is preferably one or more metal elements selected from Mn, Zr, and Ti. Specific examples include 0.5[LiNi$_{0.5}$Mn$_{0.5}$O$_2$]·0.5[Li$_2$MnO$_3$], 0.5 [LiNi$_{1/3}$Co$_{1/3}$Mn$_{1/3}$O$_2$]·0.5[Li$_2$MnO$_3$], 0.5 [LiNi$_{0.375}$Co$_{0.25}$Mn$_{0.375}$O$_2$]·0.5[Li$_2$MnO$_3$], 0.5 [LiNi$_{0.375}$Co$_{0.125}$Fe$_{0.125}$Mn$_{0.375}$O$_2$]·0.5[Li$_2$MnO$_3$], 0.45 [LiNi$_{0.375}$Co$_{0.25}$Mn$_{0.375}$O$_2$]·0.10[Li$_2$TiO$_3$]·0.45[Li$_2$MnO$_3$], and the like.

The positive-electrode active material (D) represented by the general formula (1-5) is known to have a high capacity in high-voltage charging at 4.4 V or more (in terms of Li) (for example, see U.S. Pat. No. 7,135,252).

These positive-electrode active materials can be prepared in accordance with the methods of manufacture and others described in, for example Japanese Unexamined Patent Application, Publication No. 2008-270201, WO2013/118661, Japanese Unexamined Patent Application, Publication No. 2013-030284, and the like.

The positive-electrode active material needs to contain at least one selected from (A) to (D) described above as the main component. Examples of other additives which may be added include, for example, transition element chalcogenides such as FeS$_2$, TiS$_2$, V$_2$O$_5$, MoO$_3$, and MoS$_2$; or electrically conductive polymers such as polyacetylene, poly(p-phenylene), polyaniline, and polypyrrole; activated carbon; radical-generating polymers; carbon materials; and the like.

[Positive-Electrode Current Collector]

(b) The positive electrode has a positive-electrode current collector. As the positive-electrode current collector, for example, aluminum, stainless steel, nickel, titanium, or alloys thereof can be used.

[Positive-Electrode Active-Material Layer]

In (b) the positive electrode, for example, a positive-electrode active-material layer is formed on at least one surface of the positive-electrode current collector. The positive-electrode active-material layer includes, for example, the aforementioned positive-electrode active material, a binding agent, and, if desired, an electrically conductive agent.

Examples of the binding agent include polytetrafluoroethylene, poly(vinylidene fluoride), a styrene-butadiene rubber (SBR) resin, or the like.

As the electrically conductive agent, for example, carbon materials can be used such as acetylene black, Ketjen black, carbon fiber, or graphite (granular graphite and flaky graphite). Acetylene black and Ketjen black with low crystallinity are preferably used for the positive electrode.

[(c) Negative Electrode]

(c) The negative electrode includes a negative-electrode active material.

[Negative-Electrode Active Material]

For a lithium-ion secondary battery in which cations in an nonaqueous electrolytic solution are mostly lithium ions, examples of the negative-electrode active material of (c) the negative electrode include, for example, those capable of doping/de-doping lithium ions which contain, for example, at least one selected from (E) a carbon material having a d value of the lattice plane [002] of 0.340 nm or less as determined by X ray diffraction; (F) a carbon material having a d value of the lattice plane [002] of more than 0.340 nm as determined by X ray diffraction; (G) an oxide of one or more metals selected from Si, Sn, and Al; (H) one or more metals selected from Si, Sn, and Al or an alloy comprising the one or more metals, or an alloy of lithium and the one or more metals or the alloy; (I) a lithium titanium oxide. These negative-electrode active materials may be used alone or in combination of two or more.

((E) Carbon Material Having a d Value of the Lattice Plane of 0.340 nm or Less as Determined by X Ray Diffraction)

Examples of (E) the carbon material having a d value of the lattice plane [002] of 0.340 nm or less as determined by X ray diffraction as a negative-electrode active material include, for example, pyrolytic carbons, cokes (for example, pitch coke, needle coke, petroleum coke, and the like), graphites, calcined products of organic polymer compounds (for example, those obtained by calcining and carbonizing a phenol resin, a furan resin, and the like at an appropriate temperature), carbon fiber, and activated carbon. These may be graphitized. The above carbon materials preferably have an interplanar spacing (d002) of the plane [002] of 0.340 nm or less as measured by the X-ray diffraction method. In particular, preferred is a graphite having a true density of 1.70 g/cm³ or more or a high-crystallinity carbon material having characteristics similar to that.

((F) Carbon Material Having a d Value of the Lattice Plane of More than 0.340 nm as Determined by X Ray Diffraction)

Examples of (F) the carbon material having a d value of the lattice plane [002] of more than 0.340 nm as determined by X ray diffraction as a negative-electrode active material include amorphous carbon, which is a carbon material showing almost no change in the layer structure even upon heat treatment at a high temperature of 2000° C. or more. For example, non-graphitizable carbon (hard carbon), mesocarbon microbeads (MCMB) calcined at 1500° C. or less, mesophase pitch carbon fiber (MCF), and the like. A representative example is Carbotron® P available from Kureha Corporation.

((G) Oxide of One or More Metals Selected from Si, Sn, and Al)

Examples of (G) the oxide of one or more metals selected from Si, Sn, and Al as a negative-electrode active material include, for example, silicon oxides, tin oxides, and the like, which are capable of doping/de-doping lithium ions.

Examples include $SiO_x$ having a structure in which ultrafine particles of Si are dispersed in $SiO_2$ and the like. When this material is used as a negative-electrode active material, charge and discharge can be smoothly performed because Si reacted with Li is of ultrafine particles. Further, when a compound (paste) for forming a negative-electrode active-material layer is made of this material, the coatability and the adhesiveness of a negative-electrode mixture layer with a current collector are also good because $SiO_x$ particles themselves having the above structure have small surface areas.

It is noted that a higher capacity and better charge-discharge cycle characteristics can be simultaneously obtained when $SiO_x$ is used along with graphite as (E) the negative-electrode active material in a specific ratio. This is because $SiO_x$ shows a large volume change upon charge and discharge.

((H) One or More Metals Selected from Si, Sn, and Al or an Alloy Comprising the One or More Metals, or an Alloy of Lithium and the One or More Metals or the Alloy)

Examples of (H) the one or more metals selected from Si, Sn, and Al or an alloy comprising the one or more metals, or an alloy of lithium and the one or more metals or the alloy as a negative-electrode active material include, for example, metals such as silicon, tin, and aluminum; silicon alloys; tin alloys; aluminum alloys; and the like. Materials in which these metals and alloys are alloyed with lithium during charge and discharge can also be used.

Preferred specific examples of these include elemental metals (for example, powdered materials) such as, for example, silicon (Si) and tin (Sn); alloys of the above metals; compounds containing the above metals; alloys including tin (Sn) and cobalt (Co) in the above metals; and the like as described in WO2004/100293, Japanese Unexamined Patent Application, Publication No. 2008-016424, and the like. Use of the above metals for electrodes is preferred because a high charge capacity can be obtained, and expansion and contraction of the volume upon charge and discharge are relatively small. Further, these metals are known to be alloyed with Li upon charging, leading to a high charge capacity when they are used for negative electrodes of lithium-ion secondary batteries. Therefore, use of these metals is also preferred in this regard.

Further, a negative-electrode active material formed from silicon pillars having a submicron diameter, a negative-electrode active material including silicon fiber, and the like as described in WO2004/042851, WO2007/083155, and the like can be used.

((I) Lithium Titanium Oxide)

Examples of (I) the lithium titanium oxide as a negative-electrode active material can include, for example, lithium titanates having the spinel structure, lithium titanates having the ramsdellite structure, and the like.

Lithium titanates having the spinel structure can include, for example, $Li_{4+\alpha}Ti_3O_{12}$ ($\alpha$ varies within the range of $0 \le \alpha \le 3$ due to charge and discharge reactions). Further, lithium titanates having the ramsdellite structure include, for example, $Li_{2+\beta}Ti_3O_7$ ($\beta$ varies within the range of $0 \le \beta \le 3$ due to charge and discharge reactions). These negative-electrode active materials can be prepared in accordance with the methods of manufacture and the like as described in, for example in Japanese Unexamined Patent Application, Publication No. 2007-018883, Japanese Unexamined Patent Application, Publication No. 2009-176752, and the like.

For example, hard carbon; oxides such as $TiO_2$, $V_2O_3$, and $MoO_3$; and the like may be used as a negative-electrode active material in a sodium-ion secondary battery where cations in a nonaqueous electrolytic solution are mostly sodium ions. For example, the followings can be used as a positive-electrode active material in a sodium-ion secondary battery where cations in a nonaqueous electrolytic solution are mostly sodium ions: sodium-containing transition metal composite oxides such as $NaFeO_2$, $NaCrO_2$, $NaNiO_2$, $NaMnO_2$, and $NaCoO_2$; mixtures of multiple transition metals such as Fe, Cr, Ni, Mn, and Co of those sodium-containing transition metal composite oxides; those in which some of the transition metals of these sodium-containing transition metal composite oxides are replaced with different metals other than the transition metals; phosphate compounds of transition metals such as $Na_2FeP_2O_7$ and $NaCo_3(PO_4)_2P_2O_7$; sulfides such as $TiS_2$ and $FeS_2$; or electrically conductive polymers such as polyacethylene, poly(p-phenylene), polyaniline, and polypyrrole; activated carbon; radical-generating polymers; carbon materials; and the like.

[Negative-Electrode Current Collector]

(c) The negative electrode has a negative-electrode current collector. As the negative-electrode current collector, for example, copper, stainless steel, nickel, titanium, or alloys thereof can be used.

[Negative-Electrode Active-Material Layer]

In (c) the negative electrode, for example, a negative-electrode active-material layer is formed on at least one surface of the negative-electrode current collector. The negative-electrode active-material layer includes, for example, the aforementioned negative-electrode active material, a binding agent, and, if desired, an electrically conductive agent.

Examples of the binding agent include polytetrafluoroethylene, poly(vinylidene fluoride), a styrene-butadiene rubber (SBR) resin, or the like.

Examples of the electrically conductive agent include, for example, carbon materials such as acetylene black, Ketjen black, carbon fiber, or graphite (granular graphite and flaky graphite).

[Method of Manufacturing Electrodes ((b) the Positive Electrode and (c) the Negative Electrode)]

An electrode can be obtained, for example, by dispersing and kneading predetermined loading amounts of an active material, a binding agent, and, if desired, an electrically conductive agent into a solvent such as N-methyl-2-pyrrolidone (NMP) and water, and applying the resulting paste on a current collector, and drying to form an active-material layer. The resulting electrode is preferably compressed by a method such as roll press to adjust the electrode to a suitable density.

[(d) Separator]

The nonaqueous electrolytic solution battery according to the present invention includes (d) the separator. As a separator for preventing contact between (b) the positive electrode and (c) the negative electrode, non-woven fabrics and porous sheets made of polyolefins such as polypropylene and polyethylene; cellulose; paper; or glass fiber; and the like. These films are preferably microporous so that penetration by an electrolytic solution can be facilitated for easy permeation of ions.

Polyolefin separators include, for example, lithium-ion permeable membranes capable of electrically insulating the positive electrode from the negative electrode, for example, microporous polymer films such as porous polyolefin films. Specific examples of porous polyolefin films include, for example, porous polyethylene films alone, or multilayer films in which a porous polyethylene film and a porous polypropylene film are layered. Examples also include composite films with a porous polyethylene film and a polypropylene film, and the like.

[Housing]

As a housing for nonaqueous electrolytic solution batteries which can be used when assembling the present nonaqueous electrolytic solution battery, for example, metal cans of a coin-type, a cylinder-type, a rectangle-type, and the like; and laminate housings can be used. Materials for metal cans include, for example, nickel-plated steel sheets, stainless steel sheets, nickel-plated stainless steel sheets, aluminum or an alloy thereof, nickel, titanium, and the like. As laminate housings, for example, laminate films such as an aluminum laminate film, a stainless steel laminate film, laminate films of silica-coated polypropylene and polyethylene can be used.

There is no particular limitation for the configuration of the nonaqueous electrolytic solution battery according to the present embodiment, but the configuration may be such that an electrode element having a positive electrode and a negative electrode arranged in a countering manner, and a nonaqueous electrolytic solution are included inside a housing. There is no particular limitation for the shape of the nonaqueous electrolytic solution battery, but a coin-like, cylindrical, rectangular, or aluminum laminate sheet-like electrochemical device may be assembled with the components described above.

EXAMPLES

Below, the methods of synthesizing difluoro ionic complexes (cis/trans isomers) and tetrafluoro ionic complexes will be described. The methods disclosed in Patent Document 19, Nonpatent Document 1, and Patent Document 17 were used herein to synthesize ionic complexes. However, methods other than these may be used to synthesize them. In any cases, raw materials and products were handled under a nitrogen atmosphere of a dew point of −50° C. or less. Further, a glass reactor used was dried at 150° C. for 12 hours or more, and then cooled to room temperature under a nitrogen stream of a dew point of −50° C. or less before use.

[Synthesis Example 1] Synthesis of (1a-Cis) and (1a-Trans)

Lithium tris(oxalato)phosphate as a three-coordinate complex of oxalic acid was obtained according to the method disclosed in Patent Document 17. Lithium tris(oxalato)phosphate (30 g, 99.4 mmol) was dissolved in dimethyl carbonate (hereinafter, referred to as DMC) (120 mL), and hydrogen fluoride (hereinafter, referred to as HF) (11.9 g, 596.4 mmol) was then added. After stirring at 25° C. for 48 hours, residual HF and DMC were removed under reduced pressure. Then, DMC (60 mL) was added, and the concentrated residue was dissolved as much as possible, and then concentrated until the concentration of an Li salt became about 45 mass %. After removing insoluble components including oxalic acid by filtration, 49 g of a DMC solution of a mixture of (1a-Cis) and (1a-Trans) was obtained. Dichloromethane (hereinafter, referred to as "$CH_2Cl_2$") was added to the DMC solution of the mixture at room temperature, and stirred for 12 hours to obtain a precipitated solid. The solid was separated from the mother liquor by filtration, and the mother liquor was distilled to remove DMC under reduced pressure until a solid was obtained. The filtered solid and the solid obtained from the mother liquor were separately dissolved in $CH_2Cl_2$ to separately prepare DMC solutions with a concentration of about 45 mass %, and $CH_2Cl_2$ was then added to allow a solid to precipitate. The solids were recovered separately by filtration, and the preparation of a DMC solution with a concentration of about 45 mass % and the precipitation of a solid were further repeated for several times by a similar procedure to obtain (1a-Cis) and (1a-Trans) with F and P purities of 99.9 mol % (as determined by NMR).

(1a-Cis) and (1a-Trans) were dissolved separately in acetonitrile, and subjected to LC/MS (the ESI method, polarity: negative, fragment voltage: 50 V) to measure molecular weight. A parent ion was observed at m/z 244.9 for both, which is consistent with a theoretical mass number of 244.93 (the anion moiety). Further, the steric conformation was determined by the single crystal X-ray structure analysis. FIG. 1 shows the analysis result (ORTEP diagram) of (1a-Cis). It has been confirmed that (1a-Cis) is in the cis configuration in which two fluorine atoms are bonded in the same side when viewed from the central element.

(1a-Cis) and (1a-Trans) clearly have the same atomic composition but different structures because they have the same mass, and F-NMR and P-NMR show their peaks at different positions. Further, (1a-Trans) was determined to be in the trans configuration in which two fluorine atoms are bonded in the opposite sides when viewed from the central element as determined by the single crystal X-ray structure analysis. [Synthesis Example 2] Synthesis of (5a-Tetra)

Reactions were performed according to the method described in Patent Document 19. To a 500 mL glass flask, added were 20.0 g (132 mmol) of $LiPF_6$, 110 mL of dimethyl carbonate (DMC), and 11.9 g (132 mmol) of oxalic acid. At this point, $LiPF_6$ was completely dissolved, but the majority of oxalic acid remained unresolved. With stirring at 25° C., 13.4 g (79 mmol) of $SiCl_4$ was added dropwise to the flask, and stirring was then continued for 4 hours. Subsequently, tetrafluorosilane and hydrochloric acid were removed under reduced pressure to obtain a crude DMC solution containing the ionic complex (5a-Tetra) as the main component (a purity of 91 mol %). This solution was concentrated until the concentration of an Li salt became about 50 mass % to obtain 51 g of a concentrated liquid. After removing insoluble components by filtration, $CH_2Cl_2$ was added with stirring at room temperature. After stirring for 12 hours, a precipitated solid was recovered by filtration. Again, it was dissolved in DMC to prepare a DMC solution with an concentration of an Li-salt of about 50 mass %, and then the addition of $CH_2Cl_2$, precipitation of a solid, and recovery of a solid were performed by a similar procedure to obtain (5a-Tetra) with F and P purities of 99.9%.

[Synthesis Example 3] Synthesis of (1b-Cis) and (1b-Trans)

(1b-Cis) and (1b-Trans) were each obtained as in Synthesis Example 1 except that hexafluoro-2-hydroxyisobutyric acid was used as a raw material instead of oxalic acid.

[Synthesis Example 3] Synthesis of (6a-Cis) and (6a-Trans) as Na Adducts of (1a-Cis) and (1a-Trans)

A Dow Chemical strongly acidic cation exchange resin 252 (hereinafter, referred to as the ion exchange resin) was weighed out to give 500 g, and immersed in 0.1 N aqueous sodium hydroxide (2.5 kg), and stirred at 25° C. for 6 hours. The ion exchange resin was collected by filtration, and washed thoroughly with pure water until the pH of a wash liquid became 8 or less. Then, water was removed by drying under reduced pressure for 12 hours (120° C., 1.3 kPa). The (1a-Cis)/EMC solution with a concentration of 10 mass % was prepared, to which the dried ion exchange resin in a weight corresponding to half of the weight of the liquid was added, and stirred at 25° C. for 6 hours. Then, the ion exchange resin was removed by filtration to obtain a (6a-Cis)/EMC solution (with a concentration of about 10 mass %) in which cations of $Li^+$ had been exchanged with $Na^+$. The ratio of $Na^+/Li^+$ was 99.5 when cations were quantified by ion chromatography. Further, the (6a-Trans)/EMC solution with a concentration of about 10 mass % was obtained as in the method described above except that the (1a-Trans)/EMC solution with the same concentration was substituted for the (1a-Cis)/EMC solution.

[Synthesis Example 5] Synthesis of (5b-Tetra) as an Na Adduct of (5a-Tetra)

A (5b-Tetra)/EMC solution with a concentration of about 10 mass % in which cations of $Li^+$ had been exchanged with $Na^+$ was obtained by substituting a (5a-Tetra)/EMC solution for the (1a-cis)/EMC solution used in Synthesis Example 4. The ratio of $Na^+/Li^+$ was 99.4 when cations were quantified by ion chromatography.

[Synthesis Example 6] Synthesis of (6b-Cis) and (6b-Trans) as K Adducts of (1a-Cis) and (1a-Trans)

(6b-Cis)/EMC and (6 b-Trans)/EMC solutions with a concentration of about 10 mass % in which cations of $Li^+$ had been exchanged with $K^+$ were obtained by substituting 0.1 N aqueous potassium hydroxide (2.5 kg) for 0.1 N aqueous sodium hydroxide (2.5 kg) used in Synthesis Example 4. The ratio of $K^+/Li^+$ was 99.6 for both solutions when cations were quantified by ion chromatography.

[Synthesis Example 7] Synthesis of (6c-Cis) and (6c-Trans) as TMPA Adducts of (1a-Cis) and (1a-Trans)

To 90 g of EMC, 5.7 g (41.7 mmol) of trimethylpropylammonium chloride and 10.0 g (39.7 mmol) of (1a-Cis) were added, and stirred at 45° C. for 6 hours. After cooled to 5° C., insoluble materials were removed by filtration to obtain a (6c-Cis)/EMC solution (with a concentration of about 13 mass %) in which cations of $Li^+$ had been exchanged with trimethylpropylammonium cations (hereinafter, referred to as TMPA). Further, the (6c-Trans)/EMC solution with a concentration of about 13 mass % was obtained as in the method described above except that (1a-Trans) in the same weight was substituted for (1a-Cis). The ratio of $TMPA/Li^+$ was 98.5 for both solutions when cations were quantified by ion chromatography.

[Synthesis Example 8] Synthesis of (6d-Cis) and (6d-Trans) as PP13 Adducts of (1a-Cis) and (1a-Trans)

To 90 g of EMC, 7.4 g (41.7 mmol) of 1-butyl-1-methylpyrrolidinium chloride and 10.0 g (39.7 mmol) of (1a-Cis) were added, and stirred at 45° C. for 6 hours. After cooled to 5° C., insoluble materials were removed by filtration to obtain a (6d-Cis)/EMC solution (with a concentration of about 15 mass %) in which cations of $Li^+$ had been exchanged with 1-butyl-1-methylpyrrolidinium cations (hereinafter, referred to as PP13). Further, the (6d-Trans)/EMC solution with a concentration of about 15 mass % was obtained as in the method described above except that (1a-Trans) in the same weight was substituted for (1a-Cis). The ratio of $PP13/Li^+$ was 98.3 for both solutions when cations were quantified by ion chromatography.

[Synthesis Example 9] Synthesis of (1c-Cis) and (1c-Trans)

(1c-Cis), which is (1-Cis) where the anion moiety is (Cis-c) and A=Li, and (1c-Trans), which is (1-Trans) where the anion moiety is (Trans-c) and A=Li, were each obtained by applying the method described in Non-Patent Document 1.

[Preparation of Nonaqueous Electrolytic Solutions According to the Present Invention: Nos. 1-1 to 1-41]

In a dry box under a nitrogen atmosphere of a dew point of −50° C. or less, $LiPF_6$ as an electrolyte was dissolved and prepared in a preheated and dissolved nonaqueous solvent of ethylene carbonate (EC) and ethylmethyl carbonate (EMC) (volume ratio 1:2) so that the concentration of $LiPF_6$ was 1 mol/L, and then various ionic complex/EMC solutions according to the present invention and the group (II) compounds as described above were added to prepare the nonaqueous electrolytic solutions Nos. 1-1 to 1-41 according to the present invention.

It is noted that these preparations were performed as follows while cooled to control the solution temperature at 40° C. or below. First, 30 mass % of the entire $LiPF_6$ was added and dissolved in a predetermined amount of EMC, and another 30 mass % of the entire $LiPF_6$ was then added and dissolved. This operation was repeated for one more time, and then finally the remaining 10 mass % of $LiPF_6$ was added and dissolved. Subsequently, predetermined amounts of EC and EMC were added and mixed, and then various ionic complex/EMC solutions and the group (II) compounds shown in Table 1 below were added, and the volume ratio of EC and EMC was finally adjusted to 1:2, and then stirred for 1 hour.

[Preparation of Nonaqueous Electrolytic Solutions: Nos. 1-1 to 1-11]

(1a-Cis) from Synthesis Example 1 as the ionic complex according to the present invention was added in predetermined amounts shown in Table 1 below, and vinylene carbonate (VC) was further added in predetermined amounts shown in Table 1 below to prepare the nonaqueous electrolytic solutions No. 1-1 to 1-11.

[Preparation of Nonaqueous Electrolytic Solutions: Nos. 1-12 to 1-24]

(1a-Cis) from Synthesis Example 1 as the ionic complex according to the present invention was added in predetermined amounts shown in Table 1 below, and VC as the group (II) compound in predetermined amounts shown in Table 1 below was added, and (1a-Trans) from Synthesis Example 1 as the group (III) compound and/or (5a-Tetra) from Synthesis Example 2 as the group (IV) compound were further added in predetermined amounts shown in Table 1 below to prepare the nonaqueous electrolytic solutions Nos. 1-12 to 1-24.

[Preparation of Nonaqueous Electrolytic Solutions: Nos. 1-25 to 1-31]

(1a-Cis) from Synthesis Example 1 and/or (1b-Cis) from Synthesis Example 3 as the ionic complex according to the present invention were added in predetermined amounts shown in Table 1 below, and VC and/or vinylethylene carbonate (VEC) as the group (II) compound, (1a-Trans) from Synthesis Example 1 and/or (1b-Trans) from Synthesis Example 3 as the group (III) compound, and further (5a-Tetra) from Synthesis Example 2 and/or (5b-Tetra) from Synthesis Example 5 as the group (IV) compound were added in predetermined amounts shown in Table 1 below to prepare the nonaqueous electrolytic solutions Nos. 1-25 to 1-31.

[Preparation of Nonaqueous Electrolytic Solutions: Nos. 1-32 to 1-41]

A cis isomer from each of Synthesis Examples 1, 4, and 6 to 9 as the ionic complex according to the present invention was added in predetermined amounts, and VC as the group (II) compound, a trans isomer from each of Synthesis Examples 1, 4, and 6 to 9 as the group (III) compound, and further (5a-Tetra) from Synthesis Example 2 as the group (IV) compound were added in predetermined amounts shown in Table 1 below to prepare the nonaqueous electrolytic solutions Nos. 1-32 to 1-41.

The following nonaqueous electrolytic solutions were prepared as Comparative Examples.

[Preparation of Comparative Electrolytic Solution: No. 1-1]

In a dry box under a nitrogen atmosphere of a dew point of −50° C. or less, $LiPF_6$ as an electrolyte was dissolved and prepared in a pre-heated and dissolved nonaqueous solvent of EC and EMC (volume ratio 1:2) so that the concentration of $LiPF_6$ was 1 mol/L to prepare the comparative nonaqueous electrolytic solution No. 1-1. It is noted that preparation was performed as in the nonaqueous electrolytic solutions 1-1 to 1-41 according to the present invention except that neither various ionic complex/EMC solutions nor the group (II) compounds as shown in Table 1 below were added.

[Preparation of Comparative Electrolytic Solution: No. 1-2]

In a dry box under a nitrogen atmosphere of a dew point of −50° C. or less, $LiPF_6$ as an electrolyte was dissolved and prepared in a pre-heated and dissolved nonaqueous solvent of EC and EMC (volume ratio 1:2) so that the concentration of $LiPF_6$ was 1 mol/L, and then (1a-Cis) from Synthesis Example 1 was added in a predetermined amount shown in Table 1 below to prepare the comparative nonaqueous electrolytic solution No. 1-2.

[Preparation of Comparative Electrolytic Solution: No. 1-3]

(1a-Cis) from Synthesis Example 1 and (1b-Cis) from Synthesis Example 3 were added in predetermined amounts shown in Table 1 below as in the comparative electrolytic solution No. 1-2 to prepare the comparative electrolytic solution No. 1-3.

[Preparation of Comparative Electrolytic Solution: No. 1-4]

A comparative electrolytic solution No. 1-4 was prepared as in the comparative electrolytic solution No. 1-2 except that 1.0 mass % of VC was added as shown in Table 1 instead of (1a-Cis) which was added in the comparative electrolytic solution No. 1-2.

[Preparation of Comparative Electrolytic Solution: No. 1-5]

A comparative electrolytic solution No. 1-5 was prepared as in the comparative electrolytic solution No. 1-4 except that 1.0 mass % of VC was added, and further (1a-Trans) from Synthesis Example 1 was added in a predetermined amount as shown in Table 1 below.

[Preparation of Comparative Electrolytic Solution: No. 1-6]

A comparative electrolytic solution No. 1-6 was prepared as in the comparative electrolytic solution No. 1-4 except that 1.0 mass % of VC was added, and (1a-Trans) from Synthesis Example 1 and (5a-Tetra) from Synthesis Example 2 were further added in predetermined amounts as shown in Table 1 below.

Each of the nonaqueous electrolytic solutions Nos. 1-1 to 1-41 and the comparative electrolytic solutions Nos. 1-1 to 1-6 was subjected to accelerated tests to evaluate the stability after storage.

20 L stainless steel pressure containers equipped with a pressure gage were filled with 21 kg of the electrolytic solutions respectively, and stored at an environmental temperature of 45° C. for two months. Then, the internal pressure of the container was measured at an environmental temperature of 25° C. to calculate the gas yield generated during storage. The gas yields of the nonaqueous electrolytic solutions Nos. 1-1 to 1-41 and the comparative electrolytic solutions Nos. 1-2 to 1-6 are shown in Table 1 as relative values when the gas yield of the comparative electrolytic solution No. 1-1 is taken as 100.

The nonaqueous electrolytic solutions containing 3 types of compounds: the difluoro ionic complex (1a-Cis) in the cis configuration from Synthesis Example 1, VC, and the tetrafluoro ionic complex (5a-Tetra) from Synthesis Example 2 (the electrolytic solutions Nos. 1-15 to 1-17), and similarly the nonaqueous electrolytic solutions containing 4 types of compounds: (1 a-Cis), VC, (1a-Trans), and the tetrafluoro ionic complex (5a-Tetra) (the electrolytic solutions Nos. 1-18 to 1-24) showed smaller gas yields during storage, preventing an increase in the internal pressure as compared with the nonaqueous electrolytic solutions which do not contain the tetrafluoro ionic complex (5a-Tetra) (the electrolytic solutions Nos. 1-12 to 1-14) (for example, based on comparisons of "the electrolytic solutions Nos. 1-12 to 1-14" with "the electrolytic solutions Nos. 1-16 and 1-21"). Further, this gas-yield reducing effect was found to be enhanced as the ratio of the tetrafluoro ionic complex (5a-Tetra) to the difluoro ionic complex (1a-Cis), i.e., tetrafluoro ionic complex (1-Tetra)/difluoro ionic complex (1-Cis) (by the mass ratio) increased from 0.07 to 0.12 and 0.20 (for example, see "the electrolytic solutions Nos. 1-15 to 1-17").

TABLE 1

| Electrolytic solution No. | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) | Gas yield during storage of electrolytic solution |
|---|---|---|---|---|---|---|---|---|---|---|---|
| Electrolytic solution No. 1-1 | Synthesis Example 1 (1a-Cis) | 0.05 | VC | 1.0 | — | — | — | — | — | — | 124.8 |
| Electrolytic solution No. 1-2 | | 0.1 | | 1.0 | — | — | — | — | — | — | 130.2 |
| Electrolytic solution No. 1-3 | | 0.5 | | 1.0 | — | — | — | — | — | — | 155.1 |
| Electrolytic solution No. 1-4 | | 1.0 | | 1.0 | — | — | — | — | — | — | 174.8 |
| Electrolytic solution No. 1-5 | | 3.0 | | 1.0 | — | — | — | — | — | — | 204.6 |
| Electrolytic solution No. 1-6 | | 5.0 | | 1.0 | — | — | — | — | — | — | 224.7 |
| Electrolytic solution No. 1-7 | Synthesis Example 1 (1a-Cis) | 1.0 | VC | 0.05 | — | — | — | — | — | — | 154.5 |
| Electrolytic solution No. 1-8 | | 1.0 | | 0.1 | — | — | — | — | — | — | 154.8 |
| Electrolytic solution No. 1-9 | | 1.0 | | 2.0 | — | — | — | — | — | — | 179.8 |
| Electrolytic solution No. 1-10 | | 1.0 | | 3.0 | — | — | — | — | — | — | 194.7 |
| Electrolytic solution No. 1-11 | | 1.0 | | 5.0 | — | — | — | — | — | — | 214.7 |
| Electrolytic solution No. 1-12 | Synthesis Example 1 (1a-Cis) | 1.0 | VC | 1.0 | Synthesis Example 1 (1a-Trans) | 0.002 | 0.002 | — | — | — | 179.8 |
| Electrolytic solution No. 1-13 | | 1.0 | | 1.0 | | 0.005 | 0.005 | — | — | — | 180.2 |
| Electrolytic solution No. 1-14 | | 1.0 | | 1.0 | | 0.01 | 0.01 | — | — | — | 185.0 |
| Electrolytic solution No. 1-15 | Synthesis Example 1 (1a-Cis) | 1.0 | VC | 1.0 | — | — | — | Synthesis Example 2 (5a-Tetra) | 0.07 | 0.07 | 164.8 |
| Electrolytic solution No. 1-16 | | 1.0 | | 1.0 | — | — | — | | 0.12 | 0.12 | 154.8 |
| Electrolytic solution No. 1-17 | | 1.0 | | 1.0 | — | — | — | | 0.20 | 0.20 | 140.2 |
| Electrolytic solution No. 1-18 | Synthesis Example 1 (1a-Cis) | 0.5 | VC | 0.1 | Synthesis Example 1 (1a-Trans) | 0.001 | 0.002 | Synthesis Example 2 (5a-Tetra) | 0.035 | 0.07 | 145.3 |
| Electrolytic solution No. 1-19 | | 0.5 | | 1.0 | | 0.0025 | 0.005 | | 0.06 | 0.12 | 134.7 |

TABLE 1-continued

| Electrolytic solution No. | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) | Gas yield during storage of electrolytic solution |
|---|---|---|---|---|---|---|---|---|---|---|---|
| Electrolytic solution No. 1-20 | | | | 1.0 | | 0.002 | 0.002 | | 0.07 | 0.07 | 144.8 |
| Electrolytic solution No. 1-21 | | | | 1.0 | | 0.005 | 0.005 | | 0.12 | 0.12 | 155.1 |
| Electrolytic solution No. 1-22 | | | | 2.0 | | 0.01 | 0.01 | | 0.20 | 0.20 | 160.2 |
| Electrolytic solution No. 1-23 | | | | 3.0 | | 0.015 | 0.005 | | 0.36 | 0.12 | 180.4 |
| Electrolytic solution No. 1-24 | | | | 3.0 | | 0.03 | 0.01 | | 0.60 | 0.20 | 204.7 |
| Electrolytic solution No. 1-25 | Synthesis Example 1 (1a-Cis) Synthesis Example 3 (1b-Cis) | 0.5 0.5 | VC | | Synthesis Example 1 (1a-Trans) | 0.004 | 0.004 | Synthesis Example 2 (5a-Tetra) | 0.14 | 0.14 | 152.3 |
| Electrolytic solution No. 1-26 | Synthesis Example 1 (1a-Cis) | 1.0 | VC VEC | | Synthesis Example 1 (1a-Trans) | 0.004 | 0.004 | Synthesis Example 2 (5a-Tetra) | 0.14 | 0.14 | 154.7 |
| Electrolytic solution No. 1-27 | Synthesis Example 1 (1a-Cis) | 1.0 | VC | | Synthesis Example 1 (1a-Trans) Synthesis Example 3 (1b-Trans) | 0.002 0.002 | 0.002 0.002 | Synthesis Example 2 (5a-Tetra) | 0.14 | 0.14 | 153.5 |
| Electrolytic solution No. 1-28 | Synthesis Example 1 (1a-Cis) | 1.0 | VC | | Synthesis Example 1 (1a-Trans) | 0.004 | 0.004 | Synthesis Example 2 (5a-Tetra) Synthesis Example 5 (5b-Tetra) | 0.07 0.07 | 0.07 0.07 | 158.8 |
| Electrolytic solution No. 1-29 | Synthesis Example 3 (1b-Cis) | 1.0 | VC | | Synthesis Example 1 (1a-Trans) | 0.004 | 0.004 | Synthesis Example 2 (5a-Tetra) | 0.14 | 0.14 | 153.8 |
| Electrolytic solution No. 1-30 | Synthesis Example 1 (1a-Cis) | 1.0 | | | Synthesis Example 3 (1b-Trans) | 0.004 | 0.004 | Synthesis Example 2 (5a-Tetra) | 0.14 | 0.14 | 154.9 |
| Electrolytic solution No. 1-31 | Synthesis Example 4 (6a-Cis) | 1.0 | VC | | Synthesis Example 1 (1a-Trans) | 0.004 | 0.004 | Synthesis Example 5 (5b-Tetra) | 0.14 | 0.14 | 157.8 |
| Electrolytic solution No. 1-32 | Synthesis Example 6 (6b-Cis) | 1.0 | | | Synthesis Example 1 (1a-Trans) | 0.004 | 0.004 | Synthesis Example 2 (5a-Tetra) | 0.14 | 0.14 | 159.5 |
| Electrolytic solution No. 1-33 | Synthesis Example 7 (6c-Cis) | 1.0 | | | | 0.004 | 0.004 | | 0.14 | 0.14 | 162.5 |
| Electrolytic solution No. 1-34 | Synthesis Example 8 (6d-Cis) | 1.0 | | | | 0.004 | 0.004 | | 0.14 | 0.14 | 161.0 |
| Electrolytic solution No. 1-35 | Synthesis Example 9 (1c-Cis) | 0.8 | | | | 0.0032 | 0.004 | | 0.11 | 0.14 | 162.0 |
| Electrolytic solution No. 1-36 | | | | | | | | | | | 163.4 |

TABLE 1-continued

| Electrolytic solution No. | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) | Gas yield during storage of electrolytic solution |
|---|---|---|---|---|---|---|---|---|---|---|---|
| Electrolytic solution No. 1-37 | Synthesis Example 1 (1a-Cis) | 1.0 | VC | 1.0 | Synthesis Example 4 (6a-Trans) | 0.004 | 0.004 | Synthesis Example 2 (5a-Tetra) | 0.14 | 0.14 | 159.3 |
| Electrolytic solution No. 1-38 | | 1.0 | | 1.0 | Synthesis Example 6 (6b-Trans) | 0.004 | 0.004 | | 0.14 | 0.14 | 162.1 |
| Electrolytic solution No. 1-39 | | 1.0 | | 1.0 | Synthesis Example 7 (6c-Trans) | 0.004 | 0.004 | | 0.14 | 0.14 | 160.9 |
| Electrolytic solution No. 1-40 | | 1.0 | | 1.0 | Synthesis Example 8 (6d-Trans) | 0.004 | 0.004 | | 0.14 | 0.14 | 161.7 |
| Electrolytic solution No. 1-41 | | 1.0 | | 1.0 | Synthesis Example 9 (1c-Trans) | 0.004 | 0.004 | | 0.14 | 0.14 | 163.0 |
| Comparative electrolytic solution No. 1-1 | — | — | — | — | — | — | — | — | — | — | 100.0 |
| Comparative electrolytic solution No. 1-2 | Synthesis Example 1 (1a-Cis) | 1.0 | — | — | — | — | — | — | — | — | 170.5 |
| Comparative electrolytic solution No. 1-3 | Synthesis Example 1 (1a-Cis) Synthesis Example 3 (1b-Cis) | 0.5 0.5 | — | — | — | — | — | — | — | — | 171.2 |
| Comparative electrolytic solution No. 1-4 | — | — | VC | 1.0 | — | — | — | — | — | — | 121.5 |
| Comparative electrolytic solution No. 1-5 | — | — | VC | 1.0 | Synthesis Example 1 (1a-Trans) | 1.0 | — | — | — | — | 172.9 |
| Comparative electrolytic solution No. 1-6 | — | — | VC | 1.0 | Synthesis Example 1 (1a-Trans) | 1.0 | — | Synthesis Example 2 (5a-Tetra) | 0.12 | — | 154.5 |

Production of NMC Positive Electrode

A LiNi$_{1/3}$Mn$_{1/3}$CO$_{1/3}$O$_2$ (NMC) powder as a positive-electrode active material was dry-mixed with acetylene black (electrically conductive agent), and then uniformly dispersed and mixed into the N-methyl-2-pyrrolidone (NMP) in which poly(vinylidene fluoride) (PVDF) was pre-dissolved, and NMP for adjusting the viscosity was further added to prepare an NMC mixture paste. The resulting paste was applied to an aluminum foil (current collector), dried, and pressurized. Then the aluminum foil was processed into a predetermined size to obtain a test NMC positive electrode. The ratio of solid contents in the positive electrode was NMC:electrically conductive agent:PVDF=85:5:10 (by the mass ratio).

Production of Graphite Negative Electrode

A graphite powder as a negative-electrode active material was uniformly dispersed and mixed into NMP in which PVDF as a binding agent was pre-dissolved, and NMP for adjusting the viscosity was further added to prepare a graphite mixture paste. The above paste was applied to a copper foil (current collector), dried, and pressurized. Then the copper foil was processed into a predetermined size to obtain a test graphite negative electrode. The ratio of solid contents in the negative electrode was graphite powder:PVDF=90:10 (by the mass ratio).

Production of Nonaqueous Electrolytic Solution Batteries

Aluminum laminate housing cells (with a capacity of 30 mAh) including the above test NMC positive electrode, the above test graphite negative electrode, and a cellulose separator were respectively impregnated with one of the nonaqueous electrolytic solutions Nos. 1-1 to 1-41 and the comparative electrolytic solutions Nos. 1-1 to 1-6 to obtain the nonaqueous electrolytic solution batteries according to Examples 1-1 to 1-41 and Comparative Examples 1-1 to 1-6.

Examples 1-1 to 1-41, Comparative Examples 1-1 to 1-6: Evaluation of Test Cells

Evaluation 1: Low-Temperature Property (0° C.) after 500 Cycles at 60° C.

Each of the nonaqueous electrolytic solution batteries according to Examples 1-1 to 1-41 and Comparative Examples 1-1 to 1-6 was evaluated as described below. First, the resulting cells were subjected to conditioning at an environmental temperature of 25° C. under the following conditions. That is, as the initial charge/discharge, constant-current and constant-voltage charge was performed at a 0.1 C rate (3 mA) to a charge upper limit voltage of 4.3 V, and then discharge was performed at a constant current of a 0.2 C rate (6 mA) to a discharge cutoff voltage of 3.0 V. Subsequently, a charge-discharge cycle was repeated 3 times as described below: constant-current and constant-voltage charge was performed at a 0.2 C rate (6 mA) to a charge upper limit voltage of 4.3 V, and then discharge was performed at a constant current of a 0.2 C rate (6 mA) to a discharge cutoff voltage of 3.0 V. After this conditioning, charge and discharge tests were performed at an environmental temperature of 60° C. The following charge-discharge cycle was repeated for 500 times: constant-current and constant-voltage charge was performed at a 3 C rate (90 mA) to a charge upper limit voltage of 4.3 V, and discharge was performed at a constant current of a 3 C rate (90 mA) to a discharge cutoff voltage of 3.0 V. Next, the nonaqueous electrolytic solution batteries were cooled to 25° C., and again discharged to 3.0 V. Then constant-current and constant-voltage charge was performed to 4.3 V at a 0.2 C rate at 0° C. Further, discharge was performed at a constant current of a 5 C rate (150 mA) to a discharge cutoff voltage of 3.0 V while maintaining the temperature at 0° C., and the capacity obtained at that time was taken as the low-temperature property (0° C.) after prolonged cycles at 60° C.

Evaluation 2: 5 C-Rate Characteristics after 500 Cycles at 60° C.

After performing 500 cycles at an environmental temperature of 60° C. in Evaluation 1 as described above, the nonaqueous electrolytic solution batteries were cooled to 25° C., and then again discharged to 3.0 V. Then constant-current and constant-voltage charge was performed to 4.3 V at a 5 C rate at 25° C. Further, discharge was performed at a constant current of a 5 C rate (150 mA) to a discharge cutoff voltage of 3.0 V while maintaining the temperature at 25° C., and the capacity obtained at that time was taken as the 5 C-rate characteristic (25° C.) after prolonged cycles at 60° C.

Evaluation 3: Low-Temperature Property (0° C.) after Stored at 60° C.

Each of the nonaqueous electrolytic solution batteries according to Examples 1-1 to 1-41 and Comparative Examples 1-1 to 1-6 was subjected to storage tests (stored for 10 days after charged to 4.3 V) at an environmental temperature of 60° C. Next, the nonaqueous electrolytic solution batteries were cooled to 25° C., and again discharged to 3.0 V. Then constant-current and constant-voltage charge was performed to 4.3 V at a 0.2 C rate at 0° C. Further, discharge was performed at a constant current of a 5 C rate (150 mA) to a discharge cutoff voltage of 3.0 V while maintaining the temperature at 0° C., and the capacity obtained at that time was taken as the low-temperature property (0° C.) after stored at 60° C.

Various evaluations of the nonaqueous electrolytic solution batteries according to Examples 1-1 to 1-41 and Comparative Examples 1-2 to 1-6 are shown in Table 2 as relative values when the corresponding evaluation results of the nonaqueous electrolytic solution battery according to Comparative Example 1-1 are taken as 100.

TABLE 2

|  | Electrolytic solution No. | Low-temperature property (0° C.) after prolonged cycles at 60° C. | 5 C-rate characteristic (25° C.) after prolonged cycles at 60° C. | Low-temperature property (0° C.) after stored at 60° C. |
| --- | --- | --- | --- | --- |
| Example 1-1 | Electrolytic solution No. 1-1 | 127.2 | 120.1 | 117.2 |
| Example 1-2 | Electrolytic solution No. 1-2 | 131.1 | 124.2 | 120.8 |
| Example 1-3 | Electrolytic solution No. 1-3 | 133.2 | 127.3 | 123.7 |
| Example 1-4 | Electrolytic solution No. 1-4 | 134.4 | 128.7 | 124.6 |
| Example 1-5 | Electrolytic solution No. 1-5 | 133.3 | 127.9 | 123.7 |
| Example 1-6 | Electrolytic solution No. 1-6 | 127.6 | 119.0 | 116.9 |
| Example 1-7 | Electrolytic solution No. 1-7 | 128.9 | 119.9 | 117.3 |

TABLE 2-continued

|  | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 1-8 | Electrolytic solution No. 1-8 | 132.4 | 127.6 | 118.1 |
| Example 1-9 | Electrolytic solution No. 1-9 | 133.7 | 128.2 | 124.4 |
| Example 1-10 | Electrolytic solution No. 1-10 | 132.8 | 126.8 | 123.8 |
| Example 1-11 | Electrolytic solution No. 1-11 | 129.2 | 119.8 | 116.6 |
| Example 1-12 | Electrolytic solution No. 1-12 | 135.2 | 128.9 | 125.1 |
| Example 1-13 | Electrolytic solution No. 1-13 | 136.6 | 129.2 | 125.2 |
| Example 1-14 | Electrolytic solution No. 1-14 | 137.8 | 129.5 | 125.3 |
| Example 1-15 | Electrolytic solution No. 1-15 | 135.4 | 128.8 | 125.2 |
| Example 1-16 | Electrolytic solution No. 1-16 | 136.8 | 129.6 | 125.4 |
| Example 1-17 | Electrolytic solution No. 1-17 | 136.9 | 129.1 | 125.3 |
| Example 1-18 | Electrolytic solution No. 1-18 | 127.5 | 126.0 | 123.3 |
| Example 1-19 | Electrolytic solution No. 1-19 | 132.3 | 127.7 | 124.1 |
| Example 1-20 | Electrolytic solution No. 1-20 | 133.5 | 127.9 | 124.2 |
| Example 1-21 | Electrolytic solution No. 1-21 | 137.1 | 131.2 | 125.9 |
| Example 1-22 | Electrolytic solution No. 1-22 | 133.9 | 128.5 | 124.9 |
| Example 1-23 | Electrolytic solution No. 1-23 | 133.5 | 128.0 | 124.6 |
| Example 1-24 | Electrolytic solution No. 1-24 | 128.1 | 123.1 | 119.1 |
| Example 1-25 | Electrolytic solution No. 1-25 | 136.9 | 130.8 | 124.9 |
| Example 1-26 | Electrolytic solution No. 1-26 | 136.7 | 130.9 | 125.3 |
| Example 1-27 | Electrolytic solution No. 1-27 | 137.0 | 131.0 | 125.6 |
| Example 1-28 | Electrolytic solution No. 1-28 | 136.6 | 130.7 | 125.1 |
| Example 1-29 | Electrolytic solution No. 1-29 | 136.6 | 130.2 | 124.7 |
| Example 1-30 | Electrolytic solution No. 1-30 | 136.8 | 130.7 | 124.9 |
| Example 1-31 | Electrolytic solution No. 1-31 | 136.5 | 130.4 | 124.5 |
| Example 1-32 | Electrolytic solution No. 1-32 | 136.6 | 129.9 | 124.6 |
| Example 1-33 | Electrolytic solution No. 1-33 | 136.4 | 129.8 | 124.2 |
| Example 1-34 | Electrolytic solution No. 1-34 | 136.2 | 128.6 | 123.5 |
| Example 1-35 | Electrolytic solution No. 1-35 | 136.0 | 128.9 | 122.9 |
| Example 1-36 | Electrolytic solution No. 1-36 | 136.4 | 129.7 | 124.5 |
| Example 1-37 | Electrolytic solution No. 1-37 | 136.2 | 129.6 | 124.3 |
| Example 1-38 | Electrolytic solution No. 1-38 | 136.0 | 129.4 | 123.9 |
| Example 1-39 | Electrolytic solution No. 1-39 | 135.8 | 128.2 | 123.2 |
| Example 1-40 | Electrolytic solution No. 1-40 | 135.6 | 128.6 | 122.6 |
| Example 1-41 | Electrolytic solution No. 1-41 | 135.9 | 129.2 | 124.1 |
| Comparative Example 1-1 | Comparative electrolytic solution No. 1-1 | 100.0 | 100.0 | 100.0 |
| Comparative Example 1-2 | Comparative electrolytic solution No. 1-2 | 125.1 | 117.8 | 114.9 |
| Comparative Example 1-3 | Comparative electrolytic solution No. 1-3 | 124.7 | 116.2 | 108.2 |
| Comparative Example 1-4 | Comparative electrolytic solution No. 1-4 | 119.8 | 112.0 | 108.1 |
| Comparative Example 1-5 | Comparative electrolytic solution No. 1-5 | 125.4 | 115.9 | 115.7 |
| Comparative Example 1-6 | Comparative electrolytic solution No. 1-6 | 126.2 | 116.2 | 116.0 |

(Positive electrode; NMC Negative electrode; Graphite)

Examples 1-1 to 1-11

As seen from the results in Tables 1 and 2, the nonaqueous electrolytic solution batteries including the difluoro ionic complex (1a-Cis) in the cis configuration from Synthesis Example 1 according to Example and VC showed a higher discharge capacity (0° C.) after prolonged cycles at 60° C. and a higher 5 C-rate characteristic after prolonged cycles at 60° C. as compared with the nonaqueous electrolytic solution battery including neither the above ionic complex nor VC (Comparative Example 1-1). Comparison of Example 1-4 with Comparative Example 1-2 revealed that the nonaqueous electrolytic solution battery including both (1a-Cis) and VC showed higher effects than the nonaqueous electrolytic solution battery including (1a-Cis) only.

This can be explained as follows. When the difluoro ionic complex (1a-Cis) of the nonaqueous electrolytic solution according to the present invention and a carbonate having an unsaturated bond such VC are included, these additives are reductively decomposed on a negative electrode in the order of the difluoro ionic complex (1a-Cis) and then VC during charge at the first cycle to form a stable film (SEI) on the surface of the negative electrode. That is, the above reaction film layer having a high ion conductivity and the SEI having long-term stability and covering the surface of the negative electrode can prevent side reactions such as decomposition of a solvent which otherwise occur on the surface of the negative electrode. This, in turn, can reduce the initial irreversible capacity of the nonaqueous electrolytic solution battery, and also improve long-term durability and output characteristics. These appear to reflect significantly improved properties such as the discharge capacity (0° C.) after prolonged cycles at 60° C. and the 5 C-rate characteristic (25° C.) as shown in Table 2, which supports that the present novel combination of the difluoro ionic complex (1a-Cis) and a carbonate having an unsaturated bond such as VC can provide unprecedented effects for improving performance.

Comparisons of Examples 1-1 to 1-11 revealed that the effects of the difluoro ionic complex (1a-Cis) and VC were able to be slightly observed even when the contents were each 0.05 mass %, and were increased as the content of the ionic complex increased from 0.05 mass % to 0.1, 0.5, and 1.0 mass %. Further, comparison of Example 1-4 with Comparative Example 1-5 revealed that the nonaqueous electrolytic solution battery including the difluoro ionic complex (1a-Cis) in the cis configuration and VC according to Example 1-4 can improve the discharge capacity (0° C.) after stored at 60° C. without decreasing the discharge capacity (0° C.) after prolonged cycles at 60° C. as compared with the nonaqueous electrolytic solution battery including the difluoro ionic complex (1a-Trans) in the trans configuration and VC according to Comparative Example 1-5. This can be explained as follows. Reductive decomposition of (1a-Cis) in the cis configuration has a different reaction rate than (1a-Trans) in the trans configuration, leading to different selectivities for the reductive decomposition reaction (the presence or absence of solvent decomposition). This may result in different main components of the SEIs formed therefrom, and may eventually result in different effects for improving battery performance for which the SEIs are responsible.

When the content of the difluoro ionic complex (1a-Cis) was 3.0 mass % (Example 1-5), the effects were slightly decreased as compared with the case where the content was 1.0 mass % (Example 1-4). In the case of 5.0 mass % (Example 1-6), the effects were significantly decreased as compared with the case of 1.0 mass %. This may be assumed as follows. The viscosity of a nonaqueous electrolytic solution is increased when the content of the difluoro ionic complex (1a-Cis) reaches 3 mass % or more. This may restrict movement of cations within a nonaqueous electrolytic solution battery, resulting in decreased battery performance.

Examples 1-12 to 1-14

Examples 1-12 to 1-14 where nonaqueous electrolytic solutions contain 3 types of compounds: the difluoro ionic complex (1a-Cis) in the cis configuration, the difluoro ionic complex (1a-Trans) in the trans configuration according to Synthesis Example 1, and VC were found to have a tendency for further increasing the discharge capacity (0° C.) after stored at 60° C. without decreasing the discharge capacity (0° C.) after prolonged cycles at 60° C. as compared with the nonaqueous electrolytic solution battery (Example 1-4) including the above (1a-Cis) and VC. Further, comparison of Example 1-16 with Comparative Example 1-6 revealed that the nonaqueous electrolytic solution battery including 3 types of compounds: the above (1a-Cis), VC, and (5a-Tetra) as the group (IV) compound showed higher effects than the nonaqueous electrolytic solution battery including the difluoro ionic complex (1a-Trans) in the trans configuration, VC, and (5a-Tetra) as the group (IV) compound. Further, as the ratio of the difluoro ionic complex (1a-Trans) in the trans configuration to the difluoro ionic complex (1a-Cis) in the cis configuration, i.e., difluoro ionic complex (1-Trans)/difluoro ionic complex (1-Cis) (by the mass ratio) increased from 0.002 to 0.005 and 0.01, the discharge capacity (0° C.) after stored at 60° C. was found to show a moderate improving tendency without impairing the discharge capacity (0° C.) after prolonged cycles at 60° C.

Examples 1-15 to 1-17

Moreover, Examples 1-15 to 1-17 where the nonaqueous electrolytic solutions contain 3 types of compounds: the difluoro ionic complex (1a-Cis), VC, and the tetrafluoro ionic complex (5a-Tetra) were found to have a tendency for further improving the discharge capacity (0° C.) after stored at 60° C. without decreasing the discharge capacity (0° C.) after prolonged cycles at 60° C. and the 5 C-rate characteristic (25° C.) as compared with the nonaqueous electrolytic solution battery (Example 1-4) including (1a-Cis) and VC. Further, as the ratio of the tetrafluoro ionic complex (5a-Tetra) to the difluoro ionic complex (1a-Cis) in the cis configuration, i.e., tetrafluoro ionic complex (5a-Tetra)/difluoro ionic complex (1-Cis) (by the mass ratio) increased from 0.07 to 0.12 and 0.20, the discharge capacity (0° C.) after stored at 60° C. was found to show an improving tendency without impairing the discharge capacity (0° C.) after prolonged cycles at 60° C.

Examples 1-18 to 1-31

Further, as shown in Examples 1-18 to 1-31, the nonaqueous electrolytic solutions containing the difluoro ionic complex (1a-Cis) in the cis configuration from Synthesis Example 1 and/or the difluoro ionic complex (1b-Cis) in the cis configuration from Synthesis Example 3, VC and/or VEC, and a compound(s) selected from the group consisting of the difluoro ionic complex (1a-Trans) in the trans configuration from Synthesis Example 1, the difluoro ionic complex (1b-Trans) in the trans configuration from Synthesis Example 3, the tetrafluoro ionic complex (5a-Tetra) from Synthesis Example 2, and the tetrafluoro ionic complex (5b-Tetra) from Synthesis Example 5 were found to have a tendency for improving the discharge capacity (0° C.) after prolonged cycles at 60° C., the 5 C-rate characteristic (25° C.), and the discharge capacity (0° C.) after stored at 60° C. as compared with the nonaqueous electrolytic solutions which did not contain the tetrafluoro ionic complexes (5a-Tetra) and (5b-Tetra) (Examples 1-12 to 1-14) and the nonaqueous electrolytic solutions which did not contain the difluoro ionic complexes (1a-Trans) and (1b-Trans) in the trans configuration (Examples 1-15 to 1-17) (For example, from comparisons of "Examples 1-12 to 1-17" with "Examples 1-21 and 1-25 to 1-31" where the contents of the group (I) compound and the group (II) compound were similar between the corresponding Examples).

Examples 1-32 to 1-41

In contrast, as shown in Examples 1-32 to 1-35, comparisons of the ionic complexes (1a-Cis), (6a-Cis), and (6b-Cis) having Li$^+$, Na$^+$, and K$^+$ as cations, respectively, showed no difference in their effects, and a high discharge capacity (0° C.) after cycles was able to be obtained for all (Example 1-21 or 1-30 was compared with Examples 1-32, 1-33). The cis conformers similarly tended to show higher effects than the trans conformers (when corresponding combinations of the group (I) and the group (III) were compared in Examples 1-32 to 1-36 and Examples 1-37 to 1-41). Similarly, comparisons of the ionic complexes (1a-Cis), (6c-Cis), and (6d-Cis) having Li$^+$, TMPA, and PP13 as cations, respectively, revealed that Li$^+$ showed the best results although TMPA and PP13 showed some effects (Example 1-21 or 1-30 was compared with Examples 1-34, 1-35). This may be because the content of anion sides as the effective moieties was decreased due to the large molecular weights of the cations of TMPA and PP13, and because some of TMPA and PP13 were reductively or oxidatively decomposed, and decomposition residues were deposited as highly resistive materials on the surface of an electrode.

As shown in Example 1-36, (1c-Cis) in which the central element of P was replaced with Si had a low solubility, and was not sufficiently dissolved at 1.0 mass %, but showed relatively good effects when added at 0.8 mass %. Moreover, as shown in Examples 1-37 to 1-41, addition of the difluoro ionic complexes (6a-Trans, 6b-Trans, 6c-Trans, and 6d-Trans) in the trans configuration having different cation species and the difluoro ionic complex (1c-Trans) in the trans configuration in which the central element of P was replaced with Si can similarly provide a higher discharge capacity (0° C.) after prolonged cycles at 60° C. and a higher 5 C-rate characteristic after prolonged cycles at 60° C. as compared with Comparative Example 1-1.

[Preparation of Nonaqueous Electrolytic Solutions According to the Present Invention: Nos. 2-1 to 2-31]

The nonaqueous electrolytic solutions Nos. 2-1 to 2-31 according to the present invention were prepared in a similar way as in the nonaqueous electrolytic solutions Nos. 1-1 to 1-41. That is, $LiPF_6$ as an electrolyte was dissolved and prepared in a nonaqueous solvent of EC and EMC (volume ratio 1:2) so that the concentration of $LiPF_6$ was 1 mol/L, and then various ionic complex/EMC solutions according to the present invention and the group (II) compounds were added to prepare the nonaqueous electrolytic solutions Nos. 2-1 to 2-31 as described below.

[Preparation of Nonaqueous Electrolytic Solutions: Nos. 2-1 to 2-11]

(1a-Cis) from Synthesis Example 1 as the ionic complex according to the present invention was added in predetermined amounts as shown in Table 3 below, and VEC was further added in predetermined amounts as shown in Table 3 to prepare the nonaqueous electrolytic solutions Nos. 2-1 to 2-11.

[Preparation of Nonaqueous Electrolytic Solutions: Nos. 2-12 to 2-24]

(1a-Cis) from Synthesis Example 1 as the ionic complex according to the present invention was added in predetermined amounts as shown in Table 3 below, and VEC as the group (II) compound was added in predetermined amounts as shown in Table 3 below, and (1a-Trans) from Synthesis Example 1 as the group (III) compound and/or (5a-Tetra) from Synthesis Example 2 as the group (IV) compound were further added in predetermined amounts as shown in Table 3 to prepare the nonaqueous electrolytic solutions Nos. 2-12 to 2-24.

[Preparation of Nonaqueous Electrolytic Solutions: Nos. 2-25 to 2-31]

(1a-Cis) form Synthesis Example 1 and/or (1b-Cis) from Synthesis Example 3 as the ionic complex according to the present invention were added in predetermined amounts as shown in Table 3 below, and VEC and/or ethynylethylene carbonate (EEC) as the group (II) compound were added in predetermined amounts as shown in Table 3, and (1a-Trans) from Synthesis Example 1 and/or (1b-Trans) from Synthesis Example 3 as the group (III) compound were added in predetermined amounts as shown in Table 3, and (5a-Tetra) from Synthesis Example 2 and/or (5b-Tetra) from Synthesis Example 5 as the group (IV) compound were further added in predetermined amounts as shown in Table 3 to prepare the nonaqueous electrolytic solutions Nos. 2-25 to 2-31.

[Preparation of Comparative Electrolytic Solution: No. 2-1]

Comparative electrolytic solution No. 2-1 was prepared as shown in Table 3 below in a similar procedure and composition as in the comparative electrolytic solution No. 1-4 except that 1.0 mass % of VEC was added instead of VC.

[Preparation of comparative electrolytic solution: No. 2-2]

Comparative electrolytic solution No. 2-2 was prepared as shown in Table 3 below in a similar procedure and composition as in the comparative electrolytic solution No. 1-5 except that 1.0 mass % of VEC was added instead of VC, and (1a-Trans) from Synthesis Example 1 was further added in a predetermined amount as shown in Table 3 below.

[Preparation of Comparative Electrolytic Solution: No. 2-3]

Comparative electrolytic solution No. 2-3 was prepared as shown in Table 3 below in a similar procedure and composition as in the comparative electrolytic solution No. 1-6 except that 1.0 mass % of VEC was added instead of VC, and (1a-Trans) from Synthesis Example 1 was further added in a predetermined amount as shown in Table 3 below.

Each of the nonaqueous electrolytic solutions Nos. 2-1 to 2-31 and the comparative electrolytic solutions Nos. 1-1 to 1-3, Nos. 2-1, 2-2, and 2-3 was subjected to accelerated tests to evaluate the stability after storage.

L stainless steel pressure containers equipped with a pressure gage were filled with 21 kg of the electrolytic solutions respectively, and stored at an environmental temperature of 45° C. for two months. Then, the internal pressure of the container was measured at an environmental temperature of 25° C. to calculate the gas yield generated during storage. The gas yields of the nonaqueous electrolytic solutions Nos. 2-1 to 2-31 and the comparative electrolytic solutions Nos. 1-2, 1-3, Nos. 2-1, 2-2, and 2-3 are shown in Table 3 as relative values when the gas yield of the comparative electrolytic solution No. 1-1 is taken as 100.

The nonaqueous electrolytic solutions containing 3 types of compounds: the difluoro ionic complex (1a-Cis) in the cis configuration from Synthesis Example 1, VEC, and the tetrafluoro ionic complex (5a-Tetra) from Synthesis Example 2 (the electrolytic solutions Nos. 2-15 to 2-17), and similarly the nonaqueous electrolytic solutions containing 4 types of compounds: (1a-Cis), VC, (1a-Trans), and the tetrafluoro ionic complex (5a-Tetra) (the electrolytic solutions Nos. 2-18 to 1-24) showed smaller gas yields during storage, preventing an increase in the internal pressure as compared with the nonaqueous electrolytic solutions which did not contain the tetrafluoro ionic complex (5a-Tetra) (the electrolytic solutions Nos. 2-12 to 2-14) (for example, based on comparisons of "the electrolytic solutions Nos. 2-12 to 2-14" with "the electrolytic solutions Nos. 2-16, 2-21"). Further, this gas-generation suppressing effect was found to increase as the ratio of the tetrafluoro ionic complex (5a-Tetra) to the difluoro ionic complex (1a-Cis), i.e., tetrafluoro ionic complex (1-Tetra)/difluoro ionic complex (1-Cis) (by the mass ratio) increased from 0.07 to 0.12 and 0.20 (for example, "the electrolytic solutions Nos. 2-15 to 2-17").

TABLE 3

| | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) | Gas yield during storage of electrolytic solution |
|---|---|---|---|---|---|---|---|---|---|---|---|
| Electrolytic solution No. 2-1 | Synthesis Example 1 (1a-Cis) | 0.05 | VEC | 1.0 | — | — | — | — | — | — | 124.2 |
| Electrolytic solution No. 2-2 | | 0.1 | | 1.0 | — | — | — | — | — | — | 129.5 |
| Electrolytic solution No. 2-3 | | 0.5 | | 1.0 | — | — | — | — | — | — | 154.3 |
| Electrolytic solution No. 2-4 | | 1.0 | | 1.0 | — | — | — | — | — | — | 173.9 |
| Electrolytic solution No. 2-5 | | 3.0 | | 1.0 | — | — | — | — | — | — | 203.6 |
| Electrolytic solution No. 2-6 | | 5.0 | | 1.0 | — | — | — | — | — | — | 223.6 |
| Electrolytic solution No. 2-7 | Synthesis Example 1 (1a-Cis) | 1.0 | VEC | 0.05 | — | — | — | — | — | — | 153.7 |
| Electrolytic solution No. 2-8 | | 1.0 | | 0.1 | — | — | — | — | — | — | 154.0 |
| Electrolytic solution No. 2-9 | | 1.0 | | 2.0 | — | — | — | — | — | — | 178.9 |
| Electrolytic solution No. 2-10 | | 1.0 | | 3.0 | — | — | — | — | — | — | 193.7 |
| Electrolytic solution No. 2-11 | | 1.0 | | 5.0 | — | — | — | — | — | — | 213.6 |
| Electrolytic solution No. 2-12 | Synthesis Example 1 (1a-Cis) | 1.0 | VEC | 1.0 | Synthesis Example 1 (1a-Trans) | 0.002 | 0.002 | — | — | — | 178.9 |
| Electrolytic solution No. 2-13 | | 1.0 | | 1.0 | | 0.005 | 0.005 | — | — | — | 179.3 |
| Electrolytic solution No. 2-14 | | 1.0 | | 1.0 | | 0.01 | 0.01 | — | — | — | 184.1 |
| Electrolytic solution No. 2-15 | Synthesis Example 1 (1a-Cis) | 1.0 | VEC | 1.0 | — | — | — | Synthesis Example 2 (5a-Tetra) | 0.07 | 0.07 | 164.0 |
| Electrolytic solution No. 2-16 | | 1.0 | | 1.0 | — | — | — | | 0.12 | 0.12 | 154.0 |
| Electrolytic solution No. 2-17 | | 1.0 | | 1.0 | — | — | — | | 0.20 | 0.20 | 139.5 |
| Electrolytic solution No. 2-18 | Synthesis Example 1 (1a-Cis) | 0.5 | VEC | 0.5 | Synthesis Example 1 (1a-Trans) | 0.001 | 0.002 | Synthesis Example 2 (5a-Tetra) | 0.035 | 0.07 | 144.6 |
| Electrolytic solution No. 2-19 | | 0.5 | | 1.0 | | 0.0025 | 0.005 | | 0.06 | 0.12 | 134.0 |
| Electrolytic solution No. 2-20 | | 1.0 | | 0.1 | | 0.002 | 0.002 | | 0.07 | 0.07 | 144.1 |
| Electrolytic solution No. 2-21 | | 1.0 | | 1.0 | | 0.005 | 0.005 | | 0.12 | 0.12 | 154.3 |
| Electrolytic solution No. 2-22 | | 1.0 | | 2.0 | | 0.01 | 0.01 | | 0.20 | 0.20 | 159.4 |
| Electrolytic solution No. 2-23 | | 3.0 | | 1.0 | | 0.015 | 0.005 | | 0.36 | 0.12 | 179.5 |

TABLE 3-continued

| | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) | Gas yield during storage of electrolytic solution |
|---|---|---|---|---|---|---|---|---|---|---|---|
| Electrolytic solution No. 2-24 | Synthesis Example 1 (1a-Cis) | 3.0 | — | — | Synthesis Example 1 (1a-Trans) | 0.03 | 0.01 | Synthesis Example 2 (5a-Tetra) | 0.60 | 0.20 | 203.7 |
| Electrolytic solution No. 2-25 | Synthesis Example 1 (1a-Cis) Synthesis Example 3 (1b-Cis) | 0.5 0.5 | VEC | — | Synthesis Example 1 (1a-Trans) | 0.004 | 0.004 | Synthesis Example 2 (5a-Tetra) | 0.14 | 0.14 | 151.5 |
| Electrolytic solution No. 2-26 | Synthesis Example 1 (1a-Cis) | 1.0 | VEC EEC | 0.5 0.5 | Synthesis Example 1 (1a-Trans) | 0.004 | 0.004 | Synthesis Example 2 (5a-Tetra) | 0.14 | 0.14 | 153.9 |
| Electrolytic solution No. 2-27 | Synthesis Example 1 (1a-Cis) | 1.0 | VEC | 1.0 | Synthesis Example 1 (1a-Trans) Synthesis Example 3 (1b-Trans) | 0.002 0.002 | 0.002 | Synthesis Example 2 (5a-Tetra) | 0.14 | 0.14 | 152.7 |
| Electrolytic solution No. 2-28 | Synthesis Example 1 (1a-Cis) | 1.0 | VEC | 1.0 | Synthesis Example 1 (1a-Trans) | 0.004 | 0.004 | Synthesis Example 2 (5a-Tetra) Synthesis Example 5 (5b-Tetra) | 0.07 0.07 | 0.07 | 158.0 |
| Electrolytic solution No. 2-29 | Synthesis Example 3 (1b-Cis) | 1.0 | VEC | 1.0 | Synthesis Example 1 (1a-Trans) | 0.004 | 0.004 | Synthesis Example 2 (5a-Tetra) | 0.14 | 0.14 | 153.0 |
| Electrolytic solution No. 2-30 | Synthesis Example 1 (1a-Cis) | 1.0 | VEC | 1.0 | Synthesis Example 3 (1b-Trans) | 0.004 | 0.004 | Synthesis Example 2 (5a-Tetra) | 0.14 | 0.14 | 154.1 |
| Electrolytic solution No. 2-31 | Synthesis Example 1 (1a-Cis) Synthesis Example 3 (1b-Cis) | 0.5 0.5 | VEC | 1.0 | Synthesis Example 1 (1a-Trans) | 0.004 | 0.004 | Synthesis Example 5 (5b-Tetra) | 0.14 | 0.14 | 157.0 |
| Comparative electrolytic solution No. 1-1 | — | — | — | — | — | — | — | — | — | — | 100.0 |
| Comparative electrolytic solution No. 1-2 | Synthesis Example 1 (1a-Cis) | 1.0 | — | — | — | — | — | — | — | — | 170.5 |
| Comparative electrolytic solution No. 1-3 | Synthesis Example 1 (1a-Cis) Synthesis Example 3 (1b-Cis) | 0.5 0.5 | — | — | — | — | — | — | — | — | 171.2 |
| Comparative electrolytic solution No. 2-1 | — | — | VEC | 1.0 | — | — | — | — | — | — | 120.9 |
| Comparative electrolytic solution No. 2-2 | — | — | VEC | 1.0 | Synthesis Example 1 (1a-Trans) | 1.0 | — | — | — | — | 172.0 |
| Comparative electrolytic solution No. 2-3 | — | — | VEC | 1.0 | Synthesis Example 1 (1a-Trans) | 1.0 | — | Synthesis Example 2 (5a-Tetra) | 0.12 | — | 153.7 |

Examples 2-1 to 2-31 and Comparative Examples 2-1 to 2-3: Production and Evaluation of Nonaqueous Electrolytic Solution Batteries Aluminum laminate housing cells (with a capacity of 30 mAh) including the test NMC positive electrode, the test graphite negative electrode, and a cellulose separator were respectively impregnated with one of the nonaqueous electrolytic solutions Nos. 2-1 to 2-31 and the comparative electrolytic solutions Nos. 2-1 and 2-2 shown in Table 3 in a similar procedure as in the nonaqueous electrolytic solution batteries according to Examples 1-1 to 1-41 and Comparative Examples 1-1 to 1-6 to produce the nonaqueous electrolytic solution batteries according to Examples 2-1 to 2-31 and Comparative Examples 2-1 to 2-3. Each of these nonaqueous electrolytic solutionelectrolytic solution batteries was subjected to the following evaluations as described above as in Examples 1-1 to 1-41 and Comparative Examples 1-1 to 1-6.

Evaluation 1: Low-temperature property (0° C.) after 500 cycles at 60° C.

Evaluation 2: 5 C-Rate Characteristic after 500 Cycles at 60° C.

Evaluation 3: Low-temperature property (0° C.) after stored at 60° C.

Various evaluations of the nonaqueous electrolytic solution batteries according to Examples 2-1 to 2-31 and Comparative Examples 2-1 to 2-3 are shown in Table 4 as relative values when the corresponding evaluation results of the nonaqueous electrolytic solution battery according to Comparative Example 1-1 are taken as 100.

TABLE 4

|  | Electrolytic solution No. | Low-temperature property (0° C.) after prolonged cycles at 60° C. | 5 C-rate characteristic (25° C.) after prolonged cycles at 60° C. | Low-temperature property (0° C.) after stored at 60° C. |
| --- | --- | --- | --- | --- |
| Example 2-1 | Electrolytic solution No. 2-1 | 125.3 | 118.3 | 115.4 |
| Example 2-2 | Electrolytic solution No. 2-2 | 129.1 | 122.3 | 119.0 |
| Example 2-3 | Electrolytic solution No. 2-3 | 131.2 | 125.4 | 121.8 |
| Example 2-4 | Electrolytic solution No. 2-4 | 132.4 | 126.8 | 122.7 |
| Example 2-5 | Electrolytic solution No. 2-5 | 131.3 | 126.0 | 121.8 |
| Example 2-6 | Electrolytic solution No. 2-6 | 125.7 | 117.2 | 115.1 |
| Example 2-7 | Electrolytic solution No. 2-7 | 127.0 | 118.1 | 115.5 |
| Example 2-8 | Electrolytic solution No. 2-8 | 130.4 | 125.7 | 116.3 |
| Example 2-9 | Electrolytic solution No. 2-9 | 131.7 | 126.3 | 122.5 |
| Example 2-10 | Electrolytic solution No. 2-10 | 130.8 | 124.9 | 121.9 |
| Example 2-11 | Electrolytic solution No. 2-11 | 127.3 | 118.0 | 114.9 |
| Example 2-12 | Electrolytic solution No. 2-12 | 133.2 | 127.0 | 123.2 |
| Example 2-13 | Electrolytic solution No. 2-13 | 134.6 | 127.3 | 123.3 |
| Example 2-14 | Electrolytic solution No. 2-14 | 135.7 | 127.6 | 123.4 |
| Example 2-15 | Electrolytic solution No. 2-15 | 133.4 | 126.9 | 123.3 |
| Example 2-16 | Electrolytic solution No. 2-16 | 134.7 | 127.7 | 123.5 |
| Example 2-17 | Electrolytic solution No. 2-17 | 134.8 | 127.2 | 123.4 |
| Example 2-18 | Electrolytic solution No. 2-18 | 125.6 | 124.1 | 121.5 |
| Example 2-19 | Electrolytic solution No. 2-19 | 130.3 | 125.8 | 122.2 |
| Example 2-20 | Electrolytic solution No. 2-20 | 131.5 | 126.0 | 122.3 |
| Example 2-21 | Electrolytic solution No. 2-21 | 135.0 | 129.2 | 124.0 |
| Example 2-22 | Electrolytic solution No. 2-22 | 131.9 | 126.6 | 123.0 |
| Example 2-23 | Electrolytic solution No. 2-23 | 131.5 | 126.1 | 122.7 |
| Example 2-24 | Electrolytic solution No. 2-24 | 126.2 | 121.3 | 117.3 |
| Example 2-25 | Electrolytic solution No. 2-25 | 134.8 | 128.8 | 123.0 |
| Example 2-26 | Electrolytic solution No. 2-26 | 134.6 | 128.9 | 123.4 |
| Example 2-27 | Electrolytic solution No. 2-27 | 134.9 | 129.0 | 123.7 |
| Example 2-28 | Electrolytic solution No. 2-28 | 134.6 | 128.7 | 123.2 |
| Example 2-29 | Electrolytic solution No. 2-29 | 134.6 | 128.2 | 122.8 |
| Example 2-30 | Electrolytic solution No. 2-30 | 134.7 | 128.7 | 123.0 |
| Example 2-31 | Electrolytic solution No. 2-31 | 134.5 | 128.4 | 122.6 |
| Comparative Example 1-1 | Comparative electrolytic solution No. 1-1 | 100.0 | 100.0 | 100.0 |
| Comparative Example 1-2 | Comparative electrolytic solution No. 1-2 | 125.1 | 117.8 | 114.9 |
| Comparative Example 1-3 | Comparative electrolytic solution No. 1-3 | 124.7 | 116.2 | 108.2 |
| Comparative Example 2-1 | Comparative electrolytic solution No. 2-1 | 118.0 | 110.3 | 106.5 |
| Comparative Example 2-2 | Comparative electrolytic solution No. 2-2 | 123.5 | 114.2 | 114.0 |
| Comparative Example 2-3 | Comparative electrolytic solution No. 2-3 | 124.3 | 114.5 | 114.2 |

(Positive electrode; NMC Negative electrode; Graphite)

Examples 2-1 to 2-11

As seen from the results in Tables 3 to 4, the nonaqueous electrolytic solution batteries including the difluoro ionic complex (1a-Cis) in the cis configuration from Synthesis Example 1 according to Example and VEC showed a higher discharge capacity (0° C.) after prolonged cycles at 60° C. and a higher 5 C-rate characteristic after prolonged cycles at 60° C. as compared with the nonaqueous electrolytic solution battery including neither the above ionic complex nor VEC (Comparative Example 1-1). Comparison of Example 2-4 with Comparative Example 1-2 revealed that the nonaqueous electrolytic solution battery including both (1a-Cis) and VEC showed higher effects than the nonaqueous electrolytic solution battery including (1a-Cis) only.

Further, comparisons of Example 2-4 with Comparative Example 2-2, and Example 2-16 with Comparative Example 2-3 revealed that the nonaqueous electrolytic solution batteries including the difluoro ionic complex (1a-Cis) in the cis configuration and VEC showed higher effects than the nonaqueous electrolytic solution batteries including the difluoro ionic complex (1a-Trans) in the trans configuration and VEC. This can be explained as follows. When the difluoro ionic complex (1a-Cis) in the nonaqueous electrolytic solution according to the present invention and a carbonate having an unsaturated bond such as VEC are included as in Examples 1-1 to 1-11 and Example 1-16 as described above, these additives are reductively decomposed in the order of (1a-Cis) and then VEC (or EEC) on a negative electrode during charge at the first cycle to form a stable film (SEI) on the surface of the negative electrode.

Further, comparisons of Examples 2-1 to 2-11 revealed that the effects of the difluoro ionic complex (1a-Cis) and VEC were able to be slightly observed even when the contents were each 0.05 mass %, and were increased as the content of the ionic complex increased from 0.05 mass % to 0.1, 0.5, and 1.0 mass %.

When the content of the difluoro ionic complex (1a-Cis) was 3.0 mass % (Example 2-5), the effects were slightly decreased as compared with the case where the content was 1.0 mass % (Example 2-4). In the case of 5.0 mass % (Example 2-6), the effects were significantly decreased as compared with the case of 1.0 mass %. This may be assumed as follows. Similarly to Examples 1-1 to 1-11 as described above, the viscosity of a nonaqueous electrolytic solution is increased when the content of the difluoro ionic complex (1a-Cis) reaches 3 mass % or more. This may restrict movement of cations within a nonaqueous electrolytic solution battery, resulting in decreased battery performance.

Examples 2-12 to 2-14

Examples 2-12 to 2-14 where the nonaqueous electrolytic solutions contained 3 types of compounds: the difluoro ionic complex (1a-Cis) in the cis configuration from Synthesis Example 1, the difluoro ionic complex (1a-Trans) in the trans configuration, and VEC were found to have a tendency for further increasing the discharge capacity (0° C.) after stored at 60° C. without decreasing the discharging capacity (0° C.) after prolonged cycles at 60° C. as compared with the nonaqueous electrolytic solution battery (Example 2-4) including (1a-Cis) and VEC. Further, as the ratio of the difluoro ionic complex in the trans conformation (1a-Trans) to the difluoro ionic complex in the cis conformation (1a-Cis), i.e., difluoro ionic complex (1-Trans)/difluoro ionic complex (1-Cis) (by the mass ratio) increased from 0.002 to 0.005 and 0.01, the discharge capacity (0° C.) after stored at 60° C. was found to show a moderate improving tendency without impairing the discharge capacity (0° C.) after prolonged cycles at 60° C.

Examples 2-15 to 2-17

Moreover, Examples 2-15 to 2-17 where the nonaqueous electrolytic solutions contained 3 types of compounds: the difluoro ionic complex (1a-Cis) in the cis configuration, VEC, and the tetrafluoro ionic complex (5a-Tetra) were found to have a tendency for further improving the discharge capacity (0° C.) after stored at 60° C. without decreasing the discharge capacity (0° C.) after prolonged cycles at 60° C. and the 5 C-rate characteristic (25° C.) as compared with the nonaqueous electrolytic solution battery (Example 2-4) containing the difluoro ionic complex (1a-Cis) and VEC. Further, as the ratio of the tetrafluoro ionic complex (5a-Tetra) to the difluoro ionic complex (1a-Cis) in the cis configuration, i.e., tetrafluoro ionic complex (5a-Tetra)/difluoro ionic complex (1-Cis) (by the mass ratio) increased from 0.07 to 0.12 and 0.20, the discharge capacity (0° C.) after stored at 60° C. was found to show an improving tendency without impairing the discharge capacity (0° C.) after prolonged cycles at 60° C. for all of the cases described above.

Examples 2-18 to 2-31

Further, as shown in Examples 2-18 to 2-31, the nonaqueous electrolytic solutions containing the difluoro ionic complex (1a-Cis) in the cis configuration from Synthesis Example 1 and/or the difluoro ionic complex in the cis conformation (1b-Cis) from Synthesis Example 3, VEC and/or EEC, and a compound(s) selected from the group consisting of the difluoro ionic complex in the trans conformation (1a-Trans) from Synthesis Example 1, the difluoro ionic complex (1b-Trans) in the trans configuration from Synthesis Example 3, the tetrafluoro ionic complex (5a-Tetra) from Synthesis Example 2, and the tetrafluoro ionic complex (5b-Tetra) from Synthesis Example 5 were found to have a tendency for improving the discharge capacity (0° C.) after prolonged cycles at 60° C., the 5 C-rate characteristic (25° C.), and the discharge capacity (0° C.) after stored at 60° C. as compared with the nonaqueous electrolytic solutions which did not contain the tetrafluoro ionic complexes (5a-Tetra) and (5b-Tetra) (Examples 2-12 to 2-14) and the nonaqueous electrolytic solutions which did not contain the difluoro ionic complexes (1a-Trans) and (1b-Trans) in the trans configuration (Examples 2-15 to 2-17) (For example, from comparisons of "Examples 2-12 to 2-17" with "Examples 2-21 and 2-25 to 2-31" where the contents of the group (I) compound and the group (II) compound were similar between the corresponding Examples).

[Preparation of Nonaqueous Electrolytic Solutions According to the Present Invention: Nos. 3-1 to 3-28]

The nonaqueous electrolytic solutions Nos. 3-1 to 3-28 according to the present invention were also prepared in a similar procedure as in the nonaqueous electrolytic solutions Nos. 1-1 to 1-41. That is, $LiPF_6$ as an electrolyte was dissolved and prepared in a nonaqueous solvent of EC and EMC (volume ratio 1:2) so that the concentration of $LiPF_6$ was 1 mol/L, and then various ionic complex/EMC solutions according to the present invention and the group (II) compounds as described above were added to prepare the nonaqueous electrolytic solutions Nos. 3-1 to 3-28 as described below.

[Preparation of Nonaqueous Electrolytic Solutions: Nos. 3-1 to 3-28]

(1a-Cis) from Synthesis Example 1 and/or (1b-Cis) from Synthesis Example 3 as the ionic complex according to the present invention were added in predetermined amounts as shown in Table 5 below, and fluoroethylene carbonate (FEC) and/or VC as the group (II) compound were added in predetermined amounts as shown in Table 5, and (1a-Trans) from Synthesis Example 1 and/or (1b-Trans) from Synthesis Example 3 as the group (III) compound were added in predetermined amounts as shown in Table 5, and (5a-Tetra) from Synthesis Example 2 and/or (5b-Tetra) from Synthesis Example 5 as the group (IV) compound were further added in predetermined amounts as shown in Table 5 to prepare the nonaqueous electrolytic solutions Nos. 3-1 to 3-28.

[Preparation of Comparative Electrolytic Solution: No. 3-1]

The comparative electrolytic solution No. 3-1 was prepared as shown in Table 5 below in a similar procedure and composition as in the comparative electrolytic solution No. 1-4 except that 2.0 mass % of FEC was added instead of VC.

[Preparation of Comparative Electrolytic Solution: No. 3-2]

The comparative electrolytic solution No. 3-2 was prepared as shown in Table 5 below in a similar procedure and composition as in the comparative electrolytic solution No. 1-5 except that 2.0 mass % of FEC was added instead of VC, (1a-Trans) from Synthesis Example 1 was further added in a predetermined amount as shown in Table 5 below.

[Preparation of Comparative Electrolytic Solution: No. 3-3]

The comparative electrolytic solution No. 3-3 was prepared as shown in Table 5 below in a similar procedure and composition as in the comparative electrolytic solution No. 1-6 except that 2.0 mass % of FEC was added instead of VC, and (1a-Trans) from Synthesis Example 1 and (5a-Tetra) from Synthesis Example 2 were further added in predetermined amounts as shown in Table 5 below.

The gas yields showed a similar tendency as described in the aforementioned evaluation results when the above electrolytic solutions were each subjected to accelerated tests as described above.

TABLE 5

| Electrolytic solution No. | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) | Gas yield during storage of electrolytic solution |
|---|---|---|---|---|---|---|---|---|---|---|---|
| Electrolytic solution No. 3-1 | Synthesis Example 1 (1a-Cis) | 0.05 | FEC | 2.0 | — | — | — | — | — | — | 125.8 |
| Electrolytic solution No. 3-2 | | 0.1 | | 2.0 | — | — | — | — | — | — | 131.2 |
| Electrolytic solution No. 3-3 | | 0.5 | | 2.0 | — | — | — | — | — | — | 156.3 |
| Electrolytic solution No. 3-4 | | 1.0 | | 2.0 | — | — | — | — | — | — | 176.2 |
| Electrolytic solution No. 3-5 | | 3.0 | | 2.0 | — | — | — | — | — | — | 206.2 |
| Electrolytic solution No. 3-6 | | 5.0 | | 2.0 | — | — | — | — | — | — | 226.5 |
| Electrolytic solution No. 3-7 | Synthesis Example 1 (1a-Cis) | 1.0 | FEC | 0.10 | — | — | — | — | — | — | 155.7 |
| Electrolytic solution No. 3-8 | | 1.0 | | 0.2 | — | — | — | — | — | — | 156.0 |
| Electrolytic solution No. 3-9 | | 1.0 | | 4.0 | — | — | — | — | — | — | 181.2 |
| Electrolytic solution No. 3-10 | | 1.0 | | 6.0 | — | — | — | — | — | — | 196.3 |
| Electrolytic solution No. 3-11 | | 1.0 | | 10.0 | — | — | — | — | — | — | 216.4 |
| Electrolytic solution No. 3-12 | Synthesis Example 1 (1a-Cis) | 1.0 | FEC | 2.0 | Synthesis Example 1 (1a-Trans) | 0.002 | 0.002 | — | — | — | 181.2 |
| Electrolytic solution No. 3-13 | | 1.0 | | 2.0 | | 0.005 | 0.005 | — | — | — | 181.6 |
| Electrolytic solution No. 3-14 | | 1.0 | | 2.0 | | 0.01 | 0.01 | — | — | — | 186.5 |
| Electrolytic solution No. 3-15 | Synthesis Example 1 (1a-Cis) | 1.0 | FEC | 2.0 | — | — | — | Synthesis Example 2 (5a-Tetra) | 0.07 | 0.07 | 166.1 |
| Electrolytic solution No. 3-16 | | 1.0 | | 2.0 | — | — | — | | 0.12 | 0.12 | 156.0 |
| Electrolytic solution No. 3-17 | | 1.0 | | 2.0 | — | — | — | | 0.20 | 0.20 | 141.3 |
| Electrolytic solution No. 3-18 | Synthesis Example 1 (1a-Cis) | 0.5 | FEC | 0.2 | Synthesis Example 1 (1a-Trans) | 0.001 | 0.002 | Synthesis Example 2 (5a-Tetra) | 0.035 | 0.07 | 146.5 |
| Electrolytic solution No. 3-19 | | 0.5 | | 2.0 | | 0.0025 | 0.005 | | 0.06 | 0.12 | 135.8 |
| Electrolytic solution No. 3-20 | | 1.0 | | 0.2 | | 0.002 | 0.002 | | 0.07 | 0.07 | 146.0 |
| Electrolytic solution No. 3-21 | | 1.0 | | 2.0 | | 0.005 | 0.005 | | 0.12 | 0.12 | 156.3 |
| Electrolytic solution No. 3-22 | | 1.0 | | 4.0 | | 0.01 | 0.01 | | 0.20 | 0.20 | 161.5 |
| Electrolytic solution No. 3-23 | | 3.0 | | 2.0 | | 0.015 | 0.005 | | 0.36 | 0.12 | 181.8 |

TABLE 5-continued

| Electrolytic solution No. | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) | Gas yield during storage of electrolytic solution |
|---|---|---|---|---|---|---|---|---|---|---|---|
| Electrolytic solution No. 3-24 | | 3.0 | | | | 0.03 | 0.01 | | 0.60 | 0.20 | 206.3 |
| Electrolytic solution No. 3-25 | Synthesis Example 1 (1a-Cis) Synthesis Example 3 (1b-Cis) | 0.5 0.5 | FEC | 0.5 | Synthesis Example 1 (1a-Trans) | 2.0 | 0.004 | Synthesis Example 2 (5a-Tetra) | 0.14 | 0.14 | 153.5 |
| Electrolytic solution No. 3-26 | Synthesis Example 1 (1a-Cis) | 1.0 | FEC VC | 1.0 | Synthesis Example 1 (1a-Trans) | 2.0 0.5 | 0.004 | Synthesis Example 2 (5a-Tetra) | 0.14 | 0.14 | 155.9 |
| Electrolytic solution No. 3-27 | Synthesis Example 1 (1a-Cis) | 1.0 | FEC | 1.0 | Synthesis Example 1 (1a-Trans) Synthesis Example 3 (1b-Trans) | 2.0 | 0.002 0.002 | Synthesis Example 2 (5a-Tetra) | 0.14 | 0.14 | 154.7 |
| Electrolytic solution No. 3-28 | Synthesis Example 1 (1a-Cis) | 1.0 | FEC | 1.0 | Synthesis Example 1 (1a-Trans) | 2.0 | 0.004 | Synthesis Example 2 (5a-Tetra) Synthesis Example 5 (5b-Tetra) | 0.07 0.07 | 0.07 0.07 | 160.1 |
| Comparative electrolytic solution No. 1-1 | — | | — | | — | | — | — | | — | 100.0 |
| Comparative electrolytic solution No. 1-2 | Synthesis Example 1 (1a-Cis) | 1.0 | — | | — | | — | — | | — | 170.5 |
| Comparative electrolytic solution No. 1-3 | Synthesis Example 3 (1b-Cis) | 0.5 0.5 | — | | — | | — | — | | — | 171.2 |
| Comparative electrolytic solution No. 3-1 | — | | FEC | | — | | — | — | | — | 122.5 |
| Comparative electrolytic solution No. 3-2 | — | | FEC | | Synthesis Example 1 (1a-Trans) | 2.0 | 1.0 | — | | — | 174.3 |
| Comparative electrolytic solution No. 3-3 | — | | FEC | | Synthesis Example 1 (1a-Trans) | 2.0 | 1.0 | Synthesis Example 2 (5a-Tetra) | 0.12 | — | 155.7 |

Examples 3-1 to 3-28 and Comparative Examples 3-1, 3-2, 3-3: Production and Evaluation of Nonaqueous Electrolytic Solution Batteries Aluminum laminate housing cells (with a capacity of 30 mAh) including the test NMC positive electrode, the test graphite negative electrode, and a cellulose separator were respectively impregnated with one of the nonaqueous electrolytic solutions Nos. 3-1 to 3-28 and the comparative electrolytic solutions Nos. 3-1 and 3-2 in a similar way as in the nonaqueous electrolytic solution batteries according to Examples 1-1 to 1-41 and Comparative Examples 1-1 to 1-6 to produce the nonaqueous electrolytic solution batteries according to Examples 3-1 to 3-28 and Comparative Examples 3-1, 3-2, and 3-3. Each of these nonaqueous electrolytic solution batteries was subjected to the following evaluations as described above as in Examples 1-1 to 1-41 and Comparative Examples 1-1 to 1-6.

Evaluation 1: Low-temperature property (0° C.) after 500 cycles at 60° C.

Evaluation 2: 5 C-rate characteristic after 500 cycles after at 60° C.

Evaluation 3: Low-temperature property (0° C.) after stored at 60° C.

Various evaluations of the nonaqueous electrolytic solution batteries according to Examples 3-1 to 3-28 and Comparative Examples 3-1 to 3-3 are shown in Table 6 as relative values when the corresponding evaluation results of the nonaqueous electrolytic solution battery according to Comparative Example 1-1 are taken as 100.

TABLE 6

| | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 3-1 | Electrolytic solution No. 3-1 | 127.5 | 120.3 | 114.9 |
| Example 3-2 | Electrolytic solution No. 3-2 | 131.4 | 124.4 | 118.4 |
| Example 3-3 | Electrolytic solution No. 3-3 | 133.5 | 127.6 | 121.2 |
| Example 3-4 | Electrolytic solution No. 3-4 | 134.7 | 129.0 | 122.1 |
| Example 3-5 | Electrolytic solution No. 3-5 | 133.6 | 128.2 | 121.2 |
| Example 3-6 | Electrolytic solution No. 3-6 | 127.9 | 119.2 | 114.6 |
| Example 3-7 | Electrolytic solution No. 3-7 | 129.2 | 120.1 | 115.0 |
| Example 3-8 | Electrolytic solution No. 3-8 | 132.7 | 127.9 | 115.7 |
| Example 3-9 | Electrolytic solution No. 3-9 | 134.0 | 128.5 | 121.9 |
| Example 3-10 | Electrolytic solution No. 3-10 | 133.1 | 127.1 | 121.3 |
| Example 3-11 | Electrolytic solution No. 3-11 | 129.5 | 120.0 | 114.3 |
| Example 3-12 | Electrolytic solution No. 3-12 | 135.5 | 129.2 | 122.6 |
| Example 3-13 | Electrolytic solution No. 3-13 | 136.9 | 129.5 | 122.7 |
| Example 3-14 | Electrolytic solution No. 3-14 | 138.1 | 129.8 | 122.8 |
| Example 3-15 | Electrolytic solution No. 3-15 | 135.7 | 129.1 | 122.7 |
| Example 3-16 | Electrolytic solution No. 3-16 | 137.1 | 129.9 | 122.9 |
| Example 3-17 | Electrolytic solution No. 3-17 | 137.2 | 129.4 | 122.8 |
| Example 3-18 | Electrolytic solution No. 3-18 | 127.8 | 126.3 | 120.8 |
| Example 3-19 | Electrolytic solution No. 3-19 | 132.6 | 128.0 | 121.6 |
| Example 3-20 | Electrolytic solution No. 3-20 | 133.8 | 128.2 | 121.7 |
| Example 3-21 | Electrolytic solution No. 3-21 | 137.4 | 131.5 | 123.4 |
| Example 3-22 | Electrolytic solution No. 3-22 | 134.2 | 128.8 | 122.4 |
| Example 3-23 | Electrolytic solution No. 3-23 | 133.8 | 128.3 | 122.1 |
| Example 3-24 | Electrolytic solution No. 3-24 | 128.4 | 123.3 | 116.7 |
| Example 3-25 | Electrolytic solution No. 3-25 | 137.2 | 131.1 | 122.4 |
| Example 3-26 | Electrolytic solution No. 3-26 | 137.0 | 131.2 | 122.8 |
| Example 3-27 | Electrolytic solution No. 3-27 | 137.3 | 131.3 | 123.1 |
| Example 3-28 | Electrolytic solution No. 3-28 | 136.9 | 131.0 | 122.6 |
| Comparative Example 1-1 | Comparative electrolytic solution No. 1-1 | 100.0 | 100.0 | 100.0 |
| Comparative Example 1-2 | Comparative electrolytic solution No. 1-2 | 125.1 | 117.8 | 114.9 |
| Comparative Example 1-3 | Comparative electrolytic solution No. 1-3 | 124.7 | 116.2 | 108.2 |
| Comparative Example 3-1 | Comparative electrolytic solution No. 3-1 | 120.0 | 112.2 | 105.9 |
| Comparative Example 3-2 | Comparative electrolytic solution No. 3-2 | 125.7 | 116.1 | 113.4 |
| Comparative Example 3-3 | Comparative electrolytic solution No. 3-3 | 126.5 | 116.4 | 113.6 |

Examples 3-1 to 3-11

As shown in Table 6, the nonaqueous electrolytic solution batteries including the difluoro ionic complex (1a-Cis) in the cis configuration from Synthesis Example 1 according to Example and FEC or trans-DFEC can provide a higher discharge capacity (0° C.) after prolonged cycles at 60° C. and a higher 5 C-rate characteristic after prolonged cycles at 60° C. as compared with the nonaqueous electrolytic solution battery which did not contain the above ionic complex and FEC or trans-DFEC (Comparative Example 1-1). Comparison of Example 3-4 with Comparative Example 1-2 revealed that the nonaqueous electrolytic solutionelectrolytic solution battery including both the above (1a-Cis) and FEC showed higher effects than the nonaqueous electrolytic solution battery including the above (1a-Cis) only.

Further, comparisons of Example 3-4 with Comparative Example 3-2, and Example 3-16 with Comparative Example 3-3 revealed that the nonaqueous electrolytic solution batteries including the difluoro ionic complex (1a-Cis) in the cis configuration and FEC showed higher effects than the nonaqueous electrolytic solution batteries including the difluoro ionic complex (1a-Trans) in the trans configuration and FEC. This can be explained as follows. When the difluoro ionic complex (1a-Cis) in the nonaqueous electrolytic solution according to the present invention and a carbonate having an fluorine atom such FEC are included, these additives are reductively decomposed on a negative electrode in the order of the difluoro ionic complex (1a-Cis) and then FEC (or trans-DFEC) during charge at the first cycle to form a stable film (SEI) on the surface of the negative electrode.

Further, comparison of Examples 3-1 to 3-11 showed that the difference in the effects of the difluoro ionic complex (1a-Cis) and FEC could be observed even when each of their contents were small (for example, 0.05 mass %), and the effects increased as the content of the above (1a-Cis) increased from 0.05 mass % to 0.1, 0.5, and 1.0 mass %.

When the content of the difluoro ionic complex (1a-Cis) was 3.0 mass % (Example 3-5), the effects were slightly decreased as compared with the case where the content was 1.0 mass % (Example 3-4). In the case of 5.0 mass % (Example 3-6), the effects were significantly decreased as compared with the case of 1.0 mass %. This may be assumed as follows. Similarly to Examples 1-1 to 1-11 above, the viscosity of a nonaqueous electrolytic solution is increased when the content of the difluoro ionic complex (1a-Cis) reaches 3 mass % or more. This may restrict movement of cations within a nonaqueous electrolytic solution battery, resulting in decreased battery performance.

Examples 3-12 to 3-14

Examples 3-12 to 4-14 where the nonaqueous electrolytic solutions contained 3 types of compounds: the difluoro ionic complexes (1a-Cis) and (1a-Trans) and FEC were found to have a tendency for further improving the discharge capacity (0° C.) after stored at 60° C. without decreasing the discharge capacity (0° C.) after prolonged cycles at 60° C. as compared with the nonaqueous electrolytic solution battery (Example 3-4) including the above (1a-Cis) and FEC. Further, as the ratio of the difluoro ionic complex (1a-Trans) in the trans configuration to the difluoro ionic complex in the cis conformation (1a-Cis), i.e., difluoro ionic complex (1-Trans)/difluoro ionic complex (1-Cis) (by the mass ratio) increased from 0.002 to 0.005 and 0.01, the discharge capacity (0° C.) after stored at 60° C. was found to show a moderate improving tendency without impairing the discharge capacity (0° C.) after prolonged cycles at 60° C.

Examples 3-15 to 3-17

Moreover, Examples 3-15 to 3-17 where the nonaqueous electrolytic solutions contained 3 types of compounds: the difluoro ionic complex (1a-Cis), FEC, and the tetrafluoro ionic complex (5a-Tetra) were found to have a tendency for further improving the discharge capacity (0° C.) after stored at 60° C. without decreasing the discharge capacity (0° C.) after prolonged cycles at 60° C. and the 5 C-rate characteristic (25° C.) as compared with the nonaqueous electrolytic solution battery (Example 3-4) containing the above (1a-Cis) and FEC. Further, as the ratio of the tetrafluoro ionic complex (5a-Tetra) to the difluoro ionic complex (1a-Cis) in the cis configuration, i.e., tetrafluoro ionic complex (5a-Tetra)/difluoro ionic complex (1-Cis) (by the mass ratio) increased from 0.07 to 0.12 and 0.20, the discharge capacity (0° C.) after stored at 60° C. was found to show an improving tendency without impairing the discharge capacity (0° C.) after prolonged cycles at 60° C.

Examples 3-18 to 3-28

As shown in Examples 3-18 to 3-28, the nonaqueous electrolytic solutions containing the difluoro ionic complex (1a-Cis) in the cis configuration from Synthesis Example 1 and/or the difluoro ionic complex (1b-Cis) in the cis configuration from Synthesis Example 3, FEC and/or VC, and a compound(s) selected from the group consisting of the difluoro ionic complex in the trans conformation (1a-Trans) from Synthesis Example 1, the difluoro ionic complex in the trans conformation (1b-Trans) from Synthesis Example 3, the tetrafluoro ionic complex (5a-Tetra) from Synthesis Example 2, and the tetrafluoro ionic complex (5b-Tetra) from Synthesis Example 5 were found to have a tendency for improving the discharge capacity (0° C.) after prolonged cycles at 60° C., the 5 C-rate characteristic (25° C.), and the discharge capacity (0° C.) after stored at 60° C. as compared with the nonaqueous electrolytic solutions which did not contain the tetrafluoro ionic complexes (5a-Tetra) and (5b-Tetra) (Examples 3-12 to 3-14) and the nonaqueous electrolytic solutions which did not contain the difluoro ionic complexes (1a-Trans) and (1b-Trans) in the trans configuration (Examples 3-15 to 3-17) (For example, from comparisons of "Examples 3-12 to 3-17" with "Examples 3-21 and 3-25 to 3-28" where the contents of the group (I) compound and the group (II) compound were similar between the corresponding Examples).

[Preparation of Nonaqueous Electrolytic Solutions According to the Present Invention: Nos. 4-1 to 4-20]

The nonaqueous electrolytic solutions Nos. 4-1 to 4-20 according to the present invention were also prepared in a similar way as in the nonaqueous electrolytic solutions Nos. 1-1 to 1-41. That is, $LiPF_6$ as an electrolyte was dissolved and prepared in a nonaqueous solvent of EC and EMC (volume ratio 1:2) so that the concentration of $LiPF_6$ was 1 mol/L, and then various ionic complex/EMC solutions according to the present invention and the group (II) compounds as described above were added to prepare the nonaqueous electrolytic solutions Nos. 4-1 to 4-20 as described below.

[Preparation of Nonaqueous Electrolytic Solutions: Nos. 4-1 to 4-20]

(1a-Cis) from Synthesis Example 1 and/or (1b-Cis) from Synthesis Example 3 as the ionic complex according to the present invention were added in predetermined amounts as shown in Table 7 below, and 1,6-diisocyanatohexane (1,6-DICNH) and/or VC as the group (II) compound were added in predetermined amounts as shown in Table 7, and (1a-Trans) from Synthesis Example 1 and/or (1b-Trans) from Synthesis Example 3 as the group (III) compound were added in predetermined amounts as shown in Table 7, and (5a-Tetra) from Synthesis Example 2 and/or (5b-Tetra) from Synthesis Example 5 as the group (IV) compound were further added in predetermined amounts as shown in Table 7 to the prepare nonaqueous electrolytic solutions Nos. 4-1 to 4-20.

[Preparation of Comparative Electrolytic Solution: No. 4-1]

The comparative electrolytic solution No. 4-1 was prepared as shown in Table 7 below in a similar procedure and composition as in the comparative electrolytic solution No. 1-4 except that 0.5 mass % of 1,6-DICNH was added instead of VC.

[Preparation of Comparative Electrolytic Solution: No. 4-2]

The comparative electrolytic solution No. 4-2 was prepared as shown in Table 7 below in a similar procedure and composition as in the comparative electrolytic solution No. 1-6 except that 0.5 mass % of 1,6-DICNH was added instead of VC, and (1a-Trans) from Synthesis Example 1 and (5a-Tetra) from Synthesis Example 2 were further added in predetermined amounts as shown in Table 7 below.

The gas yields showed a similar tendency as described in the aforementioned evaluation results when the above electrolytic solutions were each subjected to accelerated tests similar to those described in the above.

TABLE 7

| | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) | Gas yield during storage of electrolytic solution |
|---|---|---|---|---|---|---|---|---|---|---|---|
| Electrolytic solution No. 4-1 | Synthesis Example 1 (1a-Cis) | 1.0 | 1,6-DICNH | 0.05 | — | — | — | — | — | — | 153.4 |
| Electrolytic solution No. 4-2 | | 1.0 | | 0.1 | — | — | — | — | — | — | 153.7 |
| Electrolytic solution No. 4-3 | | 1.0 | | 0.3 | — | — | — | — | — | — | 178.5 |
| Electrolytic solution No. 4-4 | | 1.0 | | 1.0 | — | — | — | — | — | — | 193.3 |
| Electrolytic solution No. 4-5 | | 1.0 | | 2.0 | — | — | — | — | — | — | 213.2 |
| Electrolytic solution No. 4-6 | Synthesis Example 1 (1a-Cis) | 1.0 | 1,6-DICNH | 0.5 | Synthesis Example 1 (1a-Trans) | 0.002 | 0.002 | — | — | — | 178.5 |
| Electrolytic solution No. 4-7 | | 1.0 | | 0.5 | | 0.005 | 0.005 | — | — | — | 178.9 |
| Electrolytic solution No. 4-8 | | 1.0 | | 0.5 | | 0.01 | 0.01 | — | — | — | 183.7 |
| Electrolytic solution No. 4-9 | Synthesis Example 1 (1a-Cis) | 1.0 | 1,6-DICNH | 0.5 | — | — | — | Synthesis Example 2 (5a-Tetra) | 0.07 | 0.07 | 163.6 |
| Electrolytic solution No. 4-10 | | 1.0 | | 0.5 | — | — | — | | 0.12 | 0.12 | 153.7 |
| Electrolytic solution No. 4-11 | | 1.0 | | 0.5 | — | — | — | | 0.20 | 0.20 | 139.2 |
| Electrolytic solution No. 4-12 | Synthesis Example 1 (1a-Cis) | 0.5 | 1,6-DICNH | 0.1 | Synthesis Example 1 (1a-Trans) | 0.001 | 0.002 | Synthesis Example 2 (5a-Tetra) | 0.035 | 0.07 | 144.3 |
| Electrolytic solution No. 4-13 | | 0.5 | | 0.5 | | 0.0025 | 0.005 | | 0.06 | 0.12 | 133.8 |
| Electrolytic solution No. 4-14 | | 1.0 | | 0.1 | | 0.002 | 0.002 | | 0.07 | 0.07 | 143.8 |
| Electrolytic solution No. 4-15 | | 1.0 | | 0.5 | | 0.005 | 0.005 | | 0.12 | 0.12 | 154.0 |

TABLE 7-continued

| | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) | Gas yield during storage of electrolytic solution |
|---|---|---|---|---|---|---|---|---|---|---|---|
| Electrolytic solution No. 4-16 | Synthesis Example 1 (1a-Cis) | 1.0 | | | | | | | | | 159.1 |
| Electrolytic solution No. 4-17 | Synthesis Example 1 (1a-Cis) Synthesis Example 3 (1b-Cis) | 0.5 0.5 | 1,6-DICNH | 0.5 | Synthesis Example 1 (1a-Trans) | 0.004 | 0.004 | Synthesis Example 2 (5a-Tetra) | 0.14 | 0.14 | 151.2 |
| Electrolytic solution No. 4-18 | Synthesis Example 1 (1a-Cis) | 1.0 | 1,6-DICNH VC | 0.5 0.5 | Synthesis Example 1 (1a-Trans) | 0.004 | 0.004 | Synthesis Example 2 (5a-Tetra) | 0.14 | 0.14 | 153.6 |
| Electrolytic solution No. 4-19 | Synthesis Example 1 (1a-Cis) | 1.0 | 1,6-DICNH | 0.5 | Synthesis Example 1 (1a-Trans) Synthesis Example 3 (1b-Trans) | 0.002 0.002 | 0.002 0.002 | Synthesis Example 2 (5a-Tetra) | 0.14 | 0.14 | 152.4 |
| Electrolytic solution No. 4-20 | Synthesis Example 1 (1a-Cis) | 1.0 | 1,6-DICNH | 0.5 | Synthesis Example 1 (1a-Trans) | 0.004 | 0.004 | Synthesis Example 2 (5a-Tetra) Synthesis Example 5 (5b-Tetra) | 0.07 0.07 | 0.07 0.07 | 157.7 |
| Comparative electrolytic solution No. 1-1 | — | — | — | — | — | — | — | — | — | — | 100.0 |
| Comparative electrolytic solution No. 1-2 | Synthesis Example 1 (1a-Cis) | 1.0 | — | — | — | — | — | — | — | — | 170.5 |
| Comparative electrolytic solution No. 1-3 | Synthesis Example 1 (1a-Cis) Synthesis Example 3 (1b-Cis) | 0.5 0.5 | — | — | — | — | — | — | — | — | 171.2 |
| Comparative electrolytic solution No. 4-1 | — | — | 1,6-DICNH | — | Synthesis Example 1 (1a-Trans) | 0.5 | | | | | 120.6 |
| Comparative electrolytic solution No. 4-2 | — | — | 1,6-DICNH | — | Synthesis Example 1 (1a-Trans) | 0.5 | 1.0 | Synthesis Example 2 (5a-Tetra) | 0.12 | — | 153.4 |

Examples 4-1 to 4-20 and Comparative Examples 4-1 to 4-2: Production and Evaluation of Nonaqueous Electrolytic Solution Batteries Aluminum laminate housing cells (with a capacity of 30 mAh) including the test NMC positive electrode, the test graphite negative electrode, and a cellulose separator were respectively impregnated with one of the nonaqueous electrolytic solutions Nos. 4-1 to 4-20 and the comparative electrolytic solutions Nos. 4-1, 4-2 as shown in Table 8 below in a similar way as in the nonaqueous electrolytic solution batteries according to Examples 1-1 to 1-41 and Comparative Examples 1-1 to 1-6 described above to produce the nonaqueous electrolytic solution batteries according to Examples 4-1 to 4-20 and Comparative Examples 4-1 and 4-2. Each of these nonaqueous electrolytic solution batteries was subjected to the following evaluations as described above as in Examples 1-1 to 1-41 and Comparative Examples 1-1 to 1-6.

Evaluation 1: Low-temperature property (0° C.) after 500 cycles at 60° C.
Evaluation 2: 5 C-rate characteristic after 500 cycles at 60° C.
Evaluation 3: Low-temperature property (0° C.) after stored at 60° C.

Various evaluations of the nonaqueous electrolytic solution batteries according to Examples 4-1 to 4-20 and Comparative Examples 4-1 and 4-2 are shown in Table 8 as relative values when the corresponding evaluation results of the nonaqueous electrolytic solution batteries according to Comparative Example 1-1 are taken as 100.

Examples 4-1 to 4-20

The results shown in Table 8 revealed that as in Examples 3-1 to 3-28, the nonaqueous electrolytic solutions of Examples 4-1 to Example 4-20 in which (1a-Cis) from Synthesis Example 1 and/or (1b-Cis) from Synthesis Example 3 as the group (I) compound was used along with 1,6-DICNH and/or VC as the group (II) compound, and a compound(s) selected from (1a-Trans) from Synthesis Example 1 and (1b-Trans) from Synthesis Example 3 as the group (III) compound and the tetrafluoro ionic complex (5a-Tetra) from Synthesis Example 2 and the tetrafluoro ionic complex (5b-Tetra) from Synthesis Example 5 as the group (IV) compound can be further included were able to improve all of the discharge capacity (0° C.) after prolonged cycles at 60° C., the 5 C-rate characteristic (25° C.), and the discharge capacity (0° C.) after stored at 60° C. as compared with Comparative Examples 4-1 and 4-2.

Examples 5-1 to 5-16 and Comparative Examples 5-1 to 5-10: Production and Evaluation of Nonaqueous Electrolytic Solution Batteries A test NCA positive electrode was produced in accordance with the following procedure using a lithium-nickel-cobalt-aluminum composite oxide, $LiNi_{0.85}Co_{0.10}Al_{0.05}O_2$ (NCA) powder instead of the positive-electrode active material ($LiNi_{1/3}Mn_{1/3}Co_{1/3}O_2$ (NMC)) used in the nonaqueous electrolytic solution batteries according to Examples 1-1 to 1-41 and Comparative Examples 1-1 to 1-6.

Production of NCA Positive Electrode

A $LiNi_{0.85}Co_{0.10}Al_{0.05}O_2$ (NCA) powder (Todakogyo Corp.) and acetylene black (electrically conductive agent)

TABLE 8

| | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 4-1 | Electrolytic solution No. 4-1 | 127.7 | 118.8 | 116.2 |
| Example 4-2 | Electrolytic solution No. 4-2 | 131.2 | 126.5 | 117.0 |
| Example 4-3 | Electrolytic solution No. 4-3 | 132.5 | 127.0 | 123.3 |
| Example 4-4 | Electrolytic solution No. 4-4 | 131.6 | 125.7 | 122.7 |
| Example 4-5 | Electrolytic solution No. 4-5 | 128.0 | 118.7 | 115.6 |
| Example 4-6 | Electrolytic solution No. 4-6 | 134.0 | 127.7 | 124.0 |
| Example 4-7 | Electrolytic solution No. 4-7 | 135.4 | 128.0 | 124.1 |
| Example 4-8 | Electrolytic solution No. 4-8 | 136.6 | 128.3 | 124.2 |
| Example 4-9 | Electrolytic solution No. 4-9 | 134.2 | 127.6 | 124.1 |
| Example 4-10 | Electrolytic solution No. 4-10 | 135.6 | 128.4 | 124.3 |
| Example 4-11 | Electrolytic solution No. 4-11 | 135.7 | 127.9 | 124.2 |
| Example 4-12 | Electrolytic solution No. 4-12 | 126.4 | 124.9 | 122.2 |
| Example 4-13 | Electrolytic solution No. 4-13 | 131.1 | 126.6 | 123.0 |
| Example 4-14 | Electrolytic solution No. 4-14 | 132.3 | 126.7 | 123.1 |
| Example 4-15 | Electrolytic solution No. 4-15 | 135.9 | 130.0 | 124.8 |
| Example 4-16 | Electrolytic solution No. 4-16 | 132.7 | 127.3 | 123.8 |
| Example 4-17 | Electrolytic solution No. 4-17 | 135.7 | 129.2 | 123.8 |
| Example 4-18 | Electrolytic solution No. 4-18 | 135.7 | 130.0 | 124.4 |
| Example 4-19 | Electrolytic solution No. 4-19 | 135.8 | 129.8 | 124.5 |
| Example 4-20 | Electrolytic solution No. 4-20 | 135.4 | 129.5 | 124.0 |
| Comparative Example 1-1 | Comparative electrolytic solution No. 1-1 | 100.0 | 100.0 | 100.0 |
| Comparative Example 1-2 | Comparative electrolytic solution No. 1-2 | 125.1 | 117.8 | 114.9 |
| Comparative Example 1-3 | Comparative electrolytic solution No. 1-3 | 124.7 | 116.2 | 108.2 |
| Comparative Example 4-1 | Comparative electrolytic solution No. 4-1 | 118.7 | 111.0 | 107.1 |
| Comparative Example 4-2 | Comparative electrolytic solution No. 4-2 | 125.1 | 115.2 | 114.9 |

(Positive electrode; NMC Negative electrode; Graphite)

were dry-mixed, and uniformly dispersed and mixed into NMP where PVDF as a binding agent was pre-dissolved, and NMP for adjusting the viscosity was further added to prepare a NCA mixture paste. The resulting paste was applied to an aluminum foil (current collector), dried, and pressurized. Then the aluminum foil was processed into a predetermined size to obtain a test NCA positive electrode. The ratio of solid contents in the positive electrode was NCA:electrically conductive agent:PVDF=85:5:10 (by the mass ratio).

Production of Nonaqueous Electrolytic Solution Batteries

Aluminum laminate housing cells (with a capacity of 30 mAh) including the above test NMC positive electrode, the test graphite negative electrode, and a cellulose separator were respectively impregnated with one of the various nonaqueous electrolytic solutions and the various comparative nonaqueous electrolytic solutions shown in Table 9 to produce the nonaqueous electrolytic solution batteries according to Examples 5-1 to 5-16 and Comparative Examples 5-1 to 5-10. It is noted that Table 9 summarizes the compositions of the above electrolytic solutions.

TABLE 9

| Electrolytic solution No. | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|
| Electrolytic solution No. 1-4 | Synthesis Example 1 (1a-Cis) | 1.0 | VC | 1.0 | — | — | — | — | — | — |
| Electrolytic solution No. 1-13 | | | | | Synthesis Example 1 (1a-Trans) | 0.005 | 0.005 | — | — | — |
| Electrolytic solution No. 1-16 | | | | | — | — | — | Synthesis Example 2 (5a-Tetra) | 0.12 | 0.12 |
| Electrolytic solution No. 1-21 | | | | | Synthesis Example 1 (1a-Trans) | 0.005 | 0.005 | Synthesis Example 2 (5a-Tetra) | 0.12 | 0.12 |
| Electrolytic solution No. 2-4 | Synthesis Example 1 (1a-Cis) | 1.0 | VEC | 1.0 | — | — | — | — | — | — |
| Electrolytic solution No. 2-13 | | | | | Synthesis Example 1 (1a-Trans) | 0.005 | 0.005 | — | — | — |
| Electrolytic solution No. 2-16 | | | | | — | — | — | Synthesis Example 2 (5a-Tetra) | 0.12 | 0.12 |
| Electrolytic solution No. 2-21 | | | | | Synthesis Example 1 (1a-Trans) | 0.005 | 0.005 | Synthesis Example 2 (5a-Tetra) | 0.12 | 0.12 |
| Electrolytic solution No. 3-4 | Synthesis Example 1 (1a-Cis) | 1.0 | FEC | 2.0 | — | — | — | — | — | — |
| Electrolytic solution No. 3-13 | | | | | Synthesis Example 1 (1a-Trans) | 0.005 | 0.005 | — | — | — |
| Electrolytic solution No. 3-16 | | | | | — | — | — | Synthesis Example 2 (5a-Tetra) | 0.12 | 0.12 |
| Electrolytic solution No. 3-21 | | | | | Synthesis Example 1 (1a-Trans) | 0.005 | 0.005 | Synthesis Example 2 (5a-Tetra) | 0.12 | 0.12 |
| Electrolytic solution No. 4-3 | Synthesis Example 1 (1a-Cis) | 1.0 | 1,6-DICNH | 0.5 | — | — | — | — | — | — |
| Electrolytic solution No. 4-7 | | | | | Synthesis Example 1 (1a-Trans) | 0.005 | 0.005 | — | — | — |

TABLE 9-continued

| Electrolytic solution No. | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|
| Electrolytic solution No. 4-10 | — | — | — | — | — | — | — | Synthesis Example 2 (5a-Tetra) | 0.12 | 0.12 |
| Electrolytic solution No. 4-15 | — | — | — | — | Synthesis Example 1 (1a-Trans) | 0.005 | 0.005 | — | 0.12 | 0.12 |
| Comparative electrolytic solution No. 1-1 | — | — | — | — | — | — | — | — | — | — |
| Comparative electrolytic solution No. 1-2 | Synthesis Example 1 (1a-Cis) | 1.0 | — | — | — | — | — | — | — | — |
| Comparative electrolytic solution No. 1-4 | — | — | VC | 1.0 | — | — | — | — | — | — |
| Comparative electrolytic solution No. 1-5 | — | — | — | — | Synthesis Example 1 (1a-Trans) | 1.0 | — | Synthesis Example 2 (5a-Tetra) | 0.12 | — |
| Comparative electrolytic solution No. 2-1 | — | — | VEC | 1.0 | — | — | — | — | — | — |
| Comparative electrolytic solution No. 2-2 | — | — | FEC | 2.0 | Synthesis Example 1 (1a-Trans) | 1.0 | — | Synthesis Example 2 (5a-Tetra) | 0.12 | — |
| Comparative electrolytic solution No. 3-1 | — | — | — | — | — | — | — | — | — | — |
| Comparative electrolytic solution No. 3-2 | — | — | 1,6-DICNH | 0.5 | Synthesis Example 1 (1a-Trans) | 1.0 | — | Synthesis Example 2 (5a-Tetra) | 0.12 | — |
| Comparative electrolytic solution No. 4-1 | — | — | — | — | — | — | — | — | — | — |
| Comparative electrolytic solution No. 4-2 | — | — | — | — | Synthesis Example 1 (1a-Trans) | 1.0 | — | Synthesis Example 2 (5a-Tetra) | 0.12 | — |

Examples 5-1 to 5-16 and Comparative Examples 5-1 to 5-10: Evaluation of Test Cells Evaluation 1: Low-Temperature Property (0° C.) after 500 Cycles at 60° C.

Each of the nonaqueous electrolytic solution batteries according to Examples 5-1 to 5-16 and Comparative Examples 5-1 to 5-10 was evaluated as in Evaluation 1 performed for the nonaqueous electrolytic solution batteries according to Examples 1-1 to 1-41 and Comparative Examples 1-1 to 1-6 except that the charge upper limit voltage was changed from 4.3 V to 4.2 V, and constant-current and constant-voltage charge was performed at a 0.1 C rate (3 mA), and then discharge was performed at a constant current of a 0.2 C rate (6 mA) to a discharge cutoff voltage of 3.0 V in the initial charge and discharge as conditioning at an environmental temperature of 25° C., and subsequently the following charge-discharge cycle was repeated for 3 times: the charge upper limit voltage was changed from 4.3 V to 4.2 V, and constant-current and constant-voltage charge was performed at a 0.2 C rate (6 mA), and then discharge was performed at a constant current of a 0.2 C rate (6 mA) to a discharge cutoff voltage of 3.0 V. Evaluation was performed similarly except that after this conditioning, the charge upper limit voltage was changed from 4.3 V to 4.2 V when performing 500 cycles at an environmental temperature of 60° C., and constant-current and constant-voltage charge was performed to 4.2 V instead of 4.3 at 0° C. and a 0.2 C rate. The capacity obtained at that time was considered as the low-temperature property (0° C.) after prolonged cycles at 60° C.

Evaluation 2: 5 C-Rate Characteristic after 500 Cycles at 60° C.

Each of the nonaqueous electrolytic solution batteries according to Examples 5-1 to 5-16 and Comparative Examples 5-1 to 5-10 was evaluated as in Evaluation 2 preformed for the nonaqueous electrolytic solution batteries according to Examples 1-1 to 1-41 and Comparative Examples 1-1 to 1-6 except that constant-current and constant-voltage charge was performed to 4.2 V instead of 4.3 V at 25° C. and a 5 C rate. The capacity obtained at that time was considered as the 5 C-rate characteristic (25° C.) after prolonged cycles at 60° C.

Evaluation 3: Low-Temperature Property (0° C.) after Stored at 60° C.

Each of the nonaqueous electrolytic solution batteries according to Examples 5-1 to 5-16 and Comparative Examples 5-1 to 5-10 was evaluated as in Evaluation 3 performed for the nonaqueous electrolytic solution batteries according to Examples 1-1 to 1-41 and Comparative Examples 1-1 to 1-6 except that storage tests were performed at an environmental temperature of 60° C. (stored for 10 days after constant-current and constant-voltage charge to 4.2 V instead of 4.3 V), and constant-current and constant-voltage charge was performed to 4.2 V instead of 4.3 V at 0° C. and a 2 C rate. The capacity obtained at that time was considered as the low-temperature property (0° C.) after stored at 60° C.

Various evaluation results of the nonaqueous electrolytic solution batteries according to Examples 5-1 to 5-16 and Comparative Examples 5-1 to 5-10 are shown in Table 10 as relative values when the corresponding evaluation results of the nonaqueous electrolytic solution battery according to Comparative Example 5-1 are taken as 100.

TABLE 10

| | Electrolytic solution No. | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 5-1 | Electrolytic solution No. 1-4 | 136.4 | 130.6 | 126.5 |
| Example 5-2 | Electrolytic solution No. 1-13 | 138.6 | 131.1 | 127.1 |
| Example 5-3 | Electrolytic solution No. 1-16 | 138.9 | 131.5 | 127.3 |
| Example 5-4 | Electrolytic solution No. 1-21 | 140.1 | 134.1 | 128.7 |
| Example 5-5 | Electrolytic solution No. 2-4 | 134.4 | 128.7 | 124.6 |
| Example 5-6 | Electrolytic solution No. 2-13 | 136.6 | 129.2 | 125.2 |
| Example 5-7 | Electrolytic solution No. 2-16 | 136.8 | 129.6 | 125.4 |
| Example 5-8 | Electrolytic solution No. 2-21 | 138.0 | 132.1 | 126.7 |
| Example 5-9 | Electrolytic solution No. 3-4 | 136.7 | 130.9 | 123.9 |
| Example 5-10 | Electrolytic solution No. 3-13 | 138.9 | 131.4 | 124.5 |
| Example 5-11 | Electrolytic solution No. 3-16 | 139.1 | 131.8 | 124.7 |
| Example 5-12 | Electrolytic solution No. 3-21 | 140.4 | 134.4 | 126.1 |
| Example 5-13 | Electrolytic solution No. 4-3 | 135.2 | 129.5 | 125.3 |
| Example 5-14 | Electrolytic solution No. 4-7 | 137.4 | 130.0 | 125.9 |
| Example 5-15 | Electrolytic solution No. 4-10 | 137.6 | 130.4 | 126.1 |
| Example 5-16 | Electrolytic solution No. 4-15 | 138.9 | 132.9 | 127.5 |
| Comparative Example 5-1 | Comparative electrolytic solution No. 1-1 | 100.0 | 100.0 | 100.0 |
| Comparative Example 5-2 | Comparative electrolytic solution No. 1-2 | 126.4 | 119.0 | 116.0 |
| Comparative Example 5-3 | Comparative electrolytic solution No. 1-4 | 121.0 | 113.1 | 109.2 |
| Comparative Example 5-4 | Comparative electrolytic solution No. 1-5 | 128.1 | 117.9 | 117.7 |
| Comparative Example 5-5 | Comparative electrolytic solution No. 2-1 | 119.2 | 111.4 | 107.5 |
| Comparative Example 5-6 | Comparative electrolytic solution No. 2-2 | 126.2 | 116.2 | 116.0 |
| Comparative Example 5-7 | Comparative electrolytic solution No. 3-1 | 121.2 | 113.3 | 107.0 |
| Comparative Example 5-8 | Comparative electrolytic solution No. 3-2 | 128.3 | 118.2 | 115.4 |

TABLE 10-continued

|  | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Comparative Example 5-9 | Comparative electrolytic solution No. 4-1 | 119.9 | 112.1 | 108.2 |
| Comparative Example 5-10 | Comparative electrolytic solution No. 4-2 | 126.9 | 116.9 | 116.7 |

(Positive electrode; NCA Negative electrode; Graphite)

Examples 5-1 to 5-16

The results shown in Table 10 demonstrated that even in a case where NCA was used instead of NMC as a positive-electrode active material, the nonaqueous electrolytic solution batteries including each of the difluoro ionic complex (1a-Cis) in the cis configuration from Synthesis Example 1 as the group (I) compound according to Example, and VC, VEC, FEC, or 1,6-DICNH as the group (II) compound were able to provide a higher discharge capacity (0° C.) after prolonged cycles at 60° C. (0° C.) and 5 C-rate characteristic after prolonged cycles at 60° C. as compared with the nonaqueous electrolytic solution battery containing neither the above ionic complex nor VC (Comparative Example 5-1). Further, comparisons of Examples 5-1, 5-5, 5-9, and 5-13 with Comparative Example 5-2 revealed that the non-aqueous electrolytic solution batteries including both the above (1a-Cis) and the group (II) compound showed higher effects than the nonaqueous electrolytic solution battery including (1a-Cis) only.

Furthermore, comparison of Example 5-3 with Comparative Example 5-4 revealed that the nonaqueous electrolytic solution battery including 3 types of compounds: the above (1a-Cis), VC as the group (II) compound, and (5a-Tetra) as the group (IV) compound improved all of the discharge capacity (0° C.) after prolonged cycles at 60° C., the 5 C-rate characteristic (25° C.), and the discharge capacity (0° C.) after stored at 60° C. as compared with the nonaqueous electrolytic solution battery including 3 types of compounds: the difluoro ionic complex (1a-Trans) in the trans configuration, VC as the group (II) compound, and (5a-Tetra) as the group (IV) compound. Similar effects were also found from comparison of Example 5-7 (the group (II) compound; VEC) with Comparative Example 5-6, comparison of Example 5-11 (the group (II) compound; FEC) with Comparative Example 5-8, and comparison of Example 5-15 (the group (II) compound; 1,6-DICNH) with Comparative Example 5-10.

Moreover, as shown in Examples 5-4, 5-8, 5-12, and 5-16, the nonaqueous electrolytic solution containing predetermined amounts of compounds selected from the 4 groups of (1a-Cis), the group (II) compounds, and the group (III) compounds (the difluoro ionic complex (1a-Trans) in the trans configuration), and the group (IV) compounds (the tetrafluoro ionic complex (5a-Tetra)) were found to show a tendency for improving the discharge capacity (0° C.) after prolonged cycles at 60° C., the 5 C-rate characteristic (25° C.), and the discharge capacity (0° C.) after stored at 60° C. as compared with the nonaqueous electrolytic solution which did not contain (5a-Tetra) (Examples 5-2, 5-6, 5-10, and 5-14) and the nonaqueous electrolytic solution which did not contain (1a-Trans) (Examples 5-3, 5-7, 5-11, and 5-15).

Examples 6-1 to 6-16 and Comparative Examples 6-1 to 6-10: Production and Evaluation of Nonaqueous Electrolytic Solution Batteries For the nonaqueous electrolytic solution batteries according to Examples 6-1 to 6-16 and Comparative Examples 6-1 to 6-10, a test LFP positive electrode was produced in accordance with the following procedure using a LiFePO$_4$ (LFP) powder as a lithium-containing olivine-type phosphate salt in place of the positive-electrode active material (LiNi$_{0.85}$Co$_{0.10}$Al$_{0.05}$O$_2$ (NCA)) used in the nonaqueous electrolytic solution batteries according to Examples 5-1 to 5-16 and Comparative Examples 5-1 to 5-10.

Production of LFP Positive Electrode

A LiFePO$_4$ (LFP) powder, acetylene black (electrically conductive agent 1), and vapor-grown carbon fiber (VGCF®-H, Showa Denko K. K.) (electrically conductive agent 2) were dry-mixed, and uniformly dispersed and mixed into NMP in which PVDF as a binding agent was pre-dissolved, and NMP for adjusting the viscosity was further added to prepare an LFP mixture paste. The resulting paste was applied to an aluminum foil (current collector), dried, and pressurized. Then the aluminum foil was processed into a predetermined size to obtain a test LFP positive electrode. The ratio of solid contents in the negative electrode was LFP:electrically conductive agent 1:electrically conductive agent 2:PVDF=85:4:1:10 (by the mass ratio).

Production of Nonaqueous Electrolytic Solution Batteries

Aluminum laminate housing cell (with a capacity of 30 mAh) including the above test LFP positive electrode, the test graphite negative electrode, and a microporous polypropylene-polyethylene double layered separator were respectively impregnated with one of the various nonaqueous electrolytic solutions and the various comparative nonaqueous electrolytic solutions shown in Table 9 to produce the nonaqueous electrolytic solution batteries according to Examples 6-1 to 6-16 and Comparative Examples 6-1 to 6-10 in a similar way as in Examples 5-1 to 5-16 and Comparative Examples 5-1 to 5-10.

Examples 6-1 to 6-16 and Comparative Examples 6-1 to 6-10: Evaluation of Test Cells Evaluation 1: Low-Temperature Property (0° C.) after 500 Cycles at 60° C.

Each of the nonaqueous electrolytic solution batteries according to Examples 6-1 to 6-16 and Comparative Examples 6-1 to 6-10 was evaluated as described below. First, the cells produced as described above were subjected to conditioning at an environmental temperature of 25° C. under the following conditions. That is, constant-current and constant-voltage charge was performed as the initial charge/discharge to a charge upper limit voltage of 3.6 V at a 0.1 C rate (3 mA), and discharge was then performed to a discharge cutoff voltage of 2.0 V at a constant current of a 0.2 C rate (6 mA), and subsequently the following charge-discharge cycle was repeated for 3 times: constant-current and constant-voltage charge was performed to a charge upper limit voltage of 3.6 V at a 0.2 C rate (6 mA), and discharge was then performed to a discharge cutoff voltage of 2.0 V at a constant current of a 0.2 C rate (6 mA). After this conditioning, charge and discharge tests were performed at an environmental temperature of 60° C. The following charge-discharge cycle was repeated for 500 times: constant-current and constant-voltage charge was performed at a 3 C rate (90 mA) to a charge upper limit voltage of 3.6 V, and discharge was performed at a constant current of a 3 C rate (90 mA) to a discharge cutoff voltage of 2.0 V. Next, the nonaqueous electrolytic solution batteries were cooled to 25° C., and again discharged to 2.0 V. Then constant-current and constant-voltage charge was performed to 3.6 V at a 0.2 C rate at 0° C. Further, discharge was performed at a constant current of a 5 C rate (150 mA) to a discharge cutoff voltage of 2.0 V, and the capacity obtained at that time was taken as the low-temperature property (0° C.) after prolonged cycles at 60° C.

Evaluation 2: 5 C-Rate Characteristic after 500 Cycles at 60° C.

After performing 500 cycles at an environmental temperature of 60° C. in Evaluation 1 as described above, the nonaqueous electrolytic solution batteries were cooled to 25° C., and then again discharged to 2.0 V. Subsequently constant-current and constant-voltage charge was performed to 3.6 V at a 5 C rate at 25° C. Further, discharge was performed at a constant current of a 5 C rate (150 mA) to a discharge cutoff voltage of 2.0 V, and the capacity obtained at that time was taken as the 5 C-rate characteristic (25° C.) after prolonged cycles at 60° C.

Evaluation 3: Low-Temperature Property (0° C.) after Stored at 60° C.

Each of the nonaqueous electrolytic solution batteries according to Examples 6-1 to 6-16 and Comparative Examples 6-1 to 6-10 was subjected to storage tests (stored for 10 days after charged to 3.6 V) at an environmental temperature of 60° C. Next, the nonaqueous electrolytic solution batteries were cooled to 25° C., and again discharged to 2.0 V. Then constant-current and constant-voltage charge was performed to 3.6 V at a 0.2 C rate at 0° C. Further, discharge was performed at a constant current of a 5 C rate (150 mA) to a discharge cutoff voltage of 2.0 V while maintaining the temperature at 0° C., and the capacity obtained at that time was taken as the low-temperature property (0° C.) after stored at 60° C.

Various evaluation results of the nonaqueous electrolytic solutionelectrolytic solution batteries according to Examples 6-1 to 6-16 and Comparative Examples 6-1 to 6-10 are shown in Table 11 as relative values when the corresponding evaluation results of the nonaqueous electrolytic solution battery according to Comparative Example 6-1 are taken as 100.

TABLE 11

|  | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 6-1 | Electrolytic solution No. 1-4 | 133.2 | 127.5 | 123.5 |
| Example 6-2 | Electrolytic solution No. 1-13 | 135.4 | 128.0 | 124.1 |
| Example 6-3 | Electrolytic solution No. 1-16 | 135.6 | 128.4 | 124.3 |
| Example 6-4 | Electrolytic solution No. 1-21 | 136.3 | 130.4 | 125.1 |
| Example 6-5 | Electrolytic solution No. 2-4 | 131.2 | 125.6 | 121.6 |
| Example 6-6 | Electrolytic solution No. 2-13 | 133.3 | 126.1 | 122.2 |
| Example 6-7 | Electrolytic solution No. 2-16 | 133.5 | 126.5 | 122.4 |
| Example 6-8 | Electrolytic solution No. 2-21 | 134.2 | 128.5 | 123.3 |
| Example 6-9 | Electrolytic solution No. 3-4 | 133.5 | 127.8 | 121.0 |
| Example 6-10 | Electrolytic solution No. 3-13 | 135.6 | 128.3 | 121.6 |
| Example 6-11 | Electrolytic solution No. 3-16 | 135.8 | 128.7 | 121.8 |
| Example 6-12 | Electrolytic solution No. 3-21 | 136.5 | 130.7 | 122.6 |
| Example 6-13 | Electrolytic solution No. 4-3 | 132.0 | 126.4 | 122.4 |
| Example 6-14 | Electrolytic solution No. 4-7 | 134.2 | 126.9 | 123.0 |
| Example 6-15 | Electrolytic solution No. 4-10 | 134.3 | 127.3 | 123.2 |
| Example 6-16 | Electrolytic solution No. 4-15 | 135.1 | 129.2 | 124.0 |
| Comparative Example 6-1 | Comparative electrolytic solution No. 1-1 | 100.0 | 100.0 | 100.0 |
| Comparative Example 6-2 | Comparative electrolytic solution No. 1-2 | 124.0 | 116.7 | 113.9 |
| Comparative Example 6-3 | Comparative electrolytic solution No. 1-4 | 118.7 | 111.0 | 107.1 |
| Comparative Example 6-4 | Comparative electrolytic solution No. 1-5 | 125.1 | 115.2 | 115.0 |
| Comparative Example 6-5 | Comparative electrolytic solution No. 2-1 | 116.9 | 109.3 | 105.5 |
| Comparative Example 6-6 | Comparative electrolytic solution No. 2-2 | 123.2 | 113.4 | 113.2 |
| Comparative Example 6-7 | Comparative electrolytic solution No. 3-1 | 119.0 | 111.2 | 105.0 |
| Comparative Example 6-8 | Comparative electrolytic solution No. 3-2 | 125.3 | 115.4 | 112.7 |
| Comparative Example 6-9 | Comparative electrolytic solution No. 4-1 | 117.7 | 110.0 | 106.2 |
| Comparative Example 6-10 | Comparative electrolytic solution No. 4-2 | 123.9 | 114.1 | 113.9 |

(Positive electrode; LFP Negative electrode; Graphite)

Examples 6-1 to 6-16

As seen from the results in Table 11, Examples 6-1 to 6-16 had a similar tendency as in Examples 5-1 to 5-16. That is, even in a case where LFP is used instead of NCA as a positive-electrode active material, the nonaqueous electrolytic solutions in which (1a-Cis) from Synthesis Example 1 as the group (I) compound according to Example was used along with VC, VEC, FEC, and/or 1,6-DICNH as the group (II) compound, and a compound(s) selected from (1a-Trans) from Synthesis Example 1 as the group (III) compound and the tetrafluoro ionic complex (5a-Tetra) shown in Synthesis Example 2 as the group (IV) compound can be further included were found to improve all of the discharge capacity (0° C.) after prolonged cycles at 60° C., the 5 C-rate characteristic (25° C.), and the discharge capacity (0° C.) after stored at 60° C. as compared with Comparative Examples 6-1 to 6-10.

Examples 7-1 to 7-10 and Comparative Examples 7-1 to 7-15: Production and Evaluation of Nonaqueous Electrolytic Solution Batteries

[Preparation of Nonaqueous Electrolytic Solutions Nos. 7-1 to 7-5 and Comparative Electrolytic Solutions Nos. 7-2 to 7-8]

In a dry box under a nitrogen atmosphere of a dew point of −50° C. or less, $LiPF_6$ as an electrolyte was dissolved and prepared in a preheated and dissolved nonaqueous solvent of EC and EMC, and FEC as the group (II) compound (volume ratio 25:70:5/mass ratio 29.7:63.6:6.7) so that the concentration of $LiPF_6$ was 1.2 mol/L, and then various ionic complex/EMC solutions according to the present invention and the group (II) compounds were added to prepare the nonaqueous electrolytic solutions Nos. 7-1 to 7-5 and comparative electrolytic solutions Nos. 7-2 to 7-8 according to the present invention. That is, compounds selected from the 4 groups of (1a-Cis) from Synthesis Example 1 as the group (I) compound, VC, VEC, EEC, 2-allylsuccinic anhydride, and 1,6-DICNH as the group (II) compound, (1a-Trans) from Synthesis Example 1 as the group (III) compound, and the tetrafluoro ionic complex (5a-Tetra) from Synthesis Example 2 as the group (IV) compound were each added in predetermined amounts shown in Table 12 below to prepare nonaqueous electrolytic solutions Nos. 7-1 to 7-5 and comparative electrolytic solutions Nos. 7-2 to 7-8.

[Preparation of Nonaqueous Electrolytic Solutions Nos. 7-6 to 7-10 and Comparative Electrolytic Solutions Nos. 7-9 to 7-15]

In a dry box under a nitrogen atmosphere of a dew point of −50° C. or less, $LiPF_6$ as an electrolyte was dissolved and prepared in a preheated and dissolved nonaqueous solvent of EC and EMC, and FEC as the group (II) compound (volume ratio 20:70:10/mass ratio 23.6:63.1:13.3) so that the concentration of $LiPF_6$ was 1.2 mol/L, and then various ionic complex/EMC solutions according to the present invention and the group (II) compounds as described above were added to prepare the nonaqueous electrolytic solutions Nos. 7-6 to 7-10 and comparative electrolytic solutions Nos. 7-9 to 7-15 according to the present invention. That is, compounds selected from the 4 groups of (1a-Cis) from Synthesis Example 1 as the group (I) compound, VC, VEC, EEC, 2-allylsuccinic anhydride, and 1,6-DICNH as the group (II) compound, (1a-Trans) from Synthesis Example 1 as the group (III) compound, and the tetrafluoro ionic complex (5a-Tetra) from Synthesis Example 2 as the group (IV) compound were each added in predetermined amounts shown in Table 12 below to prepare nonaqueous electrolytic solutions Nos. 7-6 to 7-10 and comparative electrolytic solutions Nos. 7-9 to 7-15.

It is noted that these preparations were performed as follows while cooled to control the solution temperature at 40° C. or below. First, 30 mass % of the entire $LiPF_6$ was added and dissolved in a predetermined amount of EMC, and another 30 mass % of the entire $LiPF_6$ was then added and dissolved. This was repeated for one more time, and then finally the remaining 10 mass % of $LiPF_6$ was added and dissolved. Subsequently, predetermined amounts of preheated and dissolved EC and FEC as well as EMC were added and mixed, and then various ionic complex/EMC solutions and the group (II) compounds shown in Table 12 below were added, and the volume ratio of EC, EMC, and FEC was finally adjusted to the aforementioned predetermined ratio, and then stirred for 1 hour.

[Preparation of Comparative Electrolytic Solution: No. 7-1]

In a dry box under a nitrogen atmosphere of a dew point of −50° C. or less, $LiPF_6$ as an electrolyte was dissolved and prepared in a preheated and dissolved nonaqueous solvent of EC and EMC (volume ratio 30:70/mass ratio 35.9:64.1) so that the concentration of $LiPF_6$ was 1.2 mol/L to prepare comparative electrolytic solution No. 7-1. It is noted that the comparative electrolytic solution No. 7-1 was prepared in the same way as in the nonaqueous electrolytic solutions 7-1 to 7-5 according to the present invention except that the various ionic complex/EMC solutions shown in Table 12 below and the group (II) compounds described above were not added.

TABLE 12

| Electrolytic solution No. | Li salt LiPF₆ (mol/liter) | Nonaqueous solvent EC (mass %) | Nonaqueous solvent EMC (mass %) | Group (I) compound (Cis isomer) | Content (mass %) | Group (II) compound 1 | Content (mass %) | Group (II) compound 2 | Content (mass %) | Group (III) compound Trans isomer | Content (mass %) | Trans isomer/Cis isomer (mass ratio) | Group (IV) compound Tetrafluoro complex | Content (mass %) | Tetrafluoro complex/Cis isomer (mass ratio) |
|---|---|---|---|---|---|---|---|---|---|---|---|---|---|---|---|
| Electrolytic solution No. 7-1 | 1.2 | 29.7 | 63.6 | Synthesis Example 1 (1a-Cis) | 1.2 | FEC | 1.2 | VC | 6.7 | Synthesis Example 1 (1a-Trans) | 0.006 | 0.005 | Synthesis Example 2 (5a-Tetra) | 0.144 | 0.12 |
| Electrolytic solution No. 7-2 | | | | | | | | VEC | | | 1.2 | | | | |
| Electrolytic solution No. 7-3 | | | | | | | | EEC | 1.2 | | | | | | |
| Electrolytic solution No. 7-4 | | | | | | | | 2-allylsuccinic anhydride | 0.6 | | | | | | |
| Electrolytic solution No. 7-5 | | | | | | | | 1,6-DICNH | 0.6 | | | | | | |
| Electrolytic solution No. 7-6 | 1.2 | 23.6 | 63.1 | Synthesis Example 1 (1a-Cis) | 1.2 | FEC | 1.2 | VC | 13.3 | Synthesis Example 1 (1a-Trans) | 0.006 | 0.005 | Synthesis Example 2 (5a-Tetra) | 0.144 | 0.12 |
| Electrolytic solution No. 7-7 | | | | | | | | VEC | | | 1.2 | | | | |
| Electrolytic solution No. 7-8 | | | | | | | | EEC | 1.2 | | | | | | |
| Electrolytic solution No. 7-9 | | | | | | | | 2-allylsuccinic anhydride | 0.6 | | | | | | |
| Electrolytic solution No. 7-10 | | | | | | | | 1,6-DICNH | 0.6 | | | | | | |
| Comparative electrolytic solution No. 7-1 | 1.2 | 35.9 | 64.1 | — | | FEC | 1.2 | — | | — | | — | — | | — |
| Comparative electrolytic solution No. 7-2 | 1.2 | 29.7 | 63.6 | Synthesis Example 1 (1a-Cis) | 1.2 | — | | — | | — | | — | — | | — |
| Comparative electrolytic solution No. 7-3 | | | | — | | — | | VC | 1.2 | Synthesis Example 1 (1a-Trans) | 1.2 | — | Synthesis Example 2 (5a-Tetra) | 0.144 | — |
| Comparative electrolytic solution No. 7-4 | | | | — | | — | | VEC | 1.2 | | | | | | |
| Comparative electrolytic solution No. 7-5 | | | | — | | — | | EEC | 1.2 | | | | | | |
| Comparative electrolytic solution No. 7-6 | | | | — | | — | | 2-allylsuccinic anhydride | 0.6 | | | | | | |
| Comparative electrolytic solution No. 7-7 | | | | — | | — | | 1,6-DICNH | 0.6 | | | | | | |
| Comparative electrolytic solution No. 7-8 | | | | — | | — | | | | | | | | | |

TABLE 12-continued

| Electrolytic solution No. | Li salt LiPF$_6$ (mol/liter) | Nonaqueous solvent EC (mass %) | Nonaqueous solvent EMC (mass %) | Group (I) compound (Cis isomer) | Content (mass %) | Group (II) compound 1 | Content (mass %) | Group (II) compound 2 | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|---|---|---|---|---|
| Comparative electrolytic solution No. 7-9 | 1.2 | 23.6 | 63.1 | — | — | FEC | 13.3 | — | — | — | — | — | — | — | — |
| Comparative electrolytic solution No. 7-10 | | | | Synthesis Example 1 (1a-Cis) | 1.2 | — | — | — | — | — | — | — | — | — | — |
| Comparative electrolytic solution No. 7-11 | | | | — | — | — | — | VC | 1.2 | Synthesis Example 1 (1a-Trans) | 1.2 | — | Synthesis Example 2 (5a-Tetra) | 0.144 | — |
| Comparative electrolytic solution No. 7-12 | | | | — | — | — | — | VEC | 1.2 | | | | | | |
| Comparative electrolytic solution No. 7-13 | | | | — | — | — | — | EEC | 1.2 | | | | | | |
| Comparative electrolytic solution No. 7-14 | | | | — | — | — | — | 2-allylsuccinic anhydride | 0.6 | | | | | | |
| Comparative electrolytic solution No. 7-15 | | | | — | — | — | — | 1,6-DICNH | 0.6 | | | | | | |

Examples 7-1 to 7-10 and Comparative Examples 7-1 to 7-15: Production and Evaluation of Nonaqueous Electrolytic Solution Batteries A test OLO-1 positive electrode was produced as described below using a $0.5[LiNi_{0.5}Mn_{0.5}O_2]\cdot 0.5[Li_2MnO_3]\cdot(OLO-1)$ powder as a lithium-rich layered transition-metal oxide having the stratified rock-salt structure in place of the positive-electrode active material ($LiNi_{0.85}Co_{0.10}Al_{0.05}O_2$(NCA)) used in the nonaqueous electrolytic solution batteries according to Examples 5-1 to 5-16 and Comparative Examples 5-1 to 5-10.

Production of OLO-1 Positive Electrode

A $0.5[LiNi_{0.5}Mn_{0.5}O_2]\cdot 0.5[LiMnO_3]$ (OLO-1) powder, acetylene black (electrically conductive agent 1), and vapor-grown carbon fiber (VGCF®-H, Showa Denko K. K.) (electrically conductive agent 2) were dry-mixed, and uniformly dispersed and mixed into NMP in which PVDF as a binding agent was pre-dissolved, and NMP for adjusting the viscosity was then further added to prepare an OLO-1 mixture paste. The resulting paste was applied to an aluminum foil (current collector), dried, and pressurized. Then the aluminum foil was processed into a predetermined size to obtain a test OLO-1 positive electrode. The ratio of solid contents in the positive electrode was OLO-1:electrically conductive agent 1:electrically conductive agent 2:PVDF=85:4:1:10 (by the mass ratio).

Production of Nonaqueous Electrolytic Solution Batteries

Aluminum laminate housing cells (with a capacity of 30 mAh) including the above test OLO-1 positive electrode, the test graphite negative electrode, and a microporous polypropylene-polyethylene double layered separator were respectively impregnated with one of the various nonaqueous electrolytic solutions and the various comparative nonaqueous electrolytic solutions shown in Table 12 to produce the nonaqueous electrolytic solution batteries according to Examples 7-1 to 7-10 and Comparative Examples 7-1 to 7-15 in a similar way as in Examples 5-1 to 5-16 and Comparative Examples 5-1 to 5-10.

Examples 7-1 to 7-10, Comparative Examples 7-1 to 7-15: Evaluation of Test Cells Evaluation 1: Low-Temperature Property (0° C.) after 300 Cycles at 60° C.

Each of the nonaqueous electrolytic solution batteries according to Examples 7-1 to 7-10 and Comparative Examples 7-1 to 7-15 was evaluated as described below. First, conditioning was performed at an environmental temperature of 25° C. under the following conditions. That is, constant-current and constant-voltage charge was performed as the initial charge/discharge at an environmental temperature of 25° C. using the produced cells to a charge upper limit voltage of 4.2 V at a 0.05 C rate (1.5 mA), and discharge was performed at a constant current of a 0.1 C rate (3 mA) to a discharge cutoff voltage of 2.5 V. Then, the following charge-discharge cycle was repeated for 5 times: constant-current and constant-voltage charge was performed at a 0.1 C rate (3 mA) to a charge upper limit voltage of 4.4 V, and then discharge was performed at a constant current of a 0.1 C rate (3 mA) to a discharge cutoff voltage of 2.5 V. After this conditioning, the following charge-discharge cycle was repeated for 3 times at an environmental temperature of 25° C.: constant-current and constant-voltage charge was performed to a charge upper limit voltage of 4.6 V at a 0.1 C rate (3 mA), and discharge was then performed at a constant current of a 0.2 C rate (6 mA) to a discharge cutoff voltage of 2.5 V. Then, charge/discharge tests were performed at an environmental temperature of 60° C. The following charge-discharge cycle was repeated for 300 times: constant-current and constant-voltage charge was performed at a 1 C rate (30 mA) to a charge upper limit voltage of 4.6 V, and discharge was performed at a constant current of a 2 C rate (60 mA) to a discharge cutoff voltage of 2.5 V. Next, the nonaqueous electrolytic solution batteries were cooled to 25° C., and again discharged to 2.5 V. Then constant-current and constant-voltage charge was performed to 4.6 V at a 0.2 C rate at 0° C. Further, discharge was performed at a constant current of a 3 C rate (90 mA) to a discharge cutoff voltage of 2.5 V, and the capacity obtained at that time was taken as the low-temperature property (0° C.) after prolonged cycles at 60° C.

Evaluation 2: 3 C-Rate Characteristic after 300 Cycles at 60° C.

After performing 300 cycles at an environmental temperature of 60° C. in Evaluation 1 as described above, the nonaqueous electrolytic solution batteries were cooled to 25° C., and then again discharged to 2.5 V. Subsequently constant-current and constant-voltage charge was performed to 4.6 V at a 0.1 C rate at 25° C. Further, discharge was performed at a constant current of a 3 C rate (90 mA) to a discharge cutoff voltage of 2.5 V, and the capacity obtained at that time was taken as the 3 C-rate characteristic (25° C.) after prolonged cycles at 60° C.

Evaluation 3: Low-Temperature Property (0° C.) after Stored at 60° C.

Each of the nonaqueous electrolytic solution batteries according to Examples 7-1 to 7-10 and Comparative Examples 7-1 to 7-15 was subjected to storage tests (stored for 10 days after charged to 4.6 V) at an environmental temperature of 60° C. Next, the nonaqueous electrolytic solution batteries were cooled to 25° C., and again discharged to 2.5 V. Then constant-current and constant-voltage charge was performed to 4.6 V at a 0.2 C rate at 0° C. Further, discharge was performed at a constant current of a 3 C rate (90 mA) to a discharge cutoff voltage of 2.5 V while maintaining the temperature at 0° C., and the capacity obtained at that time was taken as the low-temperature property (0° C.) after stored at 60° C.

Various evaluation results of the nonaqueous electrolytic solution batteries according to Examples 7-1 to 7-10 and Comparative Examples 7-1 to 7-15 are shown in Table 13 as relative values when the corresponding evaluation results of the nonaqueous electrolytic solution battery according to Comparative Example 1-0 are taken as 100.

TABLE 13

| | Electrolytic solution No. | Low-temperature property (0° C.) after prolonged cycles at 60° C. | 3 C-rate characteristic (25° C.) after prolonged cycles at 60° C. | Low-temperature property (0° C.) after stored at 60° C. |
|---|---|---|---|---|
| Example 7-1 | Electrolytic solution No. 7-1 | 131.6 | 126.0 | 120.9 |
| Example 7-2 | Electrolytic solution No. 7-2 | 129.6 | 124.1 | 119.1 |
| Example 7-3 | Electrolytic solution No. 7-3 | 130.3 | 124.9 | 119.7 |

TABLE 13-continued

|  | Electrolytic solution No. | Low-temperature property (0° C.) after prolonged cycles at 60° C. | 3 C-rate characteristic (25° C.) after prolonged cycles at 60° C. | Low-temperature property (0° C.) after stored at 60° C. |
|---|---|---|---|---|
| Example 7-4 | Electrolytic solution No. 7-4 | 130.2 | 124.6 | 119.5 |
| Example 7-5 | Electrolytic solution No. 7-5 | 130.4 | 124.8 | 119.8 |
| Example 7-6 | Electrolytic solution No. 7-6 | 132.7 | 127.0 | 121.3 |
| Example 7-7 | Electrolytic solution No. 7-7 | 130.7 | 125.1 | 119.5 |
| Example 7-8 | Electrolytic solution No. 7-8 | 131.3 | 126.0 | 120.1 |
| Example 7-9 | Electrolytic solution No. 7-9 | 131.2 | 125.6 | 120.0 |
| Example 7-10 | Electrolytic solution No. 7-10 | 131.5 | 125.9 | 120.3 |
| Comparative Example 7-1 | Comparative electrolytic solution No. 7-1 | 100.0 | 100.0 | 100.0 |
| Comparative Example 7-2 | Comparative electrolytic solution No. 7-2 | 118.8 | 113.3 | 110.4 |
| Comparative Example 7-3 | Comparative electrolytic solution No. 7-3 | 121.6 | 114.7 | 111.7 |
| Comparative Example 7-4 | Comparative electrolytic solution No. 7-4 | 121.4 | 114.5 | 111.4 |
| Comparative Example 7-5 | Comparative electrolytic solution No. 7-5 | 119.5 | 112.8 | 109.7 |
| Comparative Example 7-6 | Comparative electrolytic solution No. 7-6 | 120.1 | 113.6 | 110.2 |
| Comparative Example 7-7 | Comparative electrolytic solution No. 7-7 | 120.0 | 113.3 | 110.1 |
| Comparative Example 7-8 | Comparative electrolytic solution No. 7-8 | 120.3 | 113.5 | 110.4 |
| Comparative Example 7-9 | Comparative electrolytic solution No. 7-9 | 120.8 | 113.7 | 110.7 |
| Comparative Example 7-10 | Comparative electrolytic solution No. 7-10 | 122.7 | 115.8 | 112.5 |
| Comparative Example 7-11 | Comparative electrolytic solution No. 7-11 | 122.3 | 115.3 | 112.1 |
| Comparative Example 7-12 | Comparative electrolytic solution No. 7-12 | 120.5 | 113.6 | 110.4 |
| Comparative Example 7-13 | Comparative electrolytic solution No. 7-13 | 121.1 | 114.4 | 110.9 |
| Comparative Example 7-14 | Comparative electrolytic solution No. 7-14 | 121.0 | 114.0 | 110.8 |
| Comparative Example 7-15 | Comparative electrolytic solution No. 7-15 | 121.2 | 114.3 | 111.0 |

(Positive electrode; OLO-1 Negative electrode; Graphite)

Examples 7-1 to 7-10

The results shown in Table 13 revealed that even in a case where OLO-1 was used as a positive-electrode active material, the nonaqueous electrolytic solutions which contain compounds selected from the 4 groups of (1a-Cis) from Synthesis Example 1 as the group (I) compound according to Example, VC, VEC, EEC, FEC, 2-allylsuccinic anhydride, or 1,6-DICNH as the group (II) compound, (1a-Trans) from Synthesis Example 1 as the group (III) compound, and the tetrafluoro ionic complex (5a-Tetra) shown in Synthesis Example 2 as the group (IV) compound were able to improve all of the discharge capacity (0° C.) after prolonged cycles at 60° C., the 3 C-rate characteristic (25° C.), and the discharge capacity (0° C.) after stored at 60° C. as compared with Comparative Examples 7-1 to 7-15.

The above results demonstrated that the nonaqueous electrolytic solutions according to the present invention showed good effects in any of the cases where the following oxides were used as a positive electrode: a lithium transition metal composite oxide containing at least one metal of nickel, manganese, and cobalt and having a layered structure; a lithium-manganese composite oxide having the spinel structure; a lithium-containing olivine type iron phosphate; and a lithium-rich layered transition-metal oxide having the stratified rock-salt structure. That is, these results clearly demonstrate that the nonaqueous electrolytic solution according to the present invention, and batteries including the nonaqueous electrolytic solution according to the present invention can show high output characteristics at low temperature even after the batteries are used to some extent, and can also show sufficient performance again at low temperature even after stored at high temperature regardless of types of positive electrodes.

(Examples 8-1 to 8-24 and Comparative Examples 8-1 to 8-14: Production and Evaluation of Nonaqueous Electrolytic Solution Batteries)

A test amorphous carbon negative electrode was produced as described below using an amorphous carbon powder as a carbon material having a d value in the lattice plane (002) of more than 0.340 nm as determined by X ray diffraction in place of the negative-electrode active material (a graphite powder) used in the nonaqueous electrolytic solution batteries according to Examples 1-1 to 1-41 and Comparative Examples 1-1 to 1-6 as described above.

Production of Amorphous Carbon Negative Electrode

Carbotron® P from Kureha Corporation as an amorphous carbon powder was uniformly dispersed and mixed into NMP in which PVDF as a binding agent was pre-dissolved, and NMP for adjusting the viscosity was then further added to prepare an amorphous carbon mixture paste. The above paste was applied to a copper foil (current collector), dried, and pressurized. Then the copper foil was processed into a predetermined size to obtain a test amorphous carbon negative electrode. The ratio of solid contents in the negative electrode was amorphous carbon powder:PVDF=90:10 (by the mass ratio).

Examples 8-1 to 8-24 and Comparative Examples 8-1 to 8-14: Production and Evaluation of Nonaqueous Electrolytic Solution Batteries

[Preparation of Nonaqueous Electrolytic Solutions Nos. 8-1 to 8-24 and Comparative Electrolytic Solutions Nos. 8-2 to 8-14]

In a dry box under a nitrogen atmosphere of a dew point of −50° C. or less, $LiPF_6$ as an electrolyte was dissolved and prepared in a nonaqueous solvent of propylene carbonate (PC), EMC, and DEC (volume ratio 30:40:30/mass ratio 34.1:38.3:27.6) so that the concentration of $LiPF_6$ was 1.1 mol/L, and various ionic complex/EMC solutions according to the present invention and the group (II) compounds as described above were then added to prepare the nonaqueous electrolytic solutions Nos. 8-1 to 8-24 according to the present invention and comparative electrolytic solutions Nos. 8-2 to 8-14. That is, compounds selected from the 4 groups of (1a-Cis) from Synthesis Example 1 as the group (I) compound, VC, VEC, EEC, FEC, 2-allylsuccinic anhydride, or 1,6-DICNH as the group (II) compound, (1a-Trans) from Synthesis Example 1 as the group (III) compound, and the tetrafluoro ionic complex (5a-Tetra) from Synthesis Example 2 as the group (IV) compound were each added in predetermined amounts as shown in Table 14 below to prepare the nonaqueous electrolytic solutions Nos. 8-1 to 8-24 and comparative electrolytic solutions Nos. 8-2 to 8-14.

It is noted that these preparations were performed as follows while cooled to control the solution temperature at 40° C. or below. First, 30 mass % of the entire $LiPF_6$ was added and dissolved in a predetermined amount of EMC, and another 30 mass % of the entire $LiPF_6$ was then added and dissolved. This was repeated for one more time, and then finally the remaining 10 mass % of $LiPF_6$ was added and dissolved. Subsequently, predetermined amounts of PC, EMC, and DEC were added and mixed, and then various ionic complex/EMC solutions and the group (II) compounds shown in Table 14 below were added, and the volume ratio of PC, EMC, and DEC was finally adjusted to the aforementioned predetermined ratio, and then stirred for 1 hour.

[Preparation of Comparative Electrolytic Solution: No. 8-1]

In a dry box under a nitrogen atmosphere of a dew point of −50° C. or less, $LiPF_6$ as an electrolyte was dissolved and prepared in a nonaqueous solvent of PC, EMC, and DEC (volume ratio 30:40:30/mass ratio 34.1:38.3:27.6) so that the concentration of $LiPF_6$ was 1.1 mol/L to prepare the comparative electrolytic solution No. 8-1. It is noted that the comparative electrolytic solution No. 8-1 was prepared in the same way as in the nonaqueous electrolytic solutions 8-1 to 8-24 according to the present invention except that the various ionic complex/EMC solutions and the group (II) compounds shown in Table 14 below were not added.

Production of Nonaqueous Electrolytic Solution Batteries

Aluminum laminate housing cells (with a capacity of 30 mAh) including the above test NMC positive electrode, the test amorphous carbon negative electrode, and a microporous polypropylene-polyethylene double layered separator were respectively impregnated with one of the various nonaqueous electrolytic solutions and the various comparative nonaqueous electrolytic solutions shown in Table 14 to produce the nonaqueous electrolytic solution batteries according to Examples 8-1 to 8-24 and Comparative Examples 8-1 to 8-14.

TABLE 14

| Electrolytic solution No. | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|
| Electrolytic solution No. 8-1 | Synthesis Example 1 (1a-Cis) | 1.1 | VC | 1.0 | — | — | — | — | — | — |
| Electrolytic solution No. 8-2 | | | | | Synthesis Example 1 (1a-Trans) | 0.0055 | 0.005 | — | — | — |
| Electrolytic solution No. 8-3 | | | | | — | — | — | Synthesis Example 2 (5a-Tetra) | 0.132 | 0.12 |
| Electrolytic solution No. 8-4 | | | | | Synthesis Example 1 (1a-Trans) | — | — | Synthesis Example 2 (5a-Tetra) | 0.132 | 0.12 |
| Electrolytic solution No. 8-5 | Synthesis Example 1 (1a-Cis) | 1.1 | VEC | 1.0 | — | — | — | — | — | — |
| Electrolytic solution No. 8-6 | | | | | Synthesis Example 1 (1a-Trans) | 0.0055 | 0.005 | — | — | — |
| Electrolytic solution No. 8-7 | | | | | — | — | — | Synthesis Example 2 (5a-Tetra) | 0.132 | 0.12 |
| Electrolytic solution No. 8-8 | | | | | Synthesis Example 1 (1a-Trans) | — | — | Synthesis Example 2 (5a-Tetra) | 0.132 | 0.12 |
| Electrolytic solution No. 8-9 | Synthesis Example 1 (1a-Cis) | 1.1 | EEC | 1.0 | — | — | — | — | — | — |
| Electrolytic solution No. 8-10 | | | | | Synthesis Example 1 (1a-Trans) | 0.0055 | 0.005 | — | — | — |
| Electrolytic solution No. 8-11 | | | | | — | — | — | Synthesis Example 2 (5a-Tetra) | 0.132 | 0.12 |
| Electrolytic solution No. 8-12 | | | | | Synthesis Example 1 (1a-Trans) | — | — | Synthesis Example 2 (5a-Tetra) | 0.132 | 0.12 |
| Electrolytic solution No. 8-13 | Synthesis Example 1 (1a-Cis) | 1.1 | FEC | 2.0 | — | — | — | — | — | — |
| Electrolytic solution No. 8-14 | | | | | Synthesis Example 1 (1a-Trans) | 0.0055 | 0.005 | — | — | — |
| Electrolytic solution No. 8-15 | | | | | — | — | — | Synthesis Example 2 (5a-Tetra) | 0.132 | 0.12 |
| Electrolytic solution No. 8-16 | | | | | Synthesis Example 1 (1a-Trans) | — | — | Synthesis Example 2 (5a-Tetra) | 0.132 | 0.12 |
| Electrolytic solution No. 8-17 | Synthesis Example 1 (1a-Cis) | 1.1 | 2-allylsuccinic anhydride | 0.5 | — | — | — | — | — | — |
| Electrolytic solution No. 8-18 | | | | | Synthesis Example 1 (1a-Trans) | 0.0055 | 0.005 | — | — | — |
| Electrolytic solution No. 8-19 | | | | | — | — | — | Synthesis Example 2 (5a-Tetra) | 0.132 | 0.12 |
| Electrolytic solution No. 8-20 | | | | | Synthesis Example 1 (1a-Trans) | — | — | Synthesis Example 2 (5a-Tetra) | 0.132 | 0.12 |
| Electrolytic solution No. 8-21 | Synthesis Example 1 (1a-Cis) | 1.1 | 1,6-DICNH | 0.5 | — | — | — | — | — | — |
| Electrolytic solution No. 8-22 | | | | | Synthesis Example 1 (1a-Trans) | 0.0055 | 0.005 | — | — | — |
| Electrolytic solution No. 8-23 | | | | | Synthesis Example 1 (1a-Trans) | — | — | Synthesis Example 2 (5a-Tetra) | 0.132 | 0.12 |

TABLE 14-continued

| Electrolytic solution No. | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|
| Electrolytic solution No. 8-24 | — | — | — | — | Synthesis Example 1 (1a-Trans) | 0.0055 | 0.005 | Synthesis Example 2 (5a-Tetra) | 0.132 | 0.12 |
| Comparative electrolytic solution No. 8-1 | Synthesis Example 1 (1a-Cis) | 1.1 | — | — | — | — | — | — | — | — |
| Comparative electrolytic solution No. 8-2 | — | — | VC | 1.0 | — | — | — | — | — | — |
| Comparative electrolytic solution No. 8-3 | — | — | — | — | Synthesis Example 1 (1a-Trans) | 1.1 | — | Synthesis Example 2 (5a-Tetra) | 0.132 | — |
| Comparative electrolytic solution No. 8-4 | — | — | VEC | 1.0 | — | — | — | — | — | — |
| Comparative electrolytic solution No. 8-5 | — | — | — | — | Synthesis Example 1 (1a-Trans) | 1.1 | — | Synthesis Example 2 (5a-Tetra) | 0.132 | — |
| Comparative electrolytic solution No. 8-6 | — | — | EEC | 1.0 | — | — | — | — | — | — |
| Comparative electrolytic solution No. 8-7 | — | — | — | — | Synthesis Example 1 (1a-Trans) | 1.1 | — | Synthesis Example 2 (5a-Tetra) | 0.132 | — |
| Comparative electrolytic solution No. 8-8 | — | — | FEC | 2.0 | — | — | — | — | — | — |
| Comparative electrolytic solution No. 8-9 | — | — | — | — | Synthesis Example 1 (1a-Trans) | 1.1 | — | Synthesis Example 2 (5a-Tetra) | 0.132 | — |
| Comparative electrolytic solution No. 8-10 | — | — | 2-allylsuccinic anhydride | 0.5 | — | — | — | — | — | — |
| Comparative electrolytic solution No. 8-11 | — | — | — | — | Synthesis Example 1 (1a-Trans) | 1.1 | — | Synthesis Example 2 (5a-Tetra) | 0.132 | — |
| Comparative electrolytic solution No. 8-12 | — | — | 1,6-DICNH | 0.5 | — | — | — | — | — | — |
| Comparative electrolytic solution No. 8-13 | — | — | — | — | Synthesis Example 1 (1a-Trans) | 1.1 | — | Synthesis Example 2 (5a-Tetra) | 0.132 | — |
| Comparative electrolytic solution No. 8-14 | — | — | — | — | — | — | — | — | — | — |

Examples 8-1 to 8-24 and Comparative Examples 8-1 to 8-14: Evaluation of Test Cells Evaluation 1: Low-Temperature Property (0° C.) after 500 Cycles at 60° C.

For each of the nonaqueous electrolytic solution batteries according to Examples 8-1 to 8-24 and Comparative Examples 8-1 to 8-14, conditioning was performed at an environmental temperature of 25° C. under the following conditions as in Evaluation 1 performed for the nonaqueous electrolytic solution batteries according to Examples 5-1 to 5-24 and Comparative Examples 5-1 to 5-14. That is, constant-current and constant-voltage charge was performed as the initial charge/discharge at an environmental temperature of 25° C. using the produced cells to a charge upper limit voltage of 4.2 V at a 0.1 C rate (3 mA), and discharge was performed at a constant current of a 0.2 C rate (6 mA) to a discharge cutoff voltage of 2.7 V. Subsequently, the following charge-discharge cycle was repeated for 3 times: constant-current and constant-voltage charge was performed to a charge upper limit voltage of 4.2 V at a 0.2 C rate (6 mA), and discharge was performed at a constant current of a 0.2 C rate (6 mA) to a discharge cutoff voltage of 2.7 V. After this conditioning, similar evaluation was performed except that when 500 cycles at an environmental temperature of 60° C. were performed, the discharge cutoff voltage was changed from 3.0 V to 2.7 V, and when constant-current and constant-voltage charge was performed to 4.2 V at a 0.2 C rate at 0° C., and then discharge was performed while maintaining the temperature at 0° C., the discharge cutoff voltage was changed from 3.0 V to 2.7 V, and discharge was performed at a constant current of a 5 C rate (150 mA). The capacity obtained at that time was considered as the low-temperature property (0° C.) after prolonged cycles at 60° C.

Evaluation 2: 5 C-Rate Characteristic after 500 Cycles at 60° C.

Each of the nonaqueous electrolytic solution batteries according to Examples 8-1 to 8-24 and Comparative Examples 8-1 to 8-14 was evaluated as in Evaluation 2 performed for the nonaqueous electrolytic solution batteries according to Examples 5-1 to 5-24 and Comparative Examples 5-1 to 5-14 except that the discharge cutoff voltage was changed from 3.0 V to 2.7 V upon discharge at a 5 C rate at 25° C. The capacity obtained at that time was considered as the 5 C-rate characteristic (25° C.) after prolonged cycles at 60° C.

Evaluation 3: Low-Temperature Property (0° C.) after Stored at 60° C.

Each of the nonaqueous electrolytic solution batteries according to Examples 8-1 to 8-24 and Comparative Examples 8-1 to 8-14 was subjected to storage tests (stored for 10 days after charged to 4.2 V at a constant current and a constant voltage) at an environmental temperature of 60° C. as in Evaluation 3 performed for the nonaqueous electrolytic solution batteries according to Examples 5-1 to 5-24 and Comparative Examples 5-1 to 5-14 except that the discharge cutoff voltage was changed from 3.0 V to 2.7 V upon discharge at a 5 C rate while maintaining the temperature at 0° C. The capacity obtained at that time was considered as the low-temperature property (0° C.) after stored at 60° C.

Various evaluation results of the nonaqueous electrolytic solution batteries according to Examples 8-1 to 8-24 and Comparative Examples 8-1 to 8-14 are shown in Table 15 as relative values when the corresponding evaluation results of the nonaqueous electrolytic solution battery according to Comparative Example 8-1 are taken as 100.

TABLE 15

| | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 8-1 | Electrolytic solution No. 8-1 | 133.6 | 127.9 | 123.9 |
| Example 8-2 | Electrolytic solution No. 8-2 | 135.8 | 128.4 | 124.4 |
| Example 8-3 | Electrolytic solution No. 8-3 | 136.1 | 129.0 | 124.8 |
| Example 8-4 | Electrolytic solution No. 8-4 | 136.7 | 130.8 | 125.5 |
| Example 8-5 | Electrolytic solution No. 8-5 | 131.6 | 126.0 | 122.0 |
| Example 8-6 | Electrolytic solution No. 8-6 | 133.7 | 126.5 | 122.6 |
| Example 8-7 | Electrolytic solution No. 8-7 | 134.1 | 127.0 | 122.9 |
| Example 8-8 | Electrolytic solution No. 8-8 | 134.6 | 128.8 | 123.6 |
| Example 8-9 | Electrolytic solution No. 8-9 | 132.3 | 126.9 | 122.6 |
| Example 8-10 | Electrolytic solution No. 8-10 | 134.4 | 127.4 | 123.2 |
| Example 8-11 | Electrolytic solution No. 8-11 | 134.8 | 127.9 | 123.5 |
| Example 8-12 | Electrolytic solution No. 8-12 | 135.3 | 129.8 | 124.3 |
| Example 8-13 | Electrolytic solution No. 8-13 | 133.9 | 128.2 | 121.4 |
| Example 8-14 | Electrolytic solution No. 8-14 | 136.1 | 128.7 | 122.0 |
| Example 8-15 | Electrolytic solution No. 8-15 | 136.4 | 129.2 | 122.3 |
| Example 8-16 | Electrolytic solution No. 8-16 | 137.0 | 131.1 | 123.0 |
| Example 8-17 | Electrolytic solution No. 8-17 | 132.1 | 126.5 | 122.5 |
| Example 8-18 | Electrolytic solution No. 8-18 | 134.3 | 127.0 | 123.1 |
| Example 8-19 | Electrolytic solution No. 8-19 | 134.6 | 127.5 | 123.4 |
| Example 8-20 | Electrolytic solution No. 8-20 | 135.2 | 129.4 | 124.1 |
| Example 8-21 | Electrolytic solution No. 8-21 | 132.4 | 126.8 | 122.7 |
| Example 8-22 | Electrolytic solution No. 8-22 | 134.6 | 127.3 | 123.3 |
| Example 8-23 | Electrolytic solution No. 8-23 | 134.9 | 127.8 | 123.7 |
| Example 8-24 | Electrolytic solution No. 8-24 | 135.5 | 129.6 | 124.4 |
| Comparative Example 8-1 | Comparative electrolytic solution No. 8-1 | 100.0 | 100.0 | 100.0 |
| Comparative Example 8-2 | Comparative electrolytic solution No. 8-2 | 124.1 | 116.9 | 114.0 |
| Comparative Example 8-3 | Comparative electrolytic solution No. 8-3 | 119.0 | 111.2 | 107.3 |

TABLE 15-continued

|  | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Comparative Example 8-4 | Comparative electrolytic solution No. 8-4 | 125.4 | 115.5 | 115.3 |
| Comparative Example 8-5 | Comparative electrolytic solution No. 8-5 | 117.2 | 109.5 | 105.7 |
| Comparative Example 8-6 | Comparative electrolytic solution No. 8-6 | 123.6 | 113.8 | 113.6 |
| Comparative Example 8-7 | Comparative electrolytic solution No. 8-7 | 117.8 | 110.3 | 106.3 |
| Comparative Example 8-8 | Comparative electrolytic solution No. 8-8 | 124.2 | 114.6 | 114.2 |
| Comparative Example 8-9 | Comparative electrolytic solution No. 8-9 | 119.2 | 111.4 | 105.2 |
| Comparative Example 8-10 | Comparative electrolytic solution No. 8-10 | 125.7 | 115.7 | 113.0 |
| Comparative Example 8-11 | Comparative electrolytic solution No. 8-11 | 117.7 | 110.0 | 106.2 |
| Comparative Example 8-12 | Comparative electrolytic solution No. 8-12 | 124.1 | 114.2 | 114.0 |
| Comparative Example 8-13 | Comparative electrolytic solution No. 8-13 | 117.9 | 110.2 | 106.4 |
| Comparative Example 8-14 | Comparative electrolytic solution No. 8-14 | 124.3 | 114.5 | 114.3 |

(Positive electrode; NMC Negative electrode; Amorphous carbon)

Examples 8-1 to 8-24

The results shown in Table 15 revealed that even in a case where an amorphous carbon powder (Carbotron® P) was used instead of a graphite powder as a negative-electrode active material, the nonaqueous electrolytic solutions of Examples 8-1 to 8-24 in which (1a-Cis) from Synthesis Example 1 as the group (I) compound according to Example was used along with VC, VEC, EEC, FEC, 2-allylsuccinic anhydride, or 1,6-DICNH as the group (II) compound, and a compound(s) selected from (1a-Trans) from Synthesis Example 1 as the group (III) compound and the tetrafluoro ionic complex (5a-Tetra) from Synthesis Example 2 as the group (IV) compound can be further included were able to improve all of the discharge capacity (0° C.) after prolonged cycles at 60° C., the 5 C-rate characteristic (25° C.), and the discharge capacity (0° C.) after stored at 60° C. as compared with Comparative Examples 8-1 to 8-14.

Examples 9-1 to 9-24 and Comparative Examples 9-1 to 9-14: Preparation of Nonaqueous Electrolytic Solution Batteries

[Preparation of Nonaqueous Electrolytic Solutions Nos. 9-1 to 9-24 and Comparative Electrolytic Solutions Nos. 9-2 to 9-14]

In a dry box under a nitrogen atmosphere of a dew point of −50° C. or less, $LiPF_6$ as an electrolyte was dissolved and prepared in a preheated and dissolved nonaqueous solvent of EC, EMC, and DEC (volume ratio 25:45:30/mass ratio 30.7:42.2:27.1) so that the concentration of $LiPF_6$ was 1.2 mol/L, and then various ionic complex/EMC solutions according to the present invention and the group (II) compounds as described above were added to prepare the nonaqueous electrolytic solutions Nos. 9-1 to 9-24 and comparative electrolytic solutions Nos. 9-2 to 9-14 according to the present invention. That is, compounds selected from the 4 groups of (1a-Cis) from Synthesis Example 1 as the group (I) compound, VC, VEC, EEC, FEC, 2-allylsuccinic anhydride, or 1,6-DICNH as the group (II) compound, (1a-Trans) from Synthesis Example 1 as the group (III) compound, and the tetrafluoro ionic complex (5a-Tetra) from Synthesis Example 2 as the group (IV) compound were each added in predetermined amounts as shown in Table 16 below to prepare the nonaqueous electrolytic solutions Nos. 9-1 to 9-24 and comparative electrolytic solutions Nos. 9-2 to 9-14.

It is noted that these preparations were performed as follows while cooled to control the solution temperature at 40° C. or below. First, 30 mass % of the entire $LiPF_6$ was added and dissolved in a predetermined amount of EMC, and another 30 mass % of the entire LiPF6 was then added and dissolved. This was repeated for one more time, and then finally the remaining 10 mass % of $LiPF_6$ was added and dissolved. Subsequently, predetermined amounts of EC, EMC, and DEC were added and mixed, and then various ionic complex/EMC solutions and the group (II) compounds shown in Table 16 below were added, and the volume ratio of EC, EMC, and DEC was finally adjusted to the aforementioned predetermined ratio, and then stirred for 1 hour.

The following nonaqueous electrolytic solutions were prepared as Comparative Examples.

[Preparation of Comparative Electrolytic Solution: No. 9-1]

In a dry box under a nitrogen atmosphere of a dew point of −50° C. or less, $LiPF_6$ as an electrolyte was dissolved and prepared in a pre-heated and dissolved nonaqueous solvent of EC, EMC, and DEC (volume ratio 25:45:30/mass ratio 30.7:42.2:27.1) so that the concentration of $LiPF_6$ was 1.2 mol/L to prepare comparative electrolytic solution No. 9-1. It is noted that the comparative electrolytic solution No. 9-1 was prepared in the same way as in the nonaqueous electrolytic solutions 9-1 to 9-24 according to the present invention except that the various ionic complex/EMC solutions and the abovementioned group (II) compounds shown in Table 16 below were not added.

TABLE 16

| Electrolytic solution No. | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|
| Electrolytic solution No. 9-1 | Synthesis Example 1 (1a-Cis) | 1.2 | VC | 1.5 | — | — | — | — | — | — |
| Electrolytic solution No. 9-2 | Synthesis Example 1 (1a-Cis) | 1.2 | VC | 1.5 | Synthesis Example 1 (1a-Trans) | 0.006 | 0.005 | — | — | — |
| Electrolytic solution No. 9-3 | Synthesis Example 1 (1a-Cis) | 1.2 | VC | 1.5 | — | — | — | Synthesis Example 2 (5a-Tetra) | 0.144 | 0.12 |
| Electrolytic solution No. 9-4 | Synthesis Example 1 (1a-Cis) | 1.2 | VC | 1.5 | Synthesis Example 1 (1a-Trans) | 0.006 | 0.005 | Synthesis Example 2 (5a-Tetra) | 0.144 | 0.12 |
| Electrolytic solution No. 9-5 | Synthesis Example 1 (1a-Cis) | 1.2 | VEC | 1.5 | — | — | — | — | — | — |
| Electrolytic solution No. 9-6 | Synthesis Example 1 (1a-Cis) | 1.2 | VEC | 1.5 | Synthesis Example 1 (1a-Trans) | 0.006 | 0.005 | — | — | — |
| Electrolytic solution No. 9-7 | Synthesis Example 1 (1a-Cis) | 1.2 | VEC | 1.5 | — | — | — | Synthesis Example 2 (5a-Tetra) | 0.144 | 0.12 |
| Electrolytic solution No. 9-8 | Synthesis Example 1 (1a-Cis) | 1.2 | VEC | 1.5 | Synthesis Example 1 (1a-Trans) | 0.006 | 0.005 | Synthesis Example 2 (5a-Tetra) | 0.144 | 0.12 |
| Electrolytic solution No. 9-9 | Synthesis Example 1 (1a-Cis) | 1.2 | EEC | 1.5 | — | — | — | — | — | — |
| Electrolytic solution No. 9-10 | Synthesis Example 1 (1a-Cis) | 1.2 | EEC | 1.5 | Synthesis Example 1 (1a-Trans) | 0.006 | 0.005 | — | — | — |
| Electrolytic solution No. 9-11 | Synthesis Example 1 (1a-Cis) | 1.2 | EEC | 1.5 | — | — | — | Synthesis Example 2 (5a-Tetra) | 0.144 | 0.12 |
| Electrolytic solution No. 9-12 | Synthesis Example 1 (1a-Cis) | 1.2 | EEC | 1.5 | Synthesis Example 1 (1a-Trans) | 0.006 | 0.005 | Synthesis Example 2 (5a-Tetra) | 0.144 | 0.12 |
| Electrolytic solution No. 9-13 | Synthesis Example 1 (1a-Cis) | 1.2 | FEC | 2.5 | — | — | — | — | — | — |
| Electrolytic solution No. 9-14 | Synthesis Example 1 (1a-Cis) | 1.2 | FEC | 2.5 | Synthesis Example 1 (1a-Trans) | 0.006 | 0.005 | — | — | — |
| Electrolytic solution No. 9-15 | Synthesis Example 1 (1a-Cis) | 1.2 | FEC | 2.5 | — | — | — | Synthesis Example 2 (5a-Tetra) | 0.144 | 0.12 |
| Electrolytic solution No. 9-16 | Synthesis Example 1 (1a-Cis) | 1.2 | FEC | 2.5 | Synthesis Example 1 (1a-Trans) | 0.006 | 0.005 | Synthesis Example 2 (5a-Tetra) | 0.144 | 0.12 |
| Electrolytic solution No. 9-17 | Synthesis Example 1 (1a-Cis) | 1.2 | 2-allylsuccinic anhydride | 0.8 | — | — | — | — | — | — |
| Electrolytic solution No. 9-18 | Synthesis Example 1 (1a-Cis) | 1.2 | 2-allylsuccinic anhydride | 0.8 | Synthesis Example 1 (1a-Trans) | 0.006 | 0.005 | — | — | — |
| Electrolytic solution No. 9-19 | Synthesis Example 1 (1a-Cis) | 1.2 | 2-allylsuccinic anhydride | 0.8 | — | — | — | Synthesis Example 2 (5a-Tetra) | 0.144 | 0.12 |
| Electrolytic solution No. 9-20 | Synthesis Example 1 (1a-Cis) | 1.2 | 2-allylsuccinic anhydride | 0.8 | Synthesis Example 1 (1a-Trans) | 0.006 | 0.005 | Synthesis Example 2 (5a-Tetra) | 0.144 | 0.12 |
| Electrolytic solution No. 9-21 | Synthesis Example 1 (1a-Cis) | 1.2 | 1,6-DICNH | 0.8 | — | — | — | — | — | — |
| Electrolytic solution No. 9-22 | Synthesis Example 1 (1a-Cis) | 1.2 | 1,6-DICNH | 0.8 | Synthesis Example 1 (1a-Trans) | 0.006 | 0.005 | — | — | — |
| Electrolytic solution No. 9-23 | Synthesis Example 1 (1a-Cis) | 1.2 | 1,6-DICNH | 0.8 | — | — | — | Synthesis Example 2 (5a-Tetra) | 0.144 | 0.12 |

TABLE 16-continued

| Electrolytic solution No. | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|
| Electrolytic solution No. 9-24 | — | — | — | — | Synthesis Example 1 (1a-Trans) | 0.006 | 0.005 | Synthesis Example 2 (5a-Tetra) | 0.144 | 0.12 |
| Comparative electrolytic solution No. 9-1 | Synthesis Example 1 (1a-Cis) | 1.2 | — | — | — | — | — | — | — | — |
| Comparative electrolytic solution No. 9-2 | — | — | VC | 1.5 | — | — | — | — | — | — |
| Comparative electrolytic solution No. 9-3 | — | — | — | — | Synthesis Example 1 (1a-Trans) | 1.2 | — | Synthesis Example 2 (5a-Tetra) | 0.144 | — |
| Comparative electrolytic solution No. 9-4 | — | — | VEC | 1.5 | — | — | — | — | — | — |
| Comparative electrolytic solution No. 9-5 | — | — | — | — | Synthesis Example 1 (1a-Trans) | 1.2 | — | Synthesis Example 2 (5a-Tetra) | 0.144 | — |
| Comparative electrolytic solution No. 9-6 | — | — | EEC | 1.5 | — | — | — | — | — | — |
| Comparative electrolytic solution No. 9-7 | — | — | — | — | Synthesis Example 1 (1a-Trans) | 1.2 | — | Synthesis Example 2 (5a-Tetra) | 0.144 | — |
| Comparative electrolytic solution No. 9-8 | — | — | FEC | 2.5 | — | — | — | — | — | — |
| Comparative electrolytic solution No. 9-9 | — | — | — | — | Synthesis Example 1 (1a-Trans) | 1.2 | — | Synthesis Example 2 (5a-Tetra) | 0.144 | — |
| Comparative electrolytic solution No. 9-10 | — | — | 2-allylsuccinic anhydride | 0.8 | — | — | — | — | — | — |
| Comparative electrolytic solution No. 9-11 | — | — | — | — | Synthesis Example 1 (1a-Trans) | 1.2 | — | Synthesis Example 2 (5a-Tetra) | 0.144 | — |
| Comparative electrolytic solution No. 9-12 | — | — | 1,6-DICNH | 0.8 | — | — | — | — | — | — |
| Comparative electrolytic solution No. 9-13 | — | — | — | — | — | — | — | — | — | — |
| Comparative electrolytic solution No. 9-14 | — | — | — | — | Synthesis Example 1 (1a-Trans) | 1.2 | — | Synthesis Example 2 (5a-Tetra) | 0.144 | — |

Examples 9-1 to 9-24 and Comparative Examples 9-1 to 9-14: Production and Evaluation of Nonaqueous Electrolytic Solution Batteries A test (mixture of artificial graphite+natural graphite) negative electrode was produced as described below using a negative-electrode active material in which an artificial graphite negative electrode is mixed with natural graphite instead of the negative-electrode active material (an amorphous carbon powder) used in the nonaqueous electrolytic solution batteries according to Examples 8-1 to 8-24 and Comparative Examples 8-1 to 8-14.

Production of Test (Mixture of Artificial Graphite+Natural Graphite) Negative Electrode An SCMG®-AR powder from Showa Denko K. K. as artificial graphite and natural graphite particles (the mean particle size: 25 μm) from Kansai Coke and Chemicals Company, Limited. as natural graphite were uniformly dispersed and mixed into NMP in which PVDF as a binding agent was pre-dissolved, and NMP for adjusting the viscosity was then further added to prepare a mixture paste of (artificial graphite+natural graphite) mixture. The above paste was applied to a copper foil (current collector), dried, and pressurized. Then the copper foil was processed into a predetermined size to obtain a test (mixture of artificial graphite+natural graphite) negative electrode. The ratio of solid contents in the negative electrode was artificial graphite powder:natural graphite powder:PVDF=72:18:10 (by the mass ratio).

Production of Nonaqueous Electrolytic Solution Batteries

Aluminum laminate housing cells (with a capacity of 30 mAh) including the above test NMC positive electrode, the test (mixture of artificial graphite+natural graphite) negative electrode, and a microporous polypropylene-polyethylene double layered separator were respectively impregnated with one of the various nonaqueous electrolytic solutions and the various comparative nonaqueous electrolytic solutions shown in Table 16 to produce the nonaqueous electrolytic solution batteries according to Examples 9-1 to 9-24 and Comparative Examples 9-1 to 9-14 as in Examples 6-1 to 6-16 and Comparative Examples 6-1 to 6-10 as described above.

Production of Nonaqueous Electrolytic Solution Batteries

Each of these nonaqueous electrolytic solution batteries was subjected to the following evaluations as described above as in Examples 1-1 to 1-41 and Comparative Examples 1-1 to 1-6 described above.

Evaluation 1: Low-temperature property (0° C.) after 500 cycles at 60° C.

Evaluation 2: 5 C-rate characteristic after 500 cycles at 60° C.

Evaluation 3: Low-temperature property (0° C.) after stored at 60° C.

Various evaluation results of the nonaqueous electrolytic solution batteries according to Examples 9-1 to 9-24 and Comparative Examples 9-1 to 9-14 are shown in Table 17 as relative values when the corresponding evaluation results of the nonaqueous electrolytic solution battery according to Comparative Example 9-1 are taken as 100.

TABLE 17

| | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 9-1 | Electrolytic solution No. 9-1 | 133.9 | 128.2 | 124.1 |
| Example 9-2 | Electrolytic solution No. 9-2 | 136.1 | 128.7 | 124.7 |
| Example 9-3 | Electrolytic solution No. 9-3 | 136.4 | 129.2 | 125.0 |
| Example 9-4 | Electrolytic solution No. 9-4 | 137.0 | 131.1 | 125.8 |
| Example 9-5 | Electrolytic solution No. 9-5 | 131.9 | 126.3 | 122.2 |
| Example 9-6 | Electrolytic solution No. 9-6 | 134.0 | 126.8 | 122.8 |
| Example 9-7 | Electrolytic solution No. 9-7 | 134.3 | 127.3 | 123.1 |
| Example 9-8 | Electrolytic solution No. 9-8 | 134.9 | 129.1 | 123.9 |
| Example 9-9 | Electrolytic solution No. 9-9 | 132.5 | 127.2 | 122.9 |
| Example 9-10 | Electrolytic solution No. 9-10 | 134.7 | 127.7 | 123.5 |
| Example 9-11 | Electrolytic solution No. 9-11 | 135.0 | 128.2 | 123.8 |
| Example 9-12 | Electrolytic solution No. 9-12 | 135.6 | 130.0 | 124.5 |
| Example 9-13 | Electrolytic solution No. 9-13 | 134.1 | 128.4 | 121.6 |
| Example 9-14 | Electrolytic solution No. 9-14 | 136.3 | 128.9 | 122.2 |
| Example 9-15 | Electrolytic solution No. 9-15 | 136.7 | 129.5 | 122.5 |
| Example 9-16 | Electrolytic solution No. 9-16 | 137.2 | 131.3 | 123.3 |
| Example 9-17 | Electrolytic solution No. 9-17 | 132.4 | 126.8 | 122.7 |
| Example 9-18 | Electrolytic solution No. 9-18 | 134.6 | 127.3 | 123.3 |
| Example 9-19 | Electrolytic solution No. 9-19 | 134.9 | 127.8 | 123.6 |
| Example 9-20 | Electrolytic solution No. 9-20 | 135.5 | 129.6 | 124.4 |
| Example 9-21 | Electrolytic solution No. 9-21 | 132.7 | 127.0 | 123.0 |
| Example 9-22 | Electrolytic solution No. 9-22 | 134.8 | 127.5 | 123.6 |
| Example 9-23 | Electrolytic solution No. 9-23 | 135.2 | 128.0 | 123.9 |
| Example 9-24 | Electrolytic solution No. 9-24 | 135.7 | 129.9 | 124.6 |
| Comparative Example 9-1 | Comparative electrolytic solution No. 9-1 | 100.0 | 100.0 | 100.0 |
| Comparative Example 9-2 | Comparative electrolytic solution No. 9-2 | 124.2 | 117.0 | 114.1 |
| Comparative Example 9-3 | Comparative electrolytic solution No. 9-3 | 119.1 | 111.3 | 107.5 |
| Comparative Example 9-4 | Comparative electrolytic solution No. 9-4 | 125.7 | 115.7 | 115.5 |
| Comparative Example 9-5 | Comparative electrolytic solution No. 9-5 | 117.3 | 109.7 | 105.8 |
| Comparative Example 9-6 | Comparative electrolytic solution No. 9-6 | 123.8 | 114.0 | 113.8 |

TABLE 17-continued

|  | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Comparative Example 9-7 | Comparative electrolytic solution No. 9-7 | 117.9 | 110.4 | 106.4 |
| Comparative Example 9-8 | Comparative electrolytic solution No. 9-8 | 124.4 | 114.8 | 114.4 |
| Comparative Example 9-9 | Comparative electrolytic solution No. 9-9 | 119.3 | 111.6 | 105.3 |
| Comparative Example 9-10 | Comparative electrolytic solution No. 9-10 | 125.9 | 116.0 | 113.2 |
| Comparative Example 9-11 | Comparative electrolytic solution No. 9-11 | 117.8 | 110.1 | 106.3 |
| Comparative Example 9-12 | Comparative electrolytic solution No. 9-12 | 124.3 | 114.5 | 114.3 |
| Comparative Example 9-13 | Comparative electrolytic solution No. 9-13 | 118.0 | 110.3 | 106.5 |
| Comparative Example 9-14 | Comparative electrolytic solution No. 9-14 | 124.6 | 114.7 | 114.5 |

(Positive electrode; NMC Negative electrode; Mixture of artificial graphite + natural graphite)

Examples 9-1 to 9-24

As seen from the results in Table 17, Examples 9-1 to 9-24 showed a similar tendency as in Examples 8-1 to 8-24. That is, even in a case where a mixed powder of artificial graphite and natural graphite was used as a negative-electrode active material, the nonaqueous electrolytic solutions in which (1a-Cis) from Synthesis Example 1 as the group (I) compound according to Example was used along with VC, VEC, EEC, FEC, 2-allylsuccinic anhydride, or 1,6-DICNH as the group (II) compound, and a compound(s) selected from (1a-Trans) from Synthesis Example 1 as the group (III) compound and the tetrafluoro ionic complex (5a-Tetra) shown in Synthesis Example 2 as the group (IV) compound can be further included were found to improve all of the discharge capacity (0° C.) after prolonged cycles at 60° C., the 5 C-rate characteristic (25° C.), and the discharge capacity (0° C.) after stored at 60° C. as compared with Comparative Examples 9-1 and 9-14.

Examples 10-1 to 10-10 and Comparative Examples 10-1 to 10-15: Preparation of Nonaqueous Electrolytic Solutions

[Preparation of Nonaqueous Electrolytic Solutions Nos. 10-1 to 10-5 and Comparative Electrolytic Solutions Nos. 10-2 to 10-8]

In a dry box under a nitrogen atmosphere of a dew point of −50° C. or less, LiPF$_6$ as an electrolyte was dissolved and prepared in a preheated and dissolved nonaqueous solvent of EC and EMC, and FEC as the group (II) compound described above (volume ratio 20:70:10/mass ratio 23.6: 63.1:13.3) so that the concentration of LiPF$_6$ was 1.2 mol/L, and then various ionic complex/EMC solutions according to the present invention, and the group (II) compounds described above were added to prepare the nonaqueous electrolytic solutions Nos. 10-1 to 10-5 and comparative electrolytic solutions Nos. 10-2 to 10-8 according to the present invention. That is, compounds selected from the 4 groups of (1a-Cis) from Synthesis Example 1 as the group (I) compound, VC, VEC, EEC, 2-allylsuccinic anhydride, and 1,6-DICNH as the group (II) compound, (1a-Trans) from Synthesis Example 1 as the group (III) compound, and the tetrafluoro ionic complex (5a-Tetra) from Synthesis Example 2 as the group (IV) compound were each added in predetermined amounts as shown in Table 18 below to prepare the nonaqueous electrolytic solutions Nos. 10-1 to 10-5 and comparative electrolytic solutions Nos. 10-2 to 10-8.

[Preparation of Nonaqueous Electrolytic Solutions Nos. 10-6 to 10-10 and Comparative Electrolytic Solutions Nos. 10-9 to 10-15]

In a dry box under a nitrogen atmosphere of a dew point of −50° C. or less, LiPF$_6$ as an electrolyte was dissolved and prepared in a preheated and dissolved nonaqueous solvent of EC and EMC, and FEC as the group (II) compound (volume ratio 15:70:15/mass ratio 17.5:62.6:19.9) so that the concentration of LiPF$_6$ was 1.2 mol/L, and then various ionic complex/EMC solutions according to the present invention and the group (II) compounds described above were added to prepare the nonaqueous electrolytic solutions Nos. 10-6 to 10-10 and comparative electrolytic solutions Nos. 10-9 to 10-15 according to the present invention. That is, compounds selected from the 4 groups of (1a-Cis) from Synthesis Example 1 as the group (I) compound, VC, VEC, EEC, 2-allylsuccinic anhydride, and 1,6-DICNH as the group (II) compound, (1a-Trans) from Synthesis Example 1 as the group (III) compound, and the tetrafluoro ionic complex (5a-Tetra) from Synthesis Example 2 as the group (IV) compound were each added in predetermined amounts as shown in Table 18 below to prepare the nonaqueous electrolytic solutions Nos. 10-6 to 10-10 and comparative electrolytic solutions Nos. 10-9 to 10-15.

It is noted that these preparations were performed as follows while cooled to control the solution temperature at 40° C. or below. First, 30 mass % of the entire LiPF$_6$ was added and dissolved in a predetermined amount of EMC, and another 30 mass % of the entire LiPF$_6$ was then added and dissolved. This was repeated for one more time, and then finally the remaining 10 mass % of LiPF$_6$ was added and dissolved. Subsequently, predetermined amounts of preheated and dissolved EC and FEC as well as EMC were added and mixed, and then various ionic complex/EMC solutions and the group (II) compounds shown in Table 18 below were added, and the volume ratio of EC, EMC, and FEC was finally adjusted to the aforementioned predetermined ratio, and then stirred for 1 hour.

The following nonaqueous electrolytic solution was prepared as Comparative Example.

[Preparation of Comparative Electrolytic Solution: No. 10-1]

In a dry box under a nitrogen atmosphere of a dew point of −50° C. or less, LiPF$_6$ as an electrolyte was dissolved and prepared in a preheated and dissolved nonaqueous solvent of EC and EMC (volume ratio 30:70/mass ratio 35.9:64.1) so that the concentration of LiPF$_6$ was 1.2 mol/L to prepare the comparative electrolytic solution No. 10-1. It is noted that the comparative electrolytic solution No. 10-1 was prepared in the same way as the nonaqueous electrolytic solutions 10-1 to 10-5 according to the present invention except that the various ionic complex/EMC solutions and the group (II) compounds shown in Table 18 below were not added.

TABLE 18

| Electrolytic solution No, | Li salt LiPF$_6$ (mol/liter) | Nonaqueous solvent EC (mass %) | Nonaqueous solvent EMC (mass %) | Group (I) compound (Cis isomer) | Content (mass %) | Group (II) compound 1 | content (mass %) | Group (II) compound 2 |
|---|---|---|---|---|---|---|---|---|
| Electrolytic solution No. 10-1 | 1.2 | 23.6 | 63.1 | Synthesis Example 1 (1a-Cis) | 1.2 | FEC | 13.3 | VC |
| Electrolytic solution No. 10-2 | | | | | | | | VEC |
| Electrolytic solution No. 10-3 | | | | | | | | EEC |
| Electrolytic solution No. 10-4 | | | | | | | | 2-allylsuccinic anhydride |
| Electrolytic solution No. 10-5 | | | | | | | | 1,6-DICNH |
| Electrolytic solution No. 10-6 | 1.2 | 17.5 | 62.6 | Synthesis Example 1 (1a-Cis) | 1.2 | FEC | 19.9 | VC |
| Electrolytic solution No. 10-7 | | | | | | | | VEC |
| Electrolytic solution No. 10-8 | | | | | | | | EEC |
| Electrolytic solution No. 10-9 | | | | | | | | 2-allylsuccinic anhydride |
| Electrolytic solution No. 10-10 | | | | | | | | 1,6-DICNH |
| Comparative electrolytic solution No. 10-1 | 1.2 | 35.9 | 64.1 | — | — | — | — | — |
| Comparative electrolytic solution No. 10-2 | 1.2 | 23.6 | 63.1 | — | — | FEC | 13.3 | — |
| Comparative electrolytic solution No. 10-3 | | | | Synthesis Example 1 (1a-Cis) | 1.2 | | | — |
| Comparative electrolytic solution No. 10-4 | | | | — | — | | | VC |
| Comparative electrolytic solution No. 10-5 | | | | — | — | | | VEC |
| Comparative electrolytic solution No. 10-6 | | | | — | — | | | EEC |
| Comparative electrolytic solution No. 10-7 | | | | — | — | | | 2-allylsuccinic anhydride |
| Comparative electrolytic solution No. 10-8 | | | | — | — | | | 1,6-DICNH |
| Comparative electrolytic solution No. 10-9 | 1.2 | 17.5 | 62.6 | — | — | FEC | 19.9 | — |
| Comparative electrolytic solution No. 10-10 | | | | Synthesis Example 1 (1a-Cis) | 1.2 | | | — |
| Comparative electrolytic solution No. 10-11 | | | | — | — | | | VC |
| Comparative electrolytic solution No. 10-12 | | | | — | — | | | VEC |
| Comparative electrolytic solution No. 10-13 | | | | — | — | | | EEC |
| Comparative electrolytic solution No. 10-14 | | | | — | — | | | 2-allylsuccinic anhydride |

TABLE 18-continued

| | | | | | | |
|---|---|---|---|---|---|---|
| Comparative electrolytic solution No. 10-15 | — | | — | | 1,6-DICNH | |

| Electrolytic solution No, | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|
| Electrolytic solution No. 10-1 | 1.3 | Synthesis Example 1 (1a-Trans) | 0.006 | 0.005 | Synthesis Example 2 (5a-Tetra) | 0.144 | 0.12 |
| Electrolytic solution No. 10-2 | 1.3 | | | | | | |
| Electrolytic solution No. 10-3 | 1.3 | | | | | | |
| Electrolytic solution No. 10-4 | 0.7 | | | | | | |
| Electrolytic solution No. 10-5 | 0.7 | | | | | | |
| Electrolytic solution No. 10-6 | 1.3 | Synthesis Example 1 (1a-Trans) | 0.006 | 0.005 | Synthesis Example 2 (5a-Tetra) | 0.144 | 0.12 |
| Electrolytic solution No. 10-7 | 1.3 | | | | | | |
| Electrolytic solution No. 10-8 | 1.3 | | | | | | |
| Electrolytic solution No. 10-9 | 0.7 | | | | | | |
| Electrolytic solution No. 10-10 | 0.7 | | | | | | |
| Comparative electrolytic solution No. 10-1 | — | — | — | — | — | — | — |
| Comparative electrolytic solution No. 10-2 | — | — | — | — | — | — | — |
| Comparative electrolytic solution No. 10-3 | — | — | — | — | — | — | — |
| Comparative electrolytic solution No. 10-4 | 1.3 | Synthesis Example 1 (1a-Trans) | 1.2 | — | Synthesis Example 2 (5a-Tetra) | 0.144 | — |
| Comparative electrolytic solution No. 10-5 | 1.3 | | | | | | |
| Comparative electrolytic solution No. 10-6 | 1.3 | | | | | | |
| Comparative electrolytic solution No. 10-7 | 0.7 | | | | | | |
| Comparative electrolytic solution No. 10-8 | 0.7 | | | | | | |
| Comparative electrolytic solution No. 10-9 | — | — | — | — | — | — | — |
| Comparative electrolytic solution No. 10-10 | — | — | — | — | — | — | — |
| Comparative electrolytic solution No. 10-11 | 1.3 | Synthesis Example 1 (1a-Trans) | 1.2 | — | Synthesis Example 2 (5a-Tetra) | 0.144 | — |
| Comparative electrolytic solution No. 10-12 | 1.3 | | | | | | |
| Comparative electrolytic solution No. 10-13 | 1.3 | | | | | | |
| Comparative electrolytic solution No. 10-14 | 0.7 | | | | | | |
| Comparative electrolytic solution No. 10-15 | 0.7 | | | | | | |

Examples 10-1 to 10-10 and Comparative Examples 10-1 to 10-15: Production and Evaluation of Nonaqueous Electrolytic Solution Batteries A test $SiO_x$ negative electrode was produced as described below using a powder mixture of a silicon oxide powder and an aggregated artificial graphite powder as a negative-electrode active material in place of the negative-electrode active material (a powder mixture of artificial graphite and natural graphite) used in the nonaqueous electrolytic solution batteries according to Examples 9-1 to 9-24 and Comparative Examples 9-1 to 9-14.

Production of $SiO_x$ Negative Electrode

A powder mixture of a silicon oxide powder disproportioned by heat treatment ($SiO_x$ wherein x is 0.3 to 1.6, the mean particle size: 5 μm, Sigma Aldrich Japan, Co. LLC.) as a silicon oxide powder and MAG-D (the particle size: 20 μm or less) from Hitachi Chemical Co., Ltd. as an aggregated artificial graphite powder was uniformly dispersed and mixed into NMP in which PVDF as a binding agent was pre-dissolved, and Ketjen black (electrically conductive agent) was further added and mixed, and NMP for adjusting the viscosity was then further added to prepare an $SiO_x$ mixture paste. The above paste was applied to a copper foil (current collector), dried, and pressurized. Then the copper foil was processed into a predetermined size to obtain a test $SiO_x$ negative electrode. The ratio of solid contents in the negative electrode was $SiO_x$:MAG-D:electrically conductive agent:PVDF=35:47:8:10 (by the mass ratio). It is noted that the amounts of the NMC positive-electrode active material and the $SiO_x$ powder were adjusted so that the charging capacity of the $SiO_x$ negative electrode is larger than that of the NMC positive electrode, and the applied amount was also adjusted so that a lithium metal does not deposit on the $SiO_x$ negative electrode during charging.

Production of Nonaqueous Electrolytic Solution Batteries

Aluminum laminate housing cells (with a capacity of 30 mAh) including the above test NMC positive electrode, the test $SiO_x$ negative electrode, and a microporous polypropylene-polyethylene double layered separator were respectively impregnated with one of the various nonaqueous electrolytic solutions and the various comparative nonaqueous electrolytic solutions shown in Table 18 to produce the nonaqueous electrolytic solution batteries according to Examples 10-1 to 10-10 and Comparative Examples 10-1 to 10-15 as in Examples 9-1 to 9-24 and Comparative Examples 9-1 to 9-14 described above. It is noted that the microporous polypropylene-polyethylene double layered separator was arranged so that the polypropylene side thereof is positioned in the side of the positive electrode to allow the positive electrode to face the negative electrode as in Examples 6-1 to 6-16 and Comparative Examples 6-1 to 6-10, thereby obtaining a nonaqueous electrolytic solution battery.

Evaluation of Nonaqueous Electrolytic Solution Batteries

Evaluation 1: Low-Temperature Property (0° C.) after 200 Cycles at 60° C.

Each of the nonaqueous electrolytic solution batteries according to Examples 10-1 to 10-10 and Comparative Examples 10-1 to 10-15 was subjected to the following evaluation. First, conditioning was performed at an environmental temperature of 25° C. under the following conditions. That is, constant-current and constant-voltage charge was performed as the initial charge/discharge at an environmental temperature of 25° C. using the produced cells to a charge upper limit voltage of 4.2 V at a 0.05 C rate (1.5 mA), and discharge was performed at a constant current of a 0.1 C rate (3 mA) to a discharge cutoff voltage of 2.5 V. Subsequently, the following charge-discharge cycle was repeated for 5 times: constant-current and constant-voltage charge was performed at a 0.1 C rate (3 mA) to a charge upper limit voltage of 4.2 V, and discharge was performed at a constant current of a 0.1 C rate (3 mA) to a discharge cutoff voltage of 2.5 V. After this conditioning, the following charge-discharge cycle was repeated for 3 times at an environmental temperature of 25° C.: constant-current and constant-voltage charge was performed at 0.2 C rate (6 mA) to a charge upper limit voltage of 4.2 V, and discharge was then performed at a constant current of a 0.2 C rate (6 mA) to a discharge cutoff voltage of 2.5 V. Then, charge/discharge tests were performed at an environmental temperature of 60° C. The following charge-discharge cycle was repeated for 200 times: constant-current and constant-voltage charge was performed at a 1 C rate (30 mA) to a charge upper limit voltage of 4.2 V, and discharge was performed at a constant current of a 2 C rate (60 mA) to a discharge cutoff voltage of 2.5 V. Next, the nonaqueous electrolytic solution batteries were cooled to 25° C., and again discharged to 2.5 V. Then constant-current and constant-voltage charge was performed to 4.2 V at a 0.2 C rate at 0° C. Further, discharge was performed at a constant current of a 3 C rate (90 mA) to a discharge cutoff voltage of 2.5 V, and the capacity obtained at that time was taken as the low-temperature property (0° C.) after prolonged cycles at 60° C.

Evaluation 2: 3 C-Rate Characteristic after 200 Cycles at 60° C.

After performing 200 cycles at an environmental temperature of 60° C. in Evaluation 1 as described above, the nonaqueous electrolytic solution batteries were cooled to 25° C., and then again discharged to 2.5 V. Subsequently, constant-current and constant-voltage charge was performed to 4.2 V at a 0.1 C rate at 25° C. Further, discharge was performed at a constant current of a 3 C rate (90 mA) to a discharge cutoff voltage of 2.5 V, and the capacity obtained at that time was taken as the 3 C-rate characteristic (25° C.) after prolonged cycles at 60° C.

Evaluation 3: Low-Temperature Property (0° C.) after Stored at 60° C.

Each of the nonaqueous electrolytic solution batteries according to Examples 10-1 to 10-10 and Comparative Examples 10-1 to 10-15 was subjected to storage tests (stored for 10 days after changed to 4.2 V) at an environmental temperature of 60° C. Next, the nonaqueous electrolytic solution batteries were cooled to 25° C., and again discharged to 2.5 V. Then constant-current and constant-voltage charge was performed to 4.2 V at a 0.2 C rate at 0° C. Further, discharge was performed at a constant current of a 3 C rate (900 mA) to a discharge cutoff voltage of 2.5 V while maintaining the temperature at 0° C., and the capacity obtained at that time was taken as the low-temperature property (0° C.) after stored at 60° C.

Various evaluations of the nonaqueous electrolytic solution batteries according to Examples 10-1 to 10-10 and Comparative Examples 10-1 to 10-15 are shown in Table 19 as relative values when the corresponding evaluation results of the nonaqueous electrolytic solution battery according to Comparative Example 10-1 are taken as 100.

TABLE 19

|  | Electrolytic solution No, | Low-temperature property (0° C.) after prolonged cycles at 60° C. | 3 C-rate characteristic (25° C.) after prolonged cycles at 60° C. | Low-temperature property (0° C.) after stored at 60° C. |
|---|---|---|---|---|
| Example 10-1 | Electrolytic solution No. 10-1 | 128.2 | 122.7 | 117.7 |
| Example 10-2 | Electrolytic solution No. 10-2 | 127.5 | 122.1 | 117.1 |
| Example 10-3 | Electrolytic solution No. 10-3 | 128.6 | 123.0 | 118.1 |
| Example 10-4 | Electrolytic solution No. 10-4 | 128.4 | 122.9 | 118.0 |
| Example 10-5 | Electrolytic solution No. 10-5 | 128.7 | 123.2 | 118.2 |
| Example 10-6 | Electrolytic solution No. 10-6 | 130.6 | 125.0 | 119.4 |
| Example 10-7 | Electrolytic solution No. 10-7 | 129.9 | 124.4 | 118.9 |
| Example 10-8 | Electrolytic solution No. 10-8 | 131.0 | 125.4 | 119.8 |
| Example 10-9 | Electrolytic solution No. 10-9 | 130.9 | 125.3 | 119.7 |
| Example 10-10 | Electrolytic solution No. 10-10 | 131.1 | 125.5 | 119.9 |
| Comparative Example 10-1 | Comparative electrolytic solution No. 10-1 | 100.0 | 100.0 | 100.0 |
| Comparative Example 10-2 | Comparative electrolytic solution No. 10-2 | 113.5 | 107.4 | 105.7 |
| Comparative Example 10-3 | Comparative electrolytic solution No. 10-3 | 115.9 | 111.0 | 107.7 |
| Comparative Example 10-4 | Comparative electrolytic solution No. 10-4 | 119.6 | 113.9 | 110.9 |
| Comparative Example 10-5 | Comparative electrolytic solution No. 10-5 | 119.0 | 113.4 | 110.3 |
| Comparative Example 10-6 | Comparative electrolytic solution No. 10-6 | 119.9 | 114.3 | 111.2 |
| Comparative Example 10-7 | Comparative electrolytic solution No. 10-7 | 119.8 | 114.2 | 111.1 |
| Comparative Example 10-8 | Comparative electrolytic solution No. 10-8 | 120.1 | 114.4 | 111.3 |
| Comparative Example 10-9 | Comparative electrolytic solution No. 10-9 | 118.8 | 111.8 | 108.6 |
| Comparative Example 10-10 | Comparative electrolytic solution No. 10-10 | 120.8 | 113.8 | 110.6 |
| Comparative Example 10-11 | Comparative electrolytic solution No. 10-11 | 123.2 | 115.4 | 112.2 |
| Comparative Example 10-12 | Comparative electrolytic solution No. 10-12 | 122.6 | 114.8 | 111.7 |
| Comparative Example 10-13 | Comparative electrolytic solution No. 10-13 | 123.6 | 115.8 | 112.6 |
| Comparative Example 10-14 | Comparative electrolytic solution No. 10-14 | 123.5 | 115.6 | 112.5 |
| Comparative Example 10-15 | Comparative electrolytic solution No. 10-15 | 123.7 | 115.9 | 112.7 |

(Positive electrode; NMC Negative electrode; $SiO_x$ negative electrode)

Examples 10-1 to 10-10

For Examples 10-1 to 10-10 where the powder mixture of a silicon oxide powder and an aggregated artificial graphite powder was used in place of the powder mixture of artificial graphite and natural graphite as a negative-electrode active material, the followings were demonstrated from the results shown in Table 19. That is, the nonaqueous electrolytic solutions containing compounds selected from the 4 groups of (1a-Cis) from Synthesis Example 1 as the group (I) compound according to Example, VC, VEC, EEC, FEC, 2-allylsuccinic anhydride, or 1,6-DICNH as the group (II) compound, (1a-Trans) from Synthesis Example 1 as the group (III) compound, and the tetrafluoro ionic complex (5a-Tetra) from Synthesis Example 2 as the group (IV) compound were found to improve all of the discharge capacity (0° C.) after prolonged cycles at 60° C., the 3 C-rate characteristic (25° C.), and the discharge capacity (0° C.) after stored at 60° C. as compared with Comparative Examples 10-1 to 10-15.

Examples 11-1 to 11-10 and Comparative Examples 11-1 to 11-15: Production and Evaluation of Nonaqueous Electrolytic Solution Batteries A test Si negative electrode was produced as described below using an Si powder as a negative-electrode active material in place of the negative-electrode active material (a powder mixture of a silicon oxide powder and an aggregated artificial graphite powder) used in the nonaqueous electrolytic solution batteries according to Examples 10-1 to 10-10 and Comparative Examples 10-1 to 10-15.

Production of Test Si Negative Electrode

An Si powder (a powder mixture with the mean particle size: 10 μm/6 μm=9/1 by the mass ratio) as an Si powder was uniformly dispersed and mixed into NMP in which PVDF as a binding agent was pre-dissolved, and Ketjen black (electrically conductive agent 1) and vapor-grown carbon fiber (VGCF®-H, Showa Denko K. K.) (electrically conductive agent 2) were further added and mixed, and NMP for adjusting the viscosity was then further added to prepare an Si mixture paste. The above paste was applied to a copper foil (current collector), dried, and pressurized. Then the copper foil was processed into a predetermined size to obtain a test Si negative electrode. The ratio of solid contents in the negative electrode was Si powder:electrically conductive agent 1:electrically conductive agent 2:PVDF=78:7:3:12 (by the mass ratio). It is noted that the amounts of the NMC positive-electrode active material and the Si powder were adjusted so that the charging capacity of the Si negative electrode is larger than that of the NMC positive electrode, and the applied amount was adjusted so that a lithium metal does not deposit on the Si negative electrode during charging.

Production of Nonaqueous Electrolytic Solution Batteries

Aluminum laminate housing cells (with a capacity of 30 mAh) including the above test NMC positive electrode, the test Si negative electrode, and a microporous polypropylene-polyethylene double layered separator were respectively impregnated with one of the various nonaqueous electrolytic solutions and the various comparative nonaqueous electrolytic solutions shown in Table 18 to produce the nonaqueous electrolytic solution batteries according to Examples 11-1 to 11-10 and Comparative Examples 11-1 to 11-15 as in Examples 10-1 to 10-10 and Comparative Examples 10-1 to 10-15 described above.

Examples 11-1 to 11-10 and Comparative Examples 11-1 to 11-15: Evaluation of Nonaqueous Electrolytic Solution Batteries The evaluations described above were performed as the following as in the nonaqueous electrolytic solution batteries according to Examples 10-1 to 10-10 and Comparative Examples 10-1 to 10-15 described above.

Evaluation 1: Low-temperature property (0° C.) after 200 cycles at 60° C.

Evaluation 2: 3 C-rate characteristic after 200 cycles at 60° C.

Evaluation 3: Low-temperature property (0° C.) after stored at 60° C.

Various evaluations of the nonaqueous electrolytic solution batteries according to Examples 11-1 to 11-10 and Comparative Examples 11-1 to 11-15 are shown in Table 20 as relative values when the corresponding evaluation results of the nonaqueous electrolytic solution battery according to Comparative Example 11-1 are taken as 100.

TABLE 20

|  | Electrolytic solution No, | Low-temperature property (0° C.) after prolonged cycles at 60° C. | 3 C-rate characteristic (25° C.) after prolonged cycles at 60° C. | Low-temperature property (0° C.) after stored at 60° C. |
| --- | --- | --- | --- | --- |
| Example 11-1 | Electrolytic solution No. 10-1 | 123.3 | 118.0 | 113.2 |
| Example 11-2 | Electrolytic solution No. 10-2 | 122.7 | 117.4 | 112.7 |
| Example 11-3 | Electrolytic solution No. 10-3 | 123.7 | 118.4 | 113.6 |
| Example 11-4 | Electrolytic solution No. 10-4 | 123.6 | 118.2 | 113.5 |
| Example 11-5 | Electrolytic solution No. 10-5 | 123.8 | 118.5 | 113.7 |
| Example 11-6 | Electrolytic solution No. 10-6 | 127.9 | 122.4 | 116.9 |
| Example 11-7 | Electrolytic solution No. 10-7 | 127.2 | 121.8 | 116.4 |
| Example 11-8 | Electrolytic solution No. 10-8 | 128.2 | 122.8 | 117.3 |
| Example 11-9 | Electrolytic solution No. 10-9 | 128.1 | 122.6 | 117.2 |
| Example 11-10 | Electrolytic solution No. 10-10 | 128.4 | 122.9 | 117.4 |
| Comparative Example 11-1 | Comparative electrolytic solution No. 10-1 | 100.0 | 100.0 | 100.0 |
| Comparative Example 11-2 | Comparative electrolytic solution No. 10-2 | 108.8 | 102.9 | 101.3 |
| Comparative Example 11-3 | Comparative electrolytic solution No. 10-3 | 111.3 | 106.5 | 103.4 |
| Comparative Example 11-4 | Comparative electrolytic solution No. 10-4 | 115.0 | 109.6 | 106.6 |
| Comparative Example 11-5 | Comparative electrolytic solution No. 10-5 | 114.5 | 109.1 | 106.1 |
| Comparative Example 11-6 | Comparative electrolytic solution No. 10-6 | 115.4 | 109.9 | 107.0 |
| Comparative Example 11-7 | Comparative electrolytic solution No. 10-7 | 115.3 | 109.8 | 106.9 |
| Comparative Example 11-8 | Comparative electrolytic solution No. 10-8 | 115.5 | 110.0 | 107.1 |
| Comparative Example 11-9 | Comparative electrolytic solution No. 10-9 | 113.8 | 107.1 | 104.0 |
| Comparative Example 11-10 | Comparative electrolytic solution No. 10-10 | 115.9 | 109.3 | 106.1 |
| Comparative Example 11-11 | Comparative electrolytic solution No. 10-11 | 120.6 | 113.0 | 109.9 |
| Comparative Example 11-12 | Comparative electrolytic solution No. 10-12 | 120.0 | 112.4 | 109.3 |
| Comparative Example 11-13 | Comparative electrolytic solution No. 10-13 | 121.0 | 113.3 | 110.2 |
| Comparative Example 11-14 | Comparative electrolytic solution No. 10-14 | 120.9 | 113.2 | 110.1 |
| Comparative Example 11-15 | Comparative electrolytic solution No. 10-15 | 121.1 | 113.4 | 110.3 |

(Positive electrode; NMC Negative electrode; Si negative electrode)

Examples 11-1 to 11-10

The results shown in Table 20 revealed that even in a case where an Si powder was used as a negative-electrode active material, the nonaqueous electrolytic solutions which contain compounds selected from the 4 groups of (1a-Cis) from Synthesis Example 1 as the group (I) compound according to Example, VC, VEC, EEC, FEC, 2-allylsuccinic anhydride, or 1,6-DICNH as the group (II) compound, (1a-Trans) from Synthesis Example 1 as the group (III) compound, and the tetrafluoro ionic complex (5a-Tetra) shown in Synthesis Example 2 as the group (IV) compound were able to improve all of the discharge capacity (0° C.) after prolonged cycles at 60° C., the 3 C-rate characteristic (25° C.), and the discharge capacity (0° C.) after stored at 60° C. as compared with Comparative Examples 11-1 to 11-15.

Examples 12-1 to 12-12 and Comparative Examples 12-1 to 12-8: Preparation of Nonaqueous Electrolytic Solutions

[Preparation of Nonaqueous Electrolytic Solutions Nos. 12-1 to 12-12 and Comparative Electrolytic Solutions Nos. 12-2 to 12-8]

In a dry box under a nitrogen atmosphere of a dew point of −50° C. or less, $LiPF_6$ and $LiPF_4$ as electrolytes were dissolved and prepared in a nonaqueous solvent of PC and EMC (volume ratio 30:70/mass ratio 33.8:66.2) so that the concentrations of $LiPF_6$ and $LiPF_4$ were 1.1 mol/L and 0.4 mol/L, respectively, and then the various ionic complex/EMC solutions according to the present invention and the group (II) compounds described above were added to prepare the nonaqueous electrolytic solutions Nos. 12-1 to 12-12 according to the present invention and the comparative electrolytic solutions Nos. 12-2 to 12-8. That is, compounds selected from the 4 groups of (1a-Cis) from Synthesis Example 1 as the group (I) compound, 1,6-DICNH, 1-ICNE, or 1,4-diisocyanatobutane (1,4-DICNB) as the group (II) compound, (1a-Trans) from Synthesis Example 1 as the group (III) compound, and the tetrafluoro ionic complex (5a-Tetra) from Synthesis Example 2 as the group (IV) compound were each added in predetermined amounts as shown in Table 21 below to prepare the nonaqueous electrolytic solutions Nos. 12-1 to 12-12 and comparative electrolytic solutions Nos. 12-2 to 12-8.

It is noted that these preparations were performed as follows while cooled to control the solution temperature at 40° C. or below. First, 30 mass % of the entire $LiPF_6$ was added and dissolved in a predetermined amount of EMC, and another 30 mass % of the entire $LiPF_6$ was then added and dissolved. This was repeated for one more time, and the remaining 10 mass % of $LiPF_6$ was then added and dissolved. Then lastly $LiPF_4$ was added and dissolved. Subsequently, predetermined amounts of PC and EMC were added and mixed, and then various ionic complex/EMC solutions and the group (II) compounds shown in Table 21 below were added, and the volume ratio of PC and EMC was finally adjusted to the aforementioned predetermined ratio, and then stirred for 1 hour.

The following nonaqueous electrolytic solution was prepared as Comparative Example.

[Preparation of Comparative Electrolytic Solution: No. 12-1]

In a dry box under a nitrogen atmosphere of a dew point of −50° C. or less, $LiPF_6$ and $LiPF_4$ as electrolytes were dissolved and prepared in a nonaqueous solvent of PC and EMC (volume ratio 30:70/mass ratio 33.8:66.2) so that the concentrations of $LiPF_6$ and $LiPF_4$ were 1.1 mol/L and 0.4 mol/L, respectively, to prepare the comparative electrolytic solution No. 12-1. It is noted that the comparative electrolytic solution No. 12-1 was prepared in the same way as the nonaqueous electrolytic solutions 12-1 to 12-12 according to the present invention except that the various ionic complex/EMC solutions and the group (II) compounds shown in Table 21 below were not added.

TABLE 21

| Electrolytic solution No. | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|
| Electrolytic solution No. 12-1 | Synthesis Example 1 (1a-Cis) | 1.2 | 1,6-DICNH | 0.5 | — | — | — | — | — | — |
| Electrolytic solution No. 12-2 | — | — | — | — | Synthesis Example 1 (1a-Trans) | 0.006 | 0.005 | Synthesis Example 2 (5a-Tetra) | 0.144 | 0.12 |
| Electrolytic solution No. 12-3 | — | — | — | — | Synthesis Example 1 (1a-Trans) | 0.006 | 0.005 | Synthesis Example 2 (5a-Tetra) | 0.144 | 0.12 |
| Electrolytic solution No. 12-4 | Synthesis Example 1 (1a-Cis) | 1.2 | 1-ICNE | 0.5 | — | — | — | — | — | — |
| Electrolytic solution No. 12-5 | — | — | — | — | Synthesis Example 1 (1a-Trans) | 0.006 | 0.005 | — | — | — |
| Electrolytic solution No. 12-6 | — | — | — | — | Synthesis Example 1 (1a-Trans) | 0.006 | 0.005 | Synthesis Example 2 (5a-Tetra) | 0.144 | 0.12 |
| Electrolytic solution No. 12-7 | — | — | — | — | — | — | — | Synthesis Example 2 (5a-Tetra) | 0.144 | 0.12 |
| Electrolytic solution No. 12-8 | Synthesis Example 1 (1a-Cis) | 1.2 | 1,4-DICNB | 1.5 | Synthesis Example 1 (1a-Trans) | 0.006 | 0.005 | Synthesis Example 2 (5a-Tetra) | 0.144 | 0.12 |
| Electrolytic solution No. 12-9 | — | — | — | — | — | — | — | — | — | — |
| Electrolytic solution No. 12-10 | Synthesis Example 1 (1a-Cis) | 1.2 | — | — | — | — | — | — | — | — |
| Electrolytic solution No. 12-11 | — | — | — | — | — | — | — | — | — | — |
| Electrolytic solution No. 12-12 | — | — | — | — | — | — | — | — | — | — |
| Comparative electrolytic solution No. 12-1 | — | — | — | — | — | — | — | — | — | — |
| Comparative electrolytic solution No. 12-2 | Synthesis Example 1 (1a-Cis) | 1.2 | — | — | — | — | — | — | — | — |
| Comparative electrolytic solution No. 12-3 | — | — | 1,6-DICNH | 0.5 | — | — | — | — | — | — |
| Comparative electrolytic solution No. 12-4 | — | — | — | — | Synthesis Example 1 (1a-Trans) | 1.2 | — | Synthesis Example 2 (5a-Tetra) | 0.144 | — |
| Comparative electrolytic solution No. 12-5 | — | — | 1-ICNE | 1.5 | — | — | — | — | — | — |
| Comparative electrolytic solution No. 12-6 | — | — | — | — | Synthesis Example 1 (1a-Trans) | 1.2 | — | Synthesis Example 2 (5a-Tetra) | 0.144 | — |
| Comparative electrolytic solution No. 12-7 | — | — | 1,4-DICNB | 1.5 | — | — | — | — | — | — |
| Comparative electrolytic solution No. 12-8 | — | — | — | — | Synthesis Example 1 (1a-Trans) | 1.2 | — | Synthesis Example 2 (5a-Tetra) | 0.144 | — |

Examples 12-1 to 12-12 and Comparative Examples 12-1 to 12-8: Production and Evaluation of Nonaqueous Electrolytic Solution Batteries A test LTO-alloy negative electrode was produced as described below using a $Li_4Ti_5O_{12}$ (LTO) powder as a negative-electrode active material in place of the negative-electrode active material (an Si powder) used in the nonaqueous electrolytic solution batteries according to Examples 11-1 to 11-10 and Comparative Examples 11-1 to 11-15.

Production of Test LTO Negative Electrode

An LTO powder (a powder mixture with the mean particle size: 0.90 μm/3.40 μm=9/1 by the mass ratio) as an $Li_4Ti_5O_{12}$ (LTO) powder was uniformly dispersed and mixed into NMP in which PVDF as a binding agent was pre-dissolved, and Ketjen black (electrically conductive agent 1) and vapor-grown carbon fiber (VGCF®-H, Showa Denko K. K.) (electrically conductive agent 2) were further added and mixed, and NMP for adjusting the viscosity was then further added to prepare an LTO mixture paste. The resulting paste was applied to an aluminum foil (current collector), dried, and pressurized. Then the aluminum foil was processed into a predetermined size to obtain a test LTO negative electrode. The ratio of solid contents in the negative electrode was LTO powder:electrically conductive agent 1:electrically conductive agent 2:PVDF=83:5:2:10 (by the mass ratio).

Production of Nonaqueous Electrolytic Solution Batteries

Aluminum laminate housing cell (with a capacity of 30 mAh) including the above test NMC positive electrode, the test LTO negative electrode, and a cellulose separator were respectively impregnated with one of the various nonaqueous electrolytic solutions and the various comparative nonaqueous electrolytic solutions shown in Table 21 to produce the nonaqueous electrolytic solution batteries according to Examples 12-1 to 12-12 and Comparative Examples 12-1 to 12-8 as in Examples 6-1 to 6-16 and Comparative Examples 6-1 to 6-10 described above.

Evaluation of Nonaqueous Electrolytic Solution Batteries

Evaluation 1: Low-Temperature Property (0° C.) after 500 Cycles at 60° C.

Each of the nonaqueous electrolytic solution batteries according to Examples 12-1 to 12-12 and Comparative Examples 12-1 to 12-8 was subjected to the following evaluation. First, conditioning was performed at an environmental temperature of 25° C. under the following conditions. That is, constant-current and constant-voltage charge was performed as the initial charge/discharge at an environmental temperature of 25° C. using the produced cells to a charge upper limit voltage of 2.8 V at a 0.1 C rate (3 mA), and discharge was performed at a constant current of a 0.1 C rate (3 mA) to a discharge cutoff voltage of 1.5 V. Subsequently, the following charge-discharge cycle was repeated for 3 times: constant-current and constant-voltage charge was performed to a charge upper limit voltage of 2.8 V at a 0.1 C rate (3 mA), and discharge was performed at a constant current of a 0.1 C rate (3 mA) to a discharge cutoff voltage of 1.5 V. After this conditioning, the following charge-discharge cycle was repeated for 3 times at an environmental temperature of 25° C.: constant-current and constant-voltage charge was performed at 0.2 C rate (6 mA) to a charge upper limit voltage of 2.8 V, and discharge was then performed at a constant current of a 0.2 C rate (6 mA) to a discharge cutoff voltage of 1.5 V. Then, charge/discharge tests were performed at an environmental temperature of 60° C. The following charge-discharge cycle was repeated for 500 times: constant-current and constant-voltage charge was performed at a 2 C rate (30 mA) to a charge upper limit voltage of 2.8 V, and discharge was performed at a constant current of a 2 C rate (60 mA) to a discharge cutoff voltage of 1.5 V. Next, the nonaqueous electrolytic solution batteries were cooled to 25° C., and again discharged to 1.5 V. Then constant-current and constant-voltage charge was performed to 2.8 V at a 0.2 C rate at 0° C. Further, discharge was performed at a constant current of a 5 C rate (150 mA) to a discharge cutoff voltage of 1.5 V, and the capacity obtained at that time was taken as the low-temperature property (0° C.) after prolonged cycles at 60° C.

Evaluation 2: 5 C-Rate Characteristic after 500 Cycles at 60° C.

After performing 500 cycles at an environmental temperature of 60° C. in Evaluation 1 as described above, the nonaqueous electrolytic solution batteries were cooled to 25° C., and then again discharged to 1.5 V. Subsequently constant-current and constant-voltage charge was performed to 2.8 V at a 0.1 C rate at 25° C. Further, discharge was performed at a constant current of a 5 C rate (150 mA) to a discharge cutoff voltage of 1.5 V while maintaining the temperature at 25° C., and the capacity obtained at that time was taken as the 5 C-rate characteristic (25° C.) after prolonged cycles at 60° C.

Evaluation 3: Low-Temperature Property (0° C.) after Stored at 60° C.

Each of the nonaqueous electrolytic solution batteries according to Examples 12-1 to 12-12 and Comparative Examples 12-1 to 12-8 was subjected to storage tests (stored for 10 days after charged to 2.8 V) at an environmental temperature of 60° C. Next, the nonaqueous electrolytic solution batteries were cooled to 25° C., and again discharged to 1.5 V. Then constant-current and constant-voltage charge was performed to 2.8 V at a 0.2 C rate at 0° C. Further, discharge was performed at a constant current of a 5 C rate (150 mA) to a discharge cutoff voltage of 1.5 V while maintaining the temperature at 0° C., and the capacity obtained at that time was taken as the low-temperature property (0° C.) after stored at 60° C.

Various evaluations of the nonaqueous electrolytic solution batteries according to Examples 12-1 to 12-12 and Comparative Examples 12-1 to 12-8 are shown in Table 22 as relative values when the corresponding evaluation results of the nonaqueous electrolytic solution battery according to Comparative Example 12-1 are taken as 100.

TABLE 22

| | Electrolytic solution No. | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 12-1 | Electrolytic solution No. 12-1 | 134.0 | 128.3 | 124.2 |
| Example 12-2 | Electrolytic solution No. 12-2 | 136.3 | 128.9 | 124.9 |

TABLE 22-continued

|  | Electrolytic solution No. | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 12-3 | Electrolytic solution No. 12-3 | 136.7 | 129.5 | 125.3 |
| Example 12-4 | Electrolytic solution No. 12-4 | 137.2 | 131.3 | 126.0 |
| Example 12-5 | Electrolytic solution No. 12-5 | 132.3 | 126.6 | 122.6 |
| Example 12-6 | Electrolytic solution No. 12-6 | 134.6 | 127.3 | 123.3 |
| Example 12-7 | Electrolytic solution No. 12-7 | 134.9 | 127.8 | 123.6 |
| Example 12-8 | Electrolytic solution No. 12-8 | 135.5 | 129.6 | 124.4 |
| Example 12-9 | Electrolytic solution No. 12-9 | 132.9 | 127.3 | 123.2 |
| Example 12-10 | Electrolytic solution No. 12-10 | 135.2 | 127.9 | 124.0 |
| Example 12-11 | Electrolytic solution No. 12-11 | 135.6 | 128.4 | 124.3 |
| Example 12-12 | Electrolytic solution No. 12-12 | 136.1 | 130.3 | 125.0 |
| Comparative Example 12-1 | Comparative electrolytic solution No. 12-1 | 100.0 | 100.0 | 100.0 |
| Comparative Example 12-2 | Comparative electrolytic solution No. 12-2 | 125.3 | 115.4 | 115.2 |
| Comparative Example 12-3 | Comparative electrolytic solution No. 12-3 | 119.4 | 111.7 | 107.8 |
| Comparative Example 12-4 | Comparative electrolytic solution No. 12-4 | 125.8 | 115.9 | 115.7 |
| Comparative Example 12-5 | Comparative electrolytic solution No. 12-5 | 117.9 | 110.2 | 106.4 |
| Comparative Example 12-6 | Comparative electrolytic solution No. 12-6 | 124.1 | 114.4 | 114.2 |
| Comparative Example 12-7 | Comparative electrolytic solution No. 12-7 | 118.5 | 110.8 | 106.9 |
| Comparative Example 12-8 | Comparative electrolytic solution No. 12-8 | 124.8 | 115.0 | 114.8 |

(Positive electrode; NMC Negative electrode; LTO negative electrode)

Examples 12-1 to 12-12

The results shown in Table 22 demonstrated that even in a case where LTO was used as a negative-electrode active material, the nonaqueous electrolytic solutions in which (1a-Cis) from Synthesis Example 1 as the group (I) compound according to Example was used along with 1,6-DICNH, 1-ICNE, or 1,4-DICNB as the group (II) compound, and a compound(s) selected from (1a-Trans) from Synthesis Example 1 as the group (III) compound and the tetrafluoro ionic complex (5a-Tetra) shown in Synthesis Example 2 as the group (IV) compound can be further included were able to improve all of the discharge capacity (0° C.) after prolonged cycles at 60° C., the 5 C-rate characteristic (25° C.), and the discharge capacity (0° C.) after stored at 60° C. as compared with Comparative Examples 12-1 and 12-8.

The above results demonstrated that the nonaqueous electrolytic solutions according to the present invention can show similar effects as Example 1-1 to 1-47 in any of the cases where the following materials were used as a negative electrode: a carbon material having a d value in the lattice plane (002) of more than 0.340 nm as determined by X ray diffraction; a carbon material having a d value in the lattice plane (002) of 0.340 nm or less as determined by X ray diffraction; an oxide of one or more metals selected from Si, Sn, and Al; one or more metals selected from Si, Sn, and Al or an alloy comprising the one or more metals, or an alloy of lithium and the one or more metals or the alloy; and a lithium titanium oxide. That is, it is clear that the nonaqueous electrolytic solution according to the present invention and a battery including the nonaqueous electrolytic solution according to the present invention have effects of improving cycle characteristics regardless of the types of negative electrodes as in the case of the positive electrode described above.

The invention claimed is:
1. An electrolytic solution for nonaqueous electrolytic solution secondary batteries, the electrolytic solution comprising:
a nonaqueous organic solvent,
an electrolyte dissolved in the nonaqueous organic solvent,
(I) a difluoro ionic complex (1) represented by the general formula (1), and
(II) at least one compound selected from the group consisting of a carbonate having an unsaturated bond, a carbonate having a fluorine atom, an acid anhydride, and a compound having an isocyanato group,
wherein 95 mol % or more of the difluoro ionic complex (1) is a difluoro ionic complex (1-Cis) in a cis configuration represented by the general formula (1-Cis),

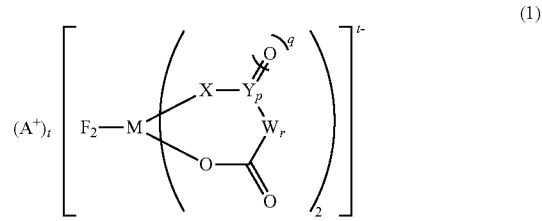

(1)

wherein in (1-Cis),

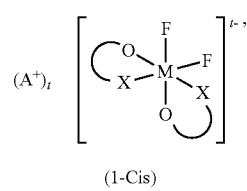

(1-Cis)

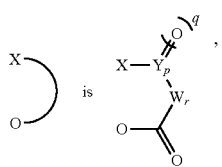 is 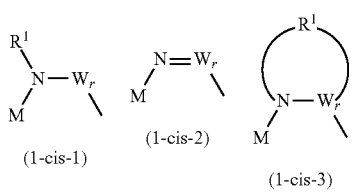

wherein in the general formulas (1) and (1-Cis), A+ is any one selected from the group consisting of a metal ion, a proton, and an onium ion, and M is any one selected from the group consisting of Si, P, As, and Sb; F is a fluorine atom; O is an oxygen atom; t is 2 when M is Si, and t is 1 when M is P, As, or Sb; X is an oxygen atom or —N(R1)-; N is a nitrogen atom; and R1 is a hydrocarbon group having 1 to 10 carbon atoms and optionally having a hetero atom and/or a halogen atom (the hydrocarbon group optionally having a branched-chain or ring structure when the number of carbon atoms is 3 or more); when X is —N(R1)-, and p is 0, X and W are bonded directly and optionally form a structure as shown in the general formulas (1-cis-1) to (1-cis-3) below; in the case of the general formula (1-cis-2) below where the direct bond is a double bond, R1 is not present,

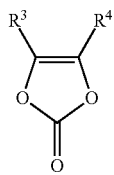

Y is a carbon atom or a sulfur atom; q is 1 when Y is a carbon atom; q is 1 or 2 when Y is a sulfur atom; W represents a hydrocarbon group having 1 to 10 carbon atoms and optionally having a hetero atom and/or a halogen atom (the hydrocarbon group optionally having a branched-chain or ring structure when the number of carbon atoms is 3 or more), or —N(R2)-; wherein, R2 represents a hydrogen atom, an alkaline metal, or a hydrocarbon group having 1 to 10 carbon atoms and optionally having a hetero atom and/or a halogen atom; when the number of carbon atoms is 3 or more, R2 optionally has a branched-chain or ring structure; p is 0 or 1, q is an integer of 0 to 2, r is an integer of 0 to 2, and further, p+r≥1.

2. The electrolytic solution according to claim 1, wherein the at least one compound from the group (II) consists of (II-1) to (II-4) below:
(II-1) a carbonate having an unsaturated bond represented by the general formula (II-1a) and/or (II-1b),
(II-2) a carbonate having a fluorine atom represented by the general formula (II-2a),
(II-3) an acid anhydride represented by the general formula (II-3a), and
(II-4) a compound having an isocyanato group represented by the general formula (II-4a),

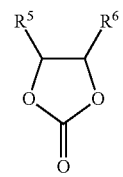 (II-1a)

wherein O is an oxygen atom, R3 and R4 are each independently a hydrogen atom, an alkyl group, a hydrocarbon group having an unsaturated bond, an alkoxy group, a halogen, an alkyl group having a halogen, or an aryl group, provided that R3 and R4 optionally include an ether linkage,

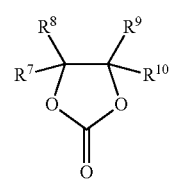 (II-1b)

wherein O is an oxygen atom, and R5 is an alkyl group, a hydrocarbon group having an unsaturated bond, or an alkoxy group, R6 is a hydrogen atom, an alkyl group, a hydrocarbon group having an unsaturated bond, or an alkoxy group,
provided that R5 and R6 optionally include an ether linkage,
provided that propylene carbonate is not included in (II-1b), (II-2a)

$R^7$ $R^8$ $R^9$ $R^{10}$ shown on dioxolanone ring wherein O is an oxygen atom, R7 to R10 are each independently a hydrogen atom, an alkyl group, a hydrocarbon group having an unsaturated bond, an alkoxy group, a halogen, an alkyl group having a halogen, or an aryl group, provided that at least one of R7 to R10 has a fluorine atom, R7 to R10 optionally include an ether linkage,

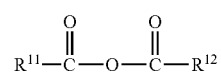 (II-3a)

wherein O is an oxygen atom, and C is a carbon atom, and R11 and R12 are each independently a hydrogen atom, a halogen atom, an alkyl group having 1 to 12 carbon atoms, a haloalkyl group having 1 to 12 carbon atoms, or an alkenyl group having 2 to 12 carbon atoms, and at least one of R11 and R12 is a halogen atom, an alkyl group having 1 to 12 carbon atoms, or a haloalkyl group having 1 to 12 carbon atoms, R11, R12, and a carbon atom to which they are bonded are optionally combined together to form a cycloaliphatic acid anhydride, $R^{13}\!\!-\!\!(\!N\!=\!\!C\!=\!\!O)_n$ (II-4a)

wherein N represents a nitrogen atom, and C represents a carbon atom, and O represents an oxygen atom, and R13 is a chain hydrocarbon having 1 to 10 carbon atoms, and n represents an integer of 1 to 2.

3. The electrolytic solution according to claim 1, wherein each element in an anion moiety of the difluoro ionic complex (1-Cis) is at least one selected from the group consisting of (Cis-a), (Cis-b), (Cis-c), and (Cis-d):
(Cis-a) M=P; X=O; Y=C; p, q, and t=1; and r=0;
(Cis-b) M=P; X=O; W=C(CF3)2; p and q=0; and r and t=1;

(Cis-c) M=Si; X=O; Y=C; p and q=1; t=2; and r=0; and (Cis-d) M=P; X=N(R1); Y=C; R1=CH3; p, q, and t=1; and r=0.

4. The electrolytic solution according to claim 1, wherein the A+ in the difluoro ionic complex (1-Cis) is at least one ion selected from the group consisting of a lithium ion, a sodium ion, a potassium ion, and a quaternary alkylammonium ion.

5. The electrolytic solution according to claim 1, wherein the content of the difluoro ionic complex (1-Cis) is in the range of 0.001 mass % or more and 20 mass % or less relative to the electrolytic solution, and the total content of the at least one compound from the group (II) is in the range of 0.01 mass % or more and 25 mass % or less relative to the electrolytic solution, and at least one of (II-1), (II-2), (II-3), and (II-4) of the at least one compound from the group (II) is included in the following ranges relative to the electrolytic solution:

(II-1) a carbonate having an unsaturated bond: in the range of 0.01 mass % or more and 5 mass % or less, (II-2) a carbonate having a fluorine atom: in the range of 0.01 mass % or more and 20 mass % or less, (II-3) an acid anhydride: in the range of 0.01 mass % or more and 2 mass % or less, (II-4) a compound having an isocyanato group: in the range of 0.01 mass % or more and 5 mass % or less.

6. The electrolytic solution according to claim 1, wherein the difluoro ionic complex (1) further comprises (III) a difluoro ionic complex (1-Trans) in a trans configuration represented by the general formula (1-Trans), wherein in (1-Trans),

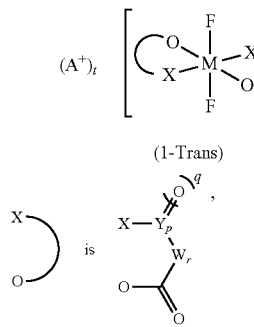

(1-Trans)

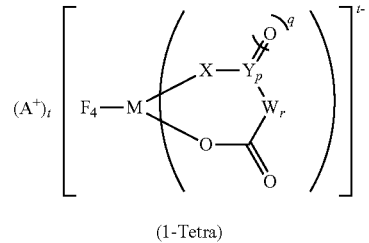

wherein in the general formula (1-Trans), A+ is any one selected from the group consisting of a metal ion, a proton, and an onium ion, and M is any one selected from the group consisting of Si, P, As, and Sb; F is a fluorine atom; O is an oxygen atom; t is 2 when M is Si, and t is 1 when M is P, As, or Sb; X is an oxygen atom or —N(R1)-; N is a nitrogen atom; and R1 is a hydrocarbon group having 1 to 10 carbon atoms and optionally having a hetero atom and/or a halogen atom (the hydrocarbon group optionally having a branched-chain or ring structure when the number of carbon atoms is 3 or more); when X is —N(R1)-, and p is 0, X and W are bonded directly and optionally form a structure as shown in the general formulas (1-Trans-1) to (1-Trans-3) below; in the case of the general formula (1-Trans-2) below where the direct bond is a double bond, R1 is not present,

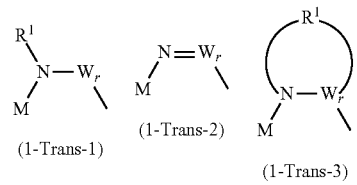

Y is a carbon atom or a sulfur atom; q is 1 when Y is a carbon atom; q is 1 or 2 when Y is a sulfur ato; W represents a hydrocarbon group having 1 to 10 carbon atoms and optionally having a hetero atom and/or a halogen atom (the hydrocarbon group optionally having a branched-chain or ring structure when the number of carbon atoms is 3 or more), or —N(R2)-; wherein R2 represents a hydrogen atom, an alkaline metal, or a hydrocarbon group having 1 to 10 carbon atoms and optionally having a hetero atom and/or a halogen atom; when the number of carbon atoms is 3 or more, R2 optionally has a branched-chain or ring structure; p is 0 or 1, q is an integer of 0 to 2, r is an integer of 0 to 2, and further, p+r≥1.

7. The electrolytic solution according to claim 6, wherein each element in an anion moiety of the difluoro ionic complex (1-Trans) is at least one selected from the group consisting of (Trans-a), (Trans-b), (Trans-c), and (Trans-d) below:

(Trans-a) M=P; X=O; Y=C; p, q, and t=1; and r=0, (Trans-b) M=P; X=O; W=C(CF3)2; p and q=0; and r and t=1, (Trans-c) M=Si; X=O; Y=C; p and q=1; t=2; and r=0, and (Trans-d) M=P; X=N(R1); Y=C; R1=CH3; p, q, and t=1; and r=0.

8. The electrolytic solution according to claim 6, wherein the A+ in the difluoro ionic complex (1-Trans) is at least one ion selected from the group consisting of a lithium ion, a sodium ion, a potassium ion, and a quaternary alkylammonium ion.

9. The electrolytic solution according to claim 6, wherein the ratio of the content of the difluoro ionic complex (1-Trans) to the mass of the difluoro ionic complex (1-Cis) is 0.0001 or more and 0.05 or less.

10. The electrolytic solution according to claim 1, further comprising (IV) a tetrafluoro ionic complex represented by the general formula (1-Tetra):

(1-Tetra)

wherein in the general formula (1-Tetra), A+ is any one selected from the group consisting of a metal ion, a proton, and an onium ion, and M is any one selected from the group consisting of Si, P, As, and Sb; F is a fluorine atom; O is an oxygen atom; t is 2 when M is Si, and t is 1 when M is P, As, or Sb; X is an oxygen atom or —N(R1)-; N is a nitrogen atom; and R1 is a hydrocarbon group having 1 to 10 carbon atoms and optionally having a hetero atom and/or a halogen atom (the hydrocarbon group optionally having a branched-chain or ring structure when the number of carbon atoms is 3 or more); when X is —N(R1)-, and p is 0, X and W are bonded directly and optionally form a structure as shown in the general formulas (1-Tetra-1) to (1-Tetra-3) below; in the case of the general formula (1-Tetra-2) below where the direct bond is a double bond, R1 is not present,

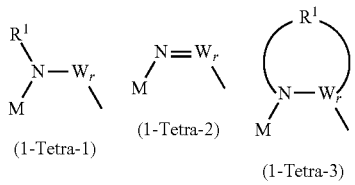

(1-Tetra-1) (1-Tetra-2) (1-Tetra-3)

Y is a carbon atom or a sulfur atom, q is 1 when Y is a carbon atom, q is 1 or 2 when Y is a sulfur atom; W represents a hydrocarbon group having 1 to 10 carbon atoms and optionally having a hetero atom and/or a halogen atom (the hydrocarbon group optionally having a branched-chain or ring structure when the number of carbon atoms is 3 or more), or —N(R2)-; wherein R2 represents a hydrogen atom, an alkaline metal, or a hydrocarbon group having 1 to 10 carbon atoms and optionally having a hetero atom and/or a halogen atom; when the number of carbon atoms is 3 or more, R2 optionally has a branched-chain or ring structure; p is 0 or 1, q is an integer of 0 to 2, r is an integer of 0 to 2, and further, p+r≥1.

11. The electrolytic solution according to claim 10, wherein each element in an anion moiety of the tetrafluoro ionic complex is any selected from the group consisting of (Tetra-a), (Tetra-b), (Tetra-c), and (Tetra-d):

(Tetra-a) M=P; X=O; Y=C; p, q, and t=1; and r=0,
(Tetra-b) M=P; X=O; W=C(CF3)2; p and q=0; and r and t=1,
(Tetra-c) M=Si; X=O; Y=C; p and q=1; t=2; and r=0, and
(Tetra-d) M=P; X=N(R1); Y=C; R1=CH3; p, q, and t=1; and r=0.

12. The electrolytic solution according to claim 10, wherein the A+ in the tetrafluoro ionic complex is at least one ion selected from the group consisting of a lithium ion, a sodium ion, a potassium ion, and a quaternary alkylammonium ion.

13. The electrolytic solution according to claim 10, wherein the ratio of the content of the tetrafluoro ionic complex (1-Tetra) to the mass of the difluoro ionic complex (1-Cis) is 0.02 or more and 0.25 or less.

14. The electrolytic solution according to claim 1, wherein the nonaqueous organic solvent comprises at least one selected from the group consisting of a cyclic carbonate and a chain carbonate.

15. The electrolytic solution according to claim 14, wherein the cyclic carbonate is at least one selected from the group consisting of ethylene carbonate and propylene carbonate, and the chain carbonate is at least one selected from the group consisting of ethylmethyl carbonate, dimethyl carbonate, diethyl carbonate, and methylpropyl carbonate.

16. The electrolytic solution according to claim 14, wherein the nonaqueous organic solvent further comprises at least one compound selected from the group consisting of esters, ethers, lactones, nitriles, amides, and sulfones.

17. The electrolytic solution according to claim 1, wherein the electrolyte is a salt comprising a pair of a cation and an anion, the cation being at least one selected from the group consisting of lithium, sodium, potassium, and quaternary ammonium, and the anion being at least one selected from the group consisting of hexafluorophosphoric acid, tetrafluoroboric acid, perchloric acid, hexafluoroarsenic acid, hexafluoroantimonic acid, trifluoromethanesulfonic acid, bis(trifluoromethanesulfonyl)imide, bis(pentafluoroethanesulfonyl)imide, (trifluoromethanesulfonyl)(pentafluoroethanesulfonyl)imide, bis(fluorosulfonyl)imide, (trifluoromethanesulfonyl)(fluorosulfonyl)imide, (pentafluoroethanesulfonyl)(fluorosulfonyl)imide, tris(trifluoromethanesulfonyl)methide, and bis(difluorophosphonyl)imide.

18. A nonaqueous electrolytic solution secondary battery comprising the electrolytic solution according to claim 1, a positive electrode, a negative electrode, and a separator.

19. A nonaqueous electrolytic solution secondary battery, comprising:
(a) the electrolytic solution according to claim 1;
(b) a positive electrode including at least one oxide and/or a polyanion compound as a positive-electrode active material;
(c) a negative electrode including a negative-electrode active material; and
(d) a separator including polyolefin or cellulose as a main component,
wherein the positive-electrode active material is at least one selected from the group consisting of (A) a lithium-transition metal composite oxide containing at least one metal of nickel, manganese, and cobalt, and having a layered structure, (B) a lithium-manganese composite oxide having a spinel structure, (C) a lithium-containing olivine-type phosphate salt, and (D) a lithium-rich layered transition-metal oxide having a stratified rock-salt structure, and
the negative-electrode active material is at least one selected from the group consisting of (E) a carbon material having a d value in a lattice plane (002) of 0.340 nm or less as determined by X ray diffraction, (F) a carbon material having a d value in the lattice plane (002) of more than 0.340 nm as determined by X ray diffraction, (G) an oxide of one or more metals selected from Si, Sn, and Al, (H) one or more metals selected from Si, Sn, and Al or an alloy comprising the one or more metals, or an alloy of lithium and the one or more metals or the alloy, and (I) a lithium titanium oxide.

* * * * *